(12) United States Patent
Shima et al.

(10) Patent No.: US 7,302,868 B2
(45) Date of Patent: Dec. 4, 2007

(54) METHOD FOR MEASURING FORCES ACTED UPON TIRE AND APPARATUS FOR MEASURING FORCES ACTED UPON TIRE

(75) Inventors: Hiroshi Shima, Kodaira (JP); Katsuhiro Kobayashi, Kodaira (JP); Wataru Seki, Kodaira (JP); Yukio Aoike, Kodaira (JP); Takahisa Shizuku, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 136 days.

(21) Appl. No.: 10/518,635

(22) PCT Filed: Jun. 11, 2003

(86) PCT No.: PCT/JP03/07441

§ 371 (c)(1),
(2), (4) Date: Aug. 22, 2005

(87) PCT Pub. No.: WO04/000621

PCT Pub. Date: Dec. 31, 2003

(65) Prior Publication Data

US 2006/0010992 A1    Jan. 19, 2006

(30) Foreign Application Priority Data

| Jun. 21, 2002 | (JP) | ............................. 2002-181485 |
| Oct. 8, 2002 | (JP) | ............................. 2002-294904 |
| Dec. 27, 2002 | (JP) | ............................. 2002-379916 |
| Dec. 27, 2002 | (JP) | ............................. 2002-380505 |
| Mar. 12, 2003 | (JP) | ............................. 2003-066710 |

(51) Int. Cl.
*G01L 1/12* (2006.01)
*G01L 1/06* (2006.01)
*G01M 17/02* (2006.01)

(52) U.S. Cl. .............................. 73/862.69; 73/862.53; 73/146

(58) Field of Classification Search ................. 73/862, 73/146, 862.69
See application file for complete search history.

(56) References Cited

U.S. PATENT DOCUMENTS

| 3,895,347 | A | * | 7/1975 | Takusagawa et al. ....... 340/447 |
| 4,570,152 | A | * | 2/1986 | Melton et al. .............. 340/449 |
| 5,218,861 | A | * | 6/1993 | Brown et al. .............. 73/146.5 |
| 5,285,154 | A | * | 2/1994 | Burreson ............... 324/207.16 |

(Continued)

FOREIGN PATENT DOCUMENTS

EP    881 468 A    12/1998

(Continued)

*Primary Examiner*—Michael Cygan
*Assistant Examiner*—Jonathan Dunlap
(74) *Attorney, Agent, or Firm*—Sughrue Mion, PLLC

(57) ABSTRACT

There is provided an apparatus for measuring forces acted upon a tire in which a radial force and a peripheral force acting to the tire, which are required for the high precision measurement of a friction coefficient on a road surface, are simply measured in a high precision by detecting a magnetic field formed by a magnet fixed to a tread portion of the tire by a magnetic sensor fixed to a rim and measuring the forces acting to the tire from a variant pattern of a magnetic flux density detected un the rotation of the tire and without influencing upon the balance of the tire, which contributes to the high precision measurement of the friction coefficient on the road surface.

20 Claims, 37 Drawing Sheets

U.S. PATENT DOCUMENTS

| | | | |
|---|---|---|---|
| 5,469,136 A * | 11/1995 | Matsubara et al. | 340/445 |
| 5,537,867 A * | 7/1996 | Kosaka et al. | 73/146.5 |
| 5,895,854 A * | 4/1999 | Becherer et al. | 73/514.39 |
| 5,913,240 A * | 6/1999 | Drahne et al. | 73/146 |
| 5,964,265 A * | 10/1999 | Becherer | 152/152.1 |
| 6,308,758 B1 * | 10/2001 | Cetin et al. | 152/523 |
| 6,591,671 B2 * | 7/2003 | Brown | 73/146.5 |
| 6,612,164 B1 * | 9/2003 | Meins | 73/146.5 |
| 6,725,895 B1 * | 4/2004 | Tsipov | 152/415 |
| 6,851,307 B2 * | 2/2005 | Poulbot | 73/146 |
| 6,931,912 B2 * | 8/2005 | Tsuchie et al. | 73/9 |
| 2002/0166371 A1 * | 11/2002 | Ratti et al. | 73/146 |
| 2002/0166373 A1 * | 11/2002 | Mancosu et al. | 73/146 |
| 2003/0010108 A1 * | 1/2003 | Goslar et al. | 73/146 |
| 2003/0058118 A1 * | 3/2003 | Wilson | 340/679 |
| 2003/0149515 A1 * | 8/2003 | Hessmert et al. | 701/29 |
| 2003/0159503 A1 * | 8/2003 | Mancuso et al. | 73/146 |
| 2004/0244474 A1 * | 12/2004 | Fennel et al. | 73/146 |
| 2006/0102263 A1 * | 5/2006 | Kikuchi et al. | 152/152.1 |

FOREIGN PATENT DOCUMENTS

| | | |
|---|---|---|
| JP | 52-130602 A | 11/1977 |
| JP | 11-83418 A | 3/1999 |
| JP | 2002-2472 A | 1/2002 |
| WO | WO 01/11330 * | 2/2001 |
| WO | WO 2005/028270 A * | 3/2005 |

* cited by examiner

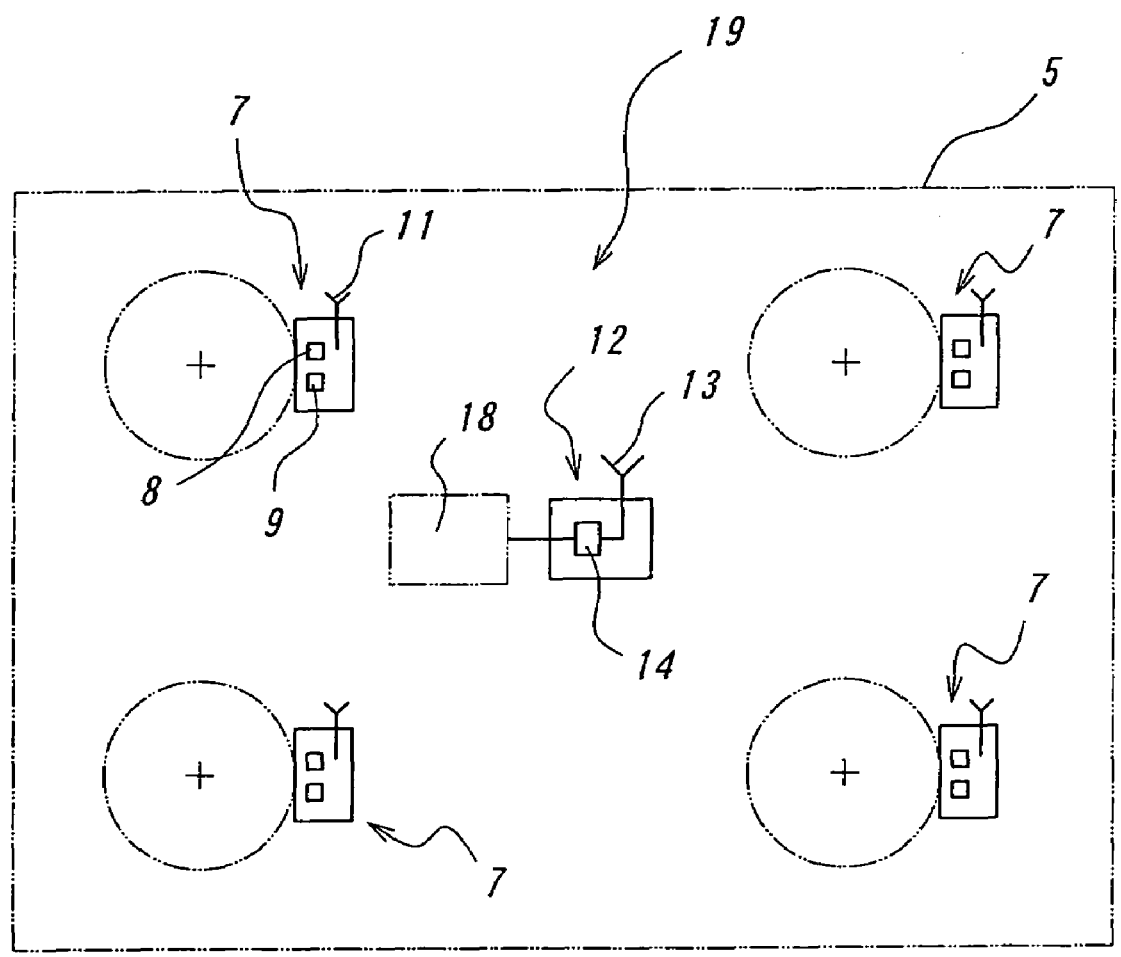

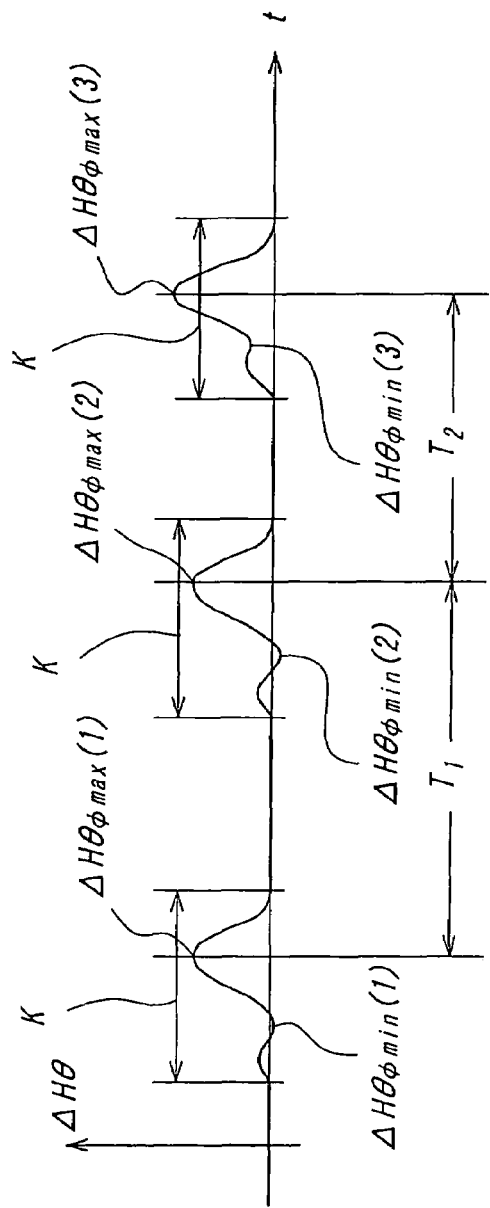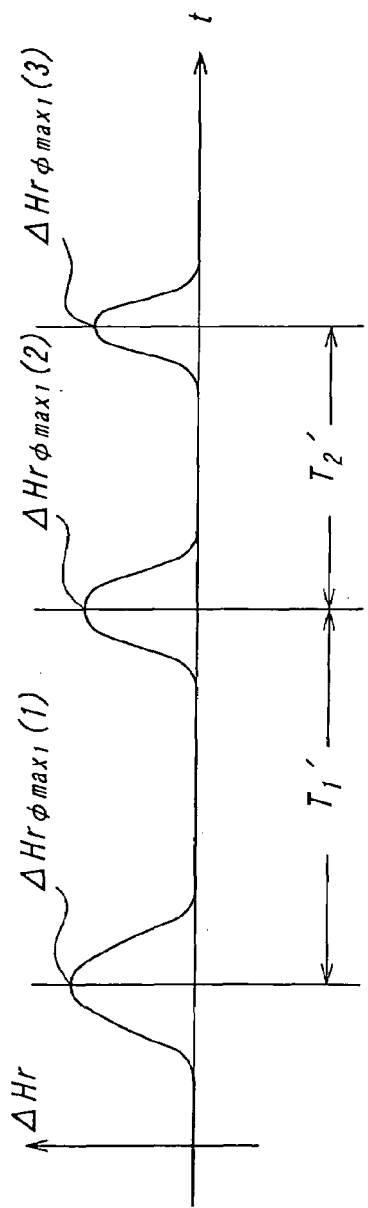

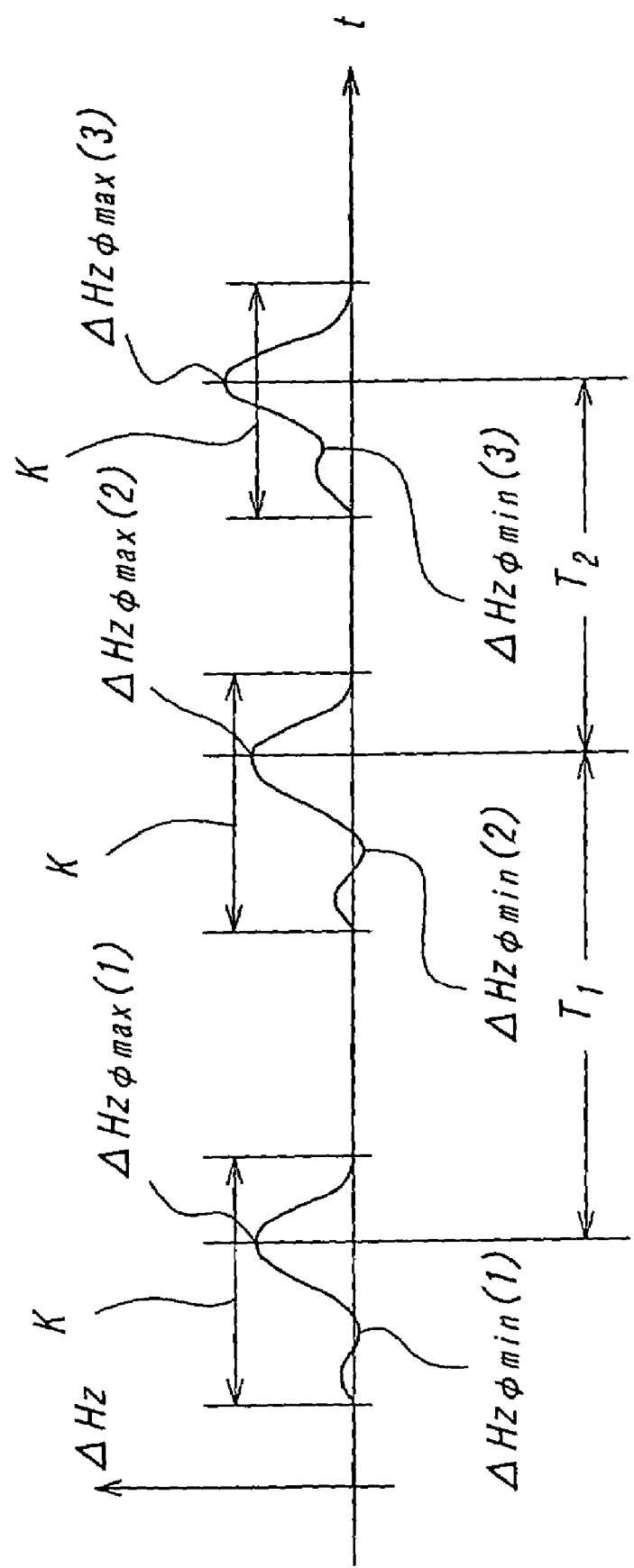

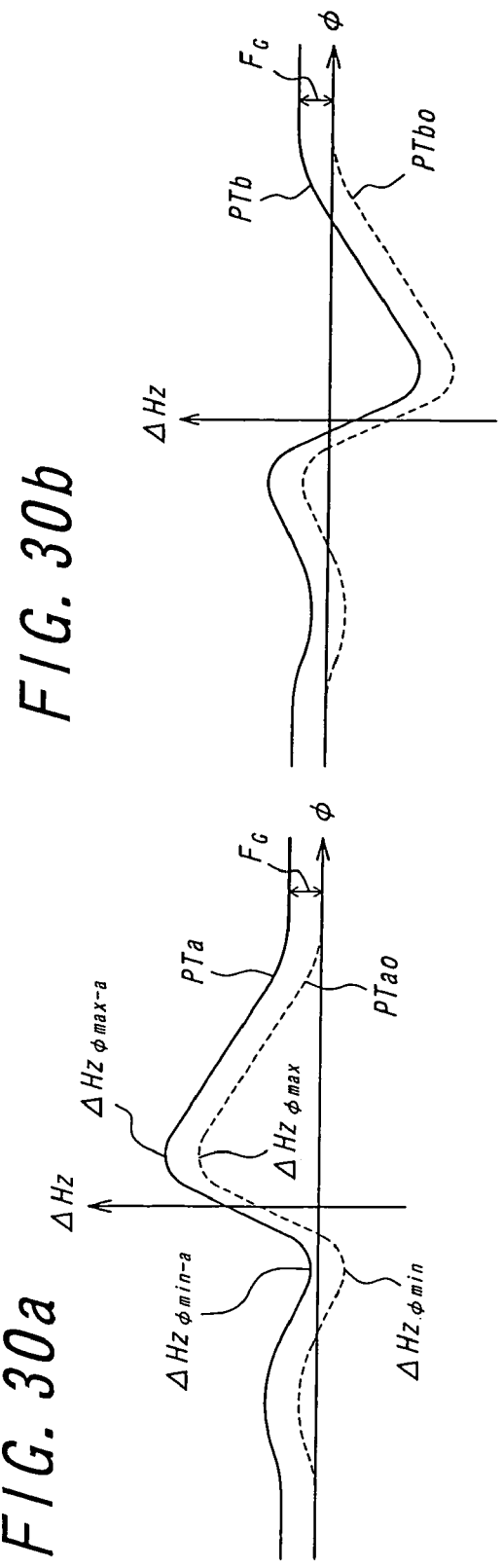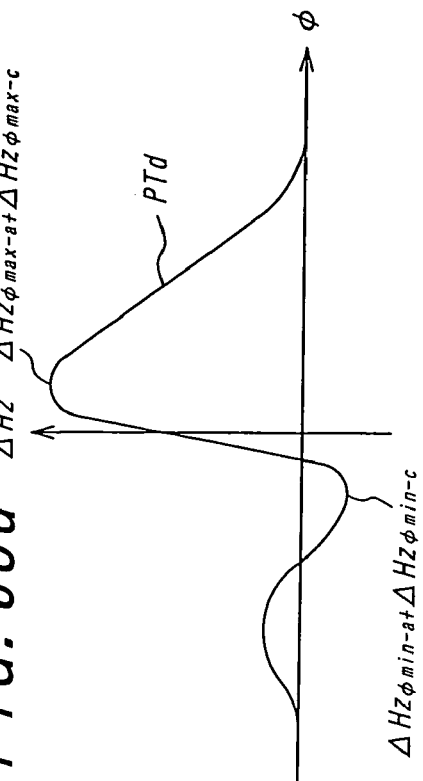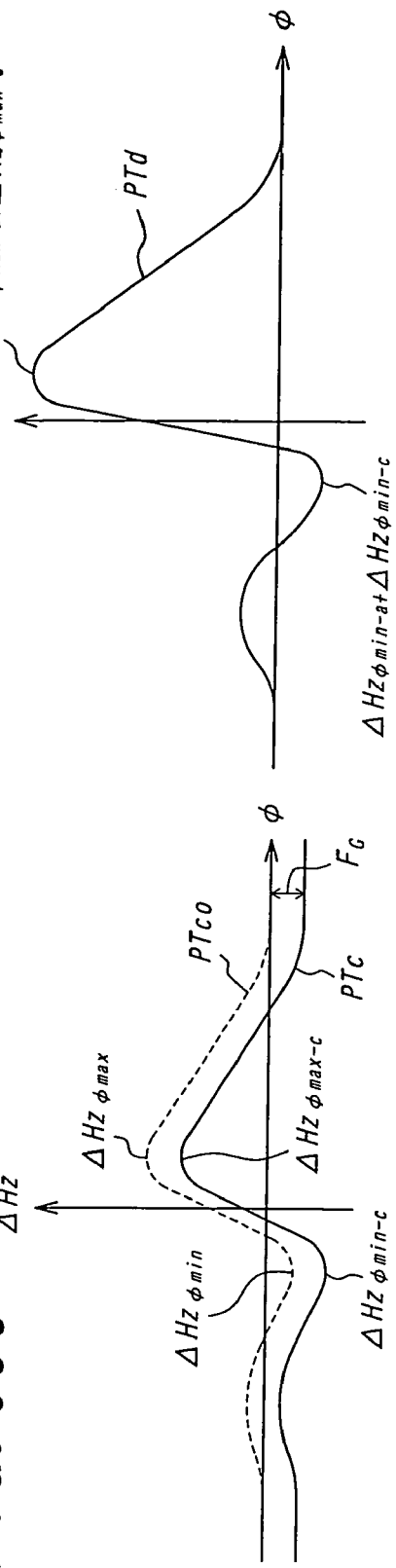

METHOD FOR MEASURING FORCES ACTED UPON TIRE AND APPARATUS FOR MEASURING FORCES ACTED UPON TIRE

TECHNICAL FIELD

This invention relates to a method for measuring forces acted upon a tire for precisely measuring a friction coefficient on road surface required in the control of an anti-skid brake system (hereinafter referred to as ABS) or a traction control system of a vehicle.

BACKGROUND ART

In order to enhance performances of ABS used in the vehicle, it is effective to conduct the control of lock-unlock at a state of a large friction coefficient on road surface as far as possible. The friction coefficient on road surface is dependent upon a slippage ratio of a wheel at a constant road surface state, so that ABS is designed so as to control the lock-unlock in the vicinity of the slippage ratio giving a maximum friction coefficient on road surface.

In the conventional ABS, it is general to use a system that the slippage ratio is determined by calculating from a speed of the vehicle and a rotating speed of the wheel measured and the braking is automatically controlled so as to enter this slippage ration into a given range.

However, the method of controlling the slippage ratio to obtain an optimum friction coefficient on road surface is effective on a constant road surface, but there is a problem in the actual running that even if the slippage ratio is controlled to the given range, the optimum friction coefficient on road surface is not obtained because a relationship between the slippage ratio and the friction coefficient on road surface is largely dependent upon the road surface material, weather and the like. For this end, it is desirable that forces of the road surface acted upon a tire in a peripheral direction and a vertical direction are measured and a friction coefficient is directly determined from the measured forces and the braking is controlled so as to make the friction coefficient measured optimum. Therefore, there is proposed a method of directly measuring forces acted upon the tire as described, for example, in JP-A-10-506346.

According to this conventional method for measuring the forces, plural pairs of magnet pair comprising two magnets arranged at two standard points, which are different in the position in a radial direction on the same radius of a sidewall portion of the tire, are arranged so as to separate apart from each other around a center axis of the tire, and a magnetic sensor is disposed and fixed to a vehicle at a radially position corresponding to each of the standard points, and a timing of directly facing the standard points relatively displacing with the rotation of the tire to the magnetic sensors corresponding thereto is gotten as a timing of developing a peak of a magnetic flux detected by the magnetic sensor, and relative displacement between the standard point in the magnet pair and relative displacement of the standard point between the pair of the magnet pair are calculated from a time lag of the timing between these standard points, and strains of the tire in a peripheral direction and a vertical direction are calculated based on these relative displacements, and forces acting to the peripheral direction and vertical direction are determined from the calculated strains and the known tire rigidity.

However, this method is required to calculate the relative displacement from the time lag by taking data of the rotating speed of the wheel changing at any time, so that there are problems that the control becomes complicated and the precision of the calculation is deteriorated by the influence of the precision on the rotating speed of the wheel.

The invention is made in the light of the above problems, and an object thereof is to provide a method and an apparatus for measuring forces acted upon a tire in which forces acted upon the tire in radial direction and peripheral direction of the tire required for the high precision measurement of friction coefficient on road surface can be measured simply in a high precision.

DISCLOSURE OF THE INVENTION

In order to achieve the above object, the invention has the following summary and construction.

(1) The method for measuring forces acted upon a tire according to the invention is a method for measuring at least one of forces in a peripheral direction and a radial direction of a running tire mounted onto a rim acted upon a ground contact face, in which when a point on an outer peripheral face of the rim is Q and an intersect between a straight line passing through the point Q under no action of external force and extending in the radial direction and an inner peripheral face of a tread portion of the tire is P, said forces are determined from a variant pattern that a relative displacement of the point P to the point Q in the peripheral direction or the radial direction is changed in accordance with a rotating position of the point Q when the point P passes through the ground contact portion of the tire.

(2) In the method for measuring forces acted upon the tire according to the invention described in the item (1), a magnetic field formed by a magnet arranged on one of the point P and the point Q is continuously measured by a magnetic sensor arranged on the other of the point P and the point Q, and the variant pattern of the relative displacement between the point P and the point Q is determined by reverse calculation from a variant pattern of a magnetic flux density changed in accordance with the relative displacement.

Moreover, the "magnet" simply described throughout the specification means things capable of forming any magnetic field. For example, the magnet includes a composite magnet in which plural magnets are arranged in a given form, or a magnetic body magnetized in a given magnetization distribution.

(3) In the method for measuring forces acted upon the tire according to the invention described in the item (2),
the measurement of the magnetic flux density is conducted by using the magnet arranged so that a magnetic force line distribution of the magnetic field forms a plane symmetry with respect to a meridional plane of the tire including the point P or the point Q under no action of external force to the tire,
and the force acting in the peripheral direction of the tire is determined from an average between maximum value and minimum value of a variant pattern of a tire peripheral component in the measured magnetic flux density and the force acting in the radial direction of the tire is determined from a difference between the maximum value and the minimum value of the variant pattern.

Moreover, the "tire meridional plane" means a plane including a rotational axis of the tire.

(4) In the method for measuring forces acted upon the tire according to the invention described in the item (2), the measurement of the magnetic flux density is conducted by using the magnet arranged so that a magnetic force line distribution of the magnetic field forms a plane symmetry with respect to a meridional plane of the tire including the point P or the point Q under no action of external force to the tire, and the force acting in the radial direction of the tire is determined from a maximum value or a minimum value of a variant pattern of a tire radial component of the measured magnetic flux density.

(5) In the method for measuring forces acted upon the tire according to the invention described in the item (2), the measurement of the magnetic flux density is conducted by using the magnet arranged so that a widthwise component of a magnetic flux density of the magnetic field changes along the peripheral direction of the tire under no action of external force to the tire, and the force acting in the peripheral direction of the tire is determined from an average between maximum value and minimum value of a variant pattern of a tire widthwise component in the measured magnetic flux density and the force acting in the radial direction of the tire is determined from a difference between the maximum value and the minimum value of the variant pattern.

(6) In the method for measuring forces acted upon the tire according to the invention described in the item (2), the measurement of the magnetic flux density is carried out in parallel with respect to a pair of magnets arranged near to each other so that changes of widthwise components of magnetic flux densities formed along the peripheral direction of the tire form a reversal relation under no action of external force to the tire, and when an average value of maximum values in a reversal pattern reversed from a variant pattern of the magnetic flux density of the tire widthwise component measured on one of the magnets and in a variant pattern of the magnetic flux density of the tire widthwise component measured on the other magnet is an average maximum value and an average value of minimum values in these patterns is an average minimum value, the force acting in the peripheral direction of the tire is determined from an average between the average maximum value and the average minimum value, and the force acting in the radial direction of the tire is determined from a difference between the average maximum value and the average minimum value.

Moreover, instead of a feature that the force acting in the peripheral direction of the tire is determined from the average between the average maximum value and the average minimum value and the force acting in the radial direction of the tire is determined from the difference between the average maximum value and the average minimum value, the force in the peripheral direction of the tire may be determined from an average of a maximum value and a minimum value based on arithmetic addition of the reversal pattern on one of the magnets and the variant pattern on the other magnet and the force acting in the radial direction may be determined from a difference between the maximum value and the minimum value.

(7) The apparatus for measuring forces acted upon a tire according to the invention is an apparatus for measuring forces acted upon a tire used in the measuring method described in any one of the items (2)-(6), which comprises a magnet arranged on an inner peripheral face of a tread portion, and a magnetic sensor attached directly or indirectly through a fitting jig to an outer peripheral face of a rim.

(8) The apparatus for measuring forces acted upon a tire according to the invention is an apparatus for measuring forces acted upon a tire used in the measuring method described in any one of the items (2)-(6), which comprises a magnet attached directly or indirectly through a fitting jig to an outer peripheral face of a rim and a magnetic sensor arranged on an inner peripheral face of a tread portion.

(9) In the apparatus for measuring forces acted upon a tire according to the invention described in the item (7) or (8), the magnet is constituted with a sheet-shaped magnet having magnetic poles of the same polarity at both ends in a longitudinal direction and a magnetic pole of a polarity opposite to the magnetic poles of both the ends at a center in the longitudinal direction, and the magnet is arranged so as to extend the longitudinal direction in a peripheral direction of the tire.

(10) In the apparatus for measuring forces acted upon a tire according to the invention described in the item (7) or (8), the magnet is constituted with two magnets each having magnetic poles of opposite polarities at both ends, and these two magnets are extended in opposite directions to each other in a widthwise direction of the tire and arranged side by side in a peripheral direction of the tire.

(11) In the apparatus for measuring forces acted upon a tire according to the invention described in the item (7), the magnet is constituted with at least one sheet-shaped magnet in which distributions of magnetization at front and back faces thereof form a reversal relation to each other.

(12) In the apparatus for measuring forces acted upon a tire according to the invention described in the item (11), the sheet-shaped magnet is constituted with a rectangular rubber sheet of an even thickness in which the magnetization of the same polarity at each of the front and back faces is distributed substantially uniformly over a full face thereof.

(13) In the apparatus for measuring forces acted upon a tire according to the invention described in the item (12), the one rectangular sheet-shaped magnet is arranged so as to position a magnet center to the point P and direct a side of the magnet to a peripheral direction.

(14) In the apparatus for measuring forces acted upon a tire according to the invention described in the item (12), four rectangular sheet-shaped magnets having the same size are arranged so as to position their magnet centers to apexes of a tetragon having a center at the point P and one side parallel to a peripheral direction of the tire, and a side of each of these magnets is directed to the peripheral direction of the tire, and distances separated between these magnets in the peripheral direction of the tire and the widthwise direction of the tire are not more than 100 mm, respectively, and directions of magnetic poles of the sheet-shaped magnets located at mutually adjacent apexes of the tetragon having a center at the point P are opposed to each other.

(15) In the apparatus for measuring forces acted upon a tire according to the invention described in the item (12), two rectangular sheet-shaped magnets having the same size are arranged so as to position their magnet centers to a pair of apexes forming a diagonal relationship of a tetragon having a center at the point P and a side parallel to a peripheral direction of the tire, and a side of each of these magnets is directed to the peripheral direction of the tire, and distances separated between these magnets in the peripheral direction of the tire and the widthwise direction of the tire are not more than 100 mm, respectively, and directions of magnetic poles of these sheet-shaped magnets are made the same.

(16) In the apparatus for measuring forces acted upon a tire according to the invention described in the item (12), six rectangular sheet-shaped magnets having the same size are arranged at three rows from side to side along a peripheral direction of the tire in the same direction and at equal intervals every two magnets, and a side of each of these magnets is directed in the peripheral direction of the tire, and distances separated between these magnets in the peripheral direction of the tire and in the widthwise direction of the tire are not more than 100 mm, respectively, and directions of magnetic poles of these six magnets are opposed to each other even between the adjacent magnets in the peripheral direction of the tire and in the widthwise direction of the tire, and magnetic sensors are arranged on lines passing through centers of two rectangles formed by mutually adjacent four sheet-shaped magnets under no action of external force to the tire and extending inward and outward in a radial direction in correspondence to each of these rectangles.

(17) In the apparatus for measuring forces acted upon a tire according to the invention described in any one of the items (7) to (16), the magnet or the magnetic sensor is indirectly attached to an outer peripheral face of a rim through a fitting jig and at a position separated outward from the outer peripheral face of the rim in a radial direction of the tire.

(18) In the apparatus for measuring forces acted upon a tire according to the invention described in the item (17), the fitting jig is a stay or an annular body going round the periphery of the rim.

(19) In the apparatus for measuring forces acted upon a tire according to the invention described in the item (17) or (18), which further comprises an adjusting means for adjusting a distance of the magnet or the magnetic sensor separated from the outer peripheral face of the rim, and an operating means for actuating the adjusting means arranged inward in the radial direction of the tire.

BRIEF DESCRIPTION OF THE DRAWINGS

FIG. 8 is a system constitution view illustrating a force measuring system for measuring forces by using the method for measuring forces acted upon the tire according to the above embodiment.

FIG. 9 is a graph showing time changes of a peripheral component and a radial component in a magnetic flux density detected by a magnetic sensor.

FIG. 14 is a graph showing a time change of a peripheral component of a magnetic flux density detected by a magnetic sensor.

FIG. 30 is a graph showing a relation between a change of a radial component in a magnetic flux density and a direction φ.

BEST MODE FOR CARRYING OUT THE INVENTION

Figure 1:
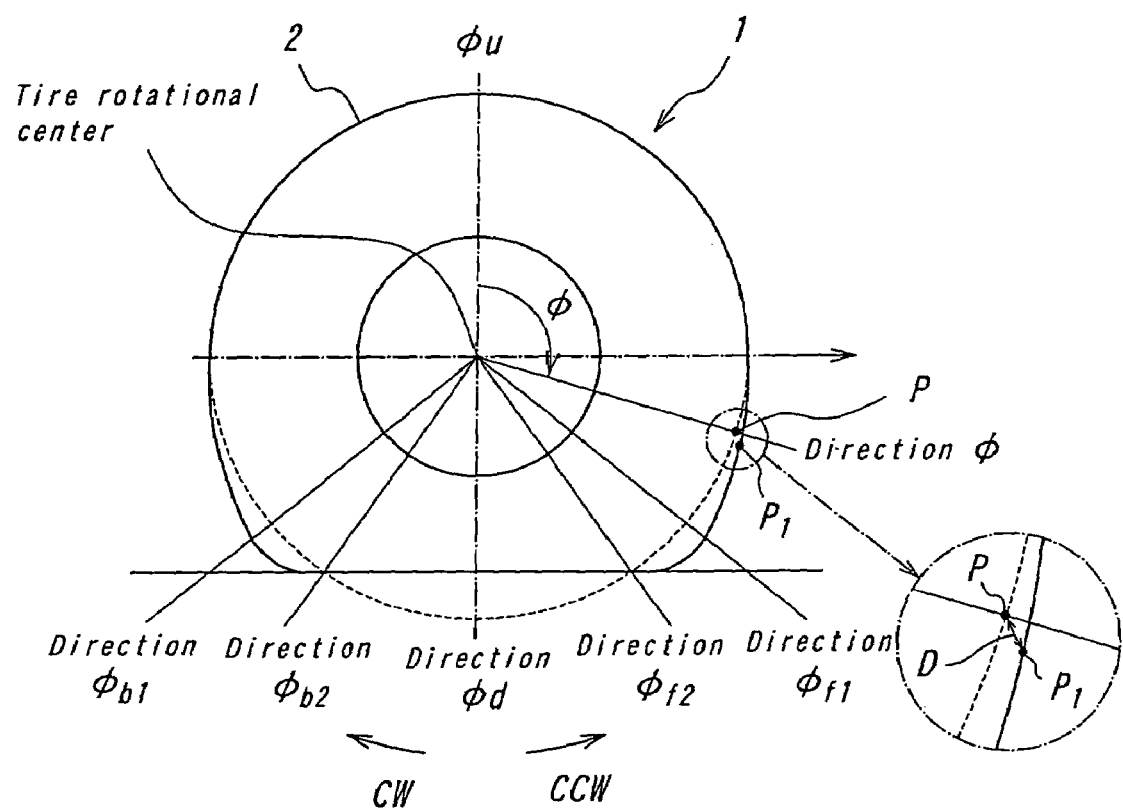
FIG. 1 is a front view of a tire showing a point on a tread portion and a direction of this point.

The method for measuring forces acted upon a tire according to the invention determines forces acted upon the tire from a time change of displacement of a point P on a tread portion of the tire under the rotation of the tire, and a principle thereof is described below. FIG. 1 is a schematically front view of a tire explaining a displacement D in a direction $\phi$ of a given point P located on an inner peripheral face of a tread portion 2 of a tire 1 at a center in a widthwise direction of the tire. The direction $\phi$ of the point P means that a coordinate component in a peripheral direction of the tire at a position of the point P represented by a polar coordinate taking a tire rotational center O as an original point is shown by a given standard direction, for example, a peripheral angle from a direction $\phi$ just above an axis. The displacement D of the point P in the direction $\phi$ means a physical amount when the point P at a center of an inner peripheral face of the tread portion in the direction $\phi$ defined in the tire 1 at a state of contacting no portion with a road surface, i.e. under no action of external force moves to a point $P_1$ under an action of external force to a ground contact face of the tire by contacting the tire with the road surface and a difference of position between the point P and the point $P_1$ is shown by vector.

At first, it is considered a state that only a force R in a radial direction of the tire is applied to the ground contact face of the tire 1 and a force T in a peripheral direction of the tire is not applied if it is intended to rotate the tire 1. In this state, when the point P is existent in a zone ranging from a direction $\phi_{f1}$ to a direction $\phi_{b1}$ toward a direction CCW, the point P is not subjected to an influence of force from the ground contact face and hence a magnitude of the displacement D is zero. On the other hand, when the point P is existent in a zone positioning on the ground contact face, i.e. a zone ranging from $\phi_{b2}$ to $\phi_{f2}$ toward the direction CCW, the ground contacting portion of the tire is pushed by the road surface to approach to the tire rotational center and widen in the peripheral direction, so that a radial component Dr of the displacement D of the point P is directed toward the inside and becomes maximum when the point P locates at a direction $\phi_d$, while a peripheral component D$\theta$ is zero when the point P is the direction $\phi_d$, but when the point P is existent in other directions, a force of widening the ground contact face outward in the peripheral direction is acted to cause the displacement in such a direction. Further, the point P existing in a non-contact portion of the tire 1 adjacent to the ground contact face, i.e. zones ranging from $\phi_{f2}$ to $\phi_{f1}$ and from $\phi_{b1}$ to $\phi_{b2}$ toward the direction CCW is subjected to an influence of a force acted to the ground contact face to cause the same displacement D as mentioned above.

Figure 2A:
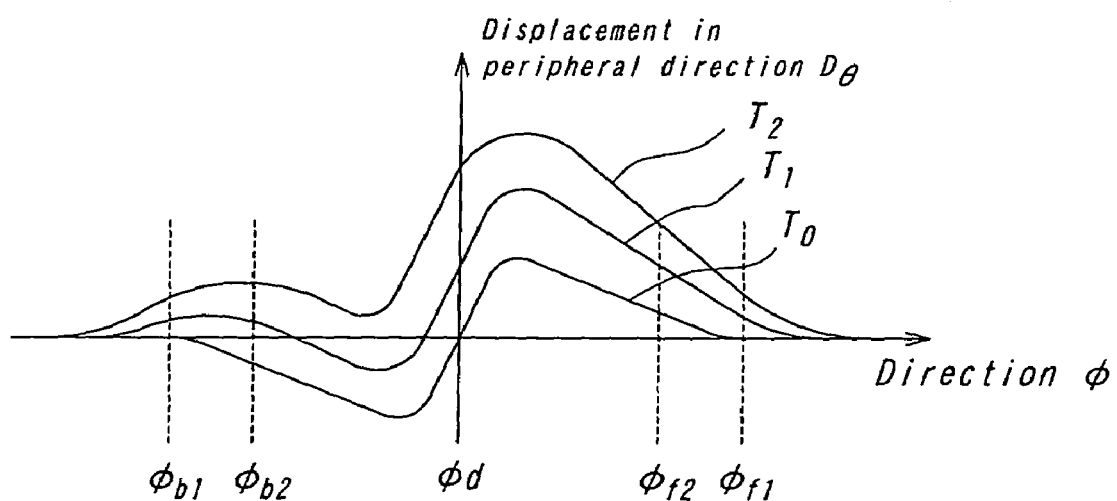
FIG. 2 is a graph showing a relation between peripheral component and radial component of a displacement of a point on a tread portion and a direction φ thereof.
Figure 2B:
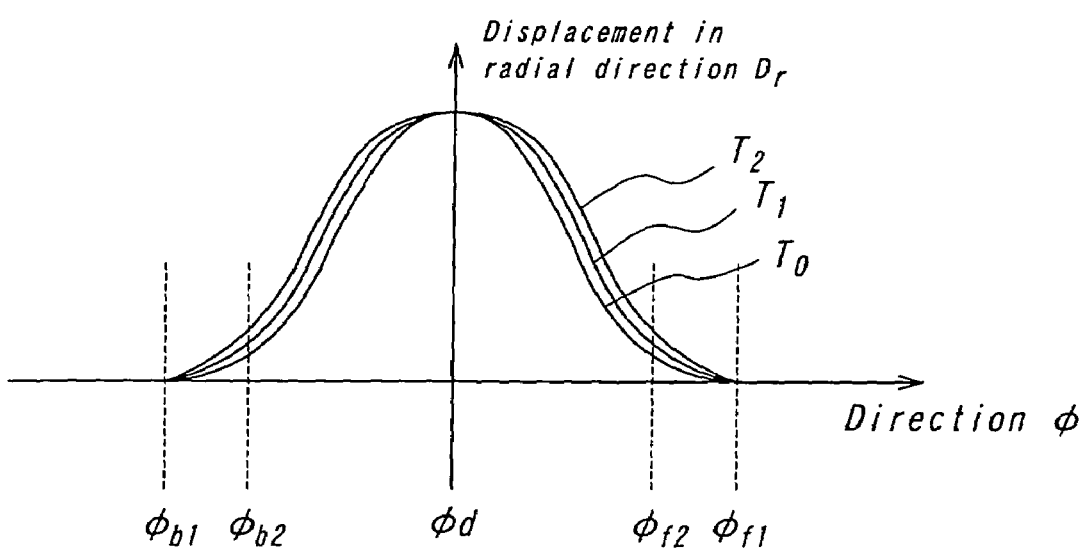

FIGS. 2a and 2b are graphs showing a relation between peripheral component D$\theta$ and radial component Dr of displacement D and direction $\phi$, in which an abscissa is the direction $\phi$ and an ordinate is components D$\theta$, Dr, respectively. The positive and negative of each of these components are as follows. That is, as to the radial component Dr, a direction toward the tire rotational center is positive, and as to the peripheral component D$\theta$, the direction CCW toward anticlockwise rotation is positive. Also, the displacement D in case of assuming that a force rotating the tire 1 is zero as mentioned above is shown by a curve T0 in FIGS. 2a and 2b.

In addition to the action of the force R in the radial direction of the tire shown by T0, when a torque rotating the tire 1 in a clockwise direction is applied to the tire 1 to act a force T1 in the peripheral direction of the tire from the road surface to the ground contact face of the tire 1 in an anticlockwise rotation, the displacement D is represented by a curve T1 in FIGS. 2a, 2b, which is a value obtained by adding the above displacement shown by the curve T0 with a displacement of anticlockwise rotation produced over a whole of the ground contact face resulted from the force T1 in the peripheral direction of the tire. Moreover, when the force in the peripheral direction of the tire is a value T2 larger than T1, the displacement D is represented by a curve T2 in FIGS. 2a, 2b. From these facts, it is understood that the force T in the peripheral direction of the tire acting to the ground contact face of the tire hardly exerts an influence on the radial component Dr of the displacement D, but increases or decreases substantially uniformly the peripheral component D$\theta$ of the displacement over the whole of the ground contact face, and the degree of increase or decrease is proportional to the magnitude of the force T in the peripheral direction of the tire.

Figure 3A:
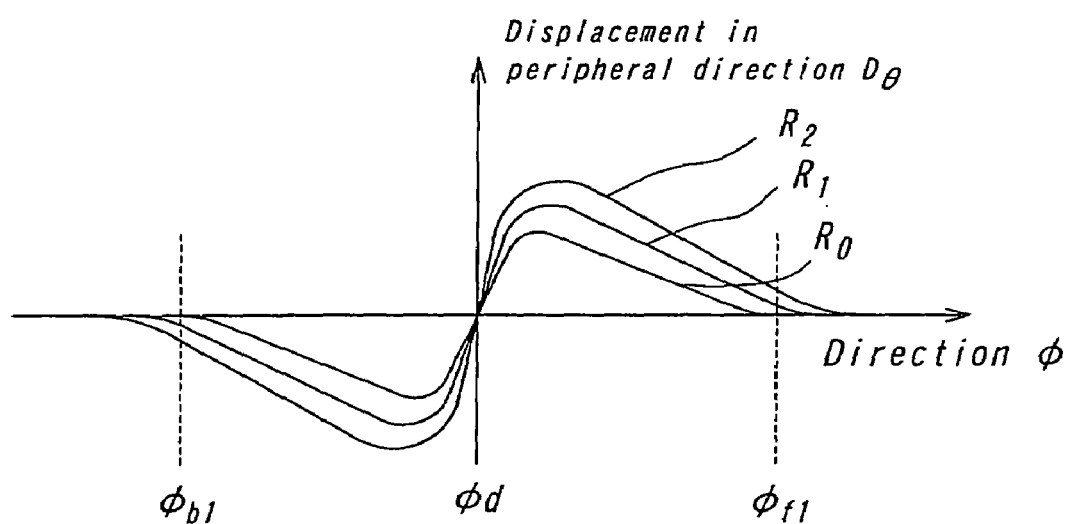
FIG. 3 is a graph showing a relation between peripheral component and radial component of a displacement of a point on a tread portion and a direction φ thereof.
Figure 3B:
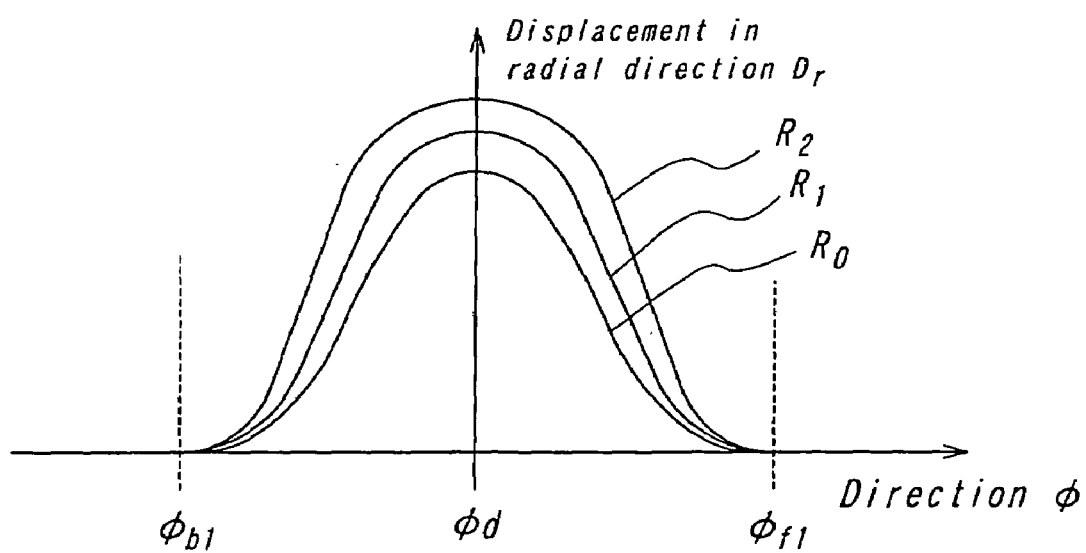

The above is explained with respect to the influence of the force T in the peripheral direction of the tire upon the displacement D of the point P. Then, an influence of a force R in the radial direction of the tire is considered. FIGS. 3a and 3b show changes of peripheral component D$\theta$ and radial component Dr in the displacement D of the point P when the force R in the radial direction of the tire is changed at a state that the force T in the peripheral direction of the tire acting to the tire 1 is zero, in which an abscissa is a direction $\phi$ and an ordinate is each of the components D$\theta$, Dr in the displacement and curves R0, R1, R2 correspond to cases that the force R in the radial direction of the tire acting to the tire is R0, R1 and R2, respectively, and the magnitude of the force R in the radial direction of the tire is smallest in R0 and largest in R2. As seen from FIGS. 3a and 3b, the peripheral component D$\theta$ and radial component Dr in the displacement of the point P change substantially in proportion to the magnitude of the force R in the radial direction of the tire.

In summary, the peripheral component D$\theta_\phi$ and radial component Dr$_\phi$ of the displacement D in the direction $\phi$ can be represented by equations (1) and (2) using the force R in the radial direction of the tire and the force T in the peripheral direction of the tire acting to the ground contact face.

$$D\theta_\phi = M1(\phi) \cdot R + N1(\phi) \cdot T \qquad (1)$$

$$Dr_\phi = M2(\phi) \cdot R + N2(\phi) \cdot T \qquad (2)$$

In this case, M1($\phi$), N1($\phi$), M2($\phi$) and N2($\phi$) are proportional constants defined by the direction $\phi$, respectively. As previously mentioned, the displacement Dr in the radial direction is hardly subjected to the influence of the force T in the peripheral direction, so that N2($\phi$) is approximately zero.

If values $D\theta_{\phi 1}$ and $D\theta_{\phi 2}$ of $D\theta$ with respect to specified two directions $\phi 1$ and $\phi 2$ are gotten from the above, the force R in the radial direction of the tire and the force T in the peripheral direction of the tire can be calculated back according to the following equations (3) and (4) using $M1(\phi 1)$, $N1(\phi 1)$, $M1(\phi 2)$ and $N1(\phi 2)$ previously determined by experiments or the like, and also if value $Dr_{\phi 3}$ of Dr with respect to a specified direction $\phi 3$ is gotten, the force R in the radial direction of the tire can be calculated back according to the following equation (5) using $M2(\phi 3)$ previously determined by experiments or the like.

$$R = (N1(\phi 2) \cdot D\theta_{\phi 1} - N1(\phi 1) \cdot D\theta_{\phi 2})/MM \quad (3)$$

$$T = (M1(\phi 1) \cdot D\theta_{\phi 2} - M1(\phi 2) \cdot D\theta_{\phi 1})/MM \quad (4)$$

$$R = Dr_{\phi 3}/M2(\phi 3) \quad (5)$$

provided that $MM = (M1(\phi 1) \cdot N1(\phi 2) - M1(\phi 2) \cdot N1(\phi 1))$ (6).

In the above explanation, the displacement D of the point P is defined as a deviance from a phantom position under no action of external force produced by the action of external force, but the measurement thereof is practically difficult. For this end, a point that a relative displacement to the phantom position is zero even if the tire is rotated under the action of external force, i.e. a relative displacement to a point Q on a rim capable of approximating as a rigid body is measured instead of the deviance of the point P from the phantom position, whereby the displacement of the point P can be determined. Therefore, the "displacement D of the point P" in the above explanation can be rephrased to "relative displacement to point Q on the rim". As the point Q is taken a point on an outer peripheral face of the rim located at the same radius of the point P, at where a sensor detecting the displacement of the point P can be arranged.

The invention determines the force R in the radial direction of the tire and the force T in the peripheral direction of the tire acted upon the tire from the above-measured displacement $D\theta_{\phi \text{ or } Dr\phi}$ in the given direction $\phi$ using the known modulus of elasticity. In all of the following embodiments, the force R or T acted upon the tire is determined by magnetically measuring displacement $D\theta$ or $Dr$.

Figure 4:
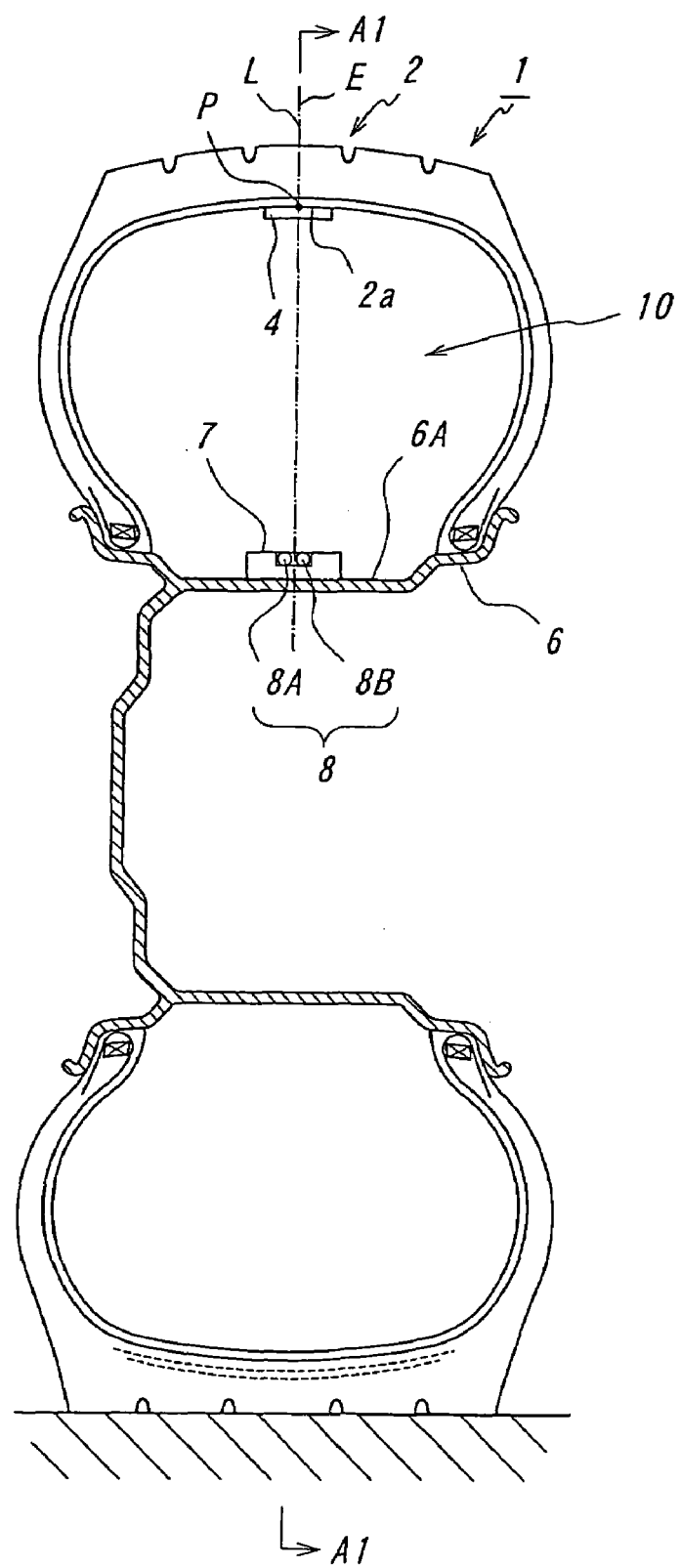
FIG. 4 is a section view of a tire used in a method for measuring forces acted upon the tire according to a first embodiment of the invention.
Figure 5:
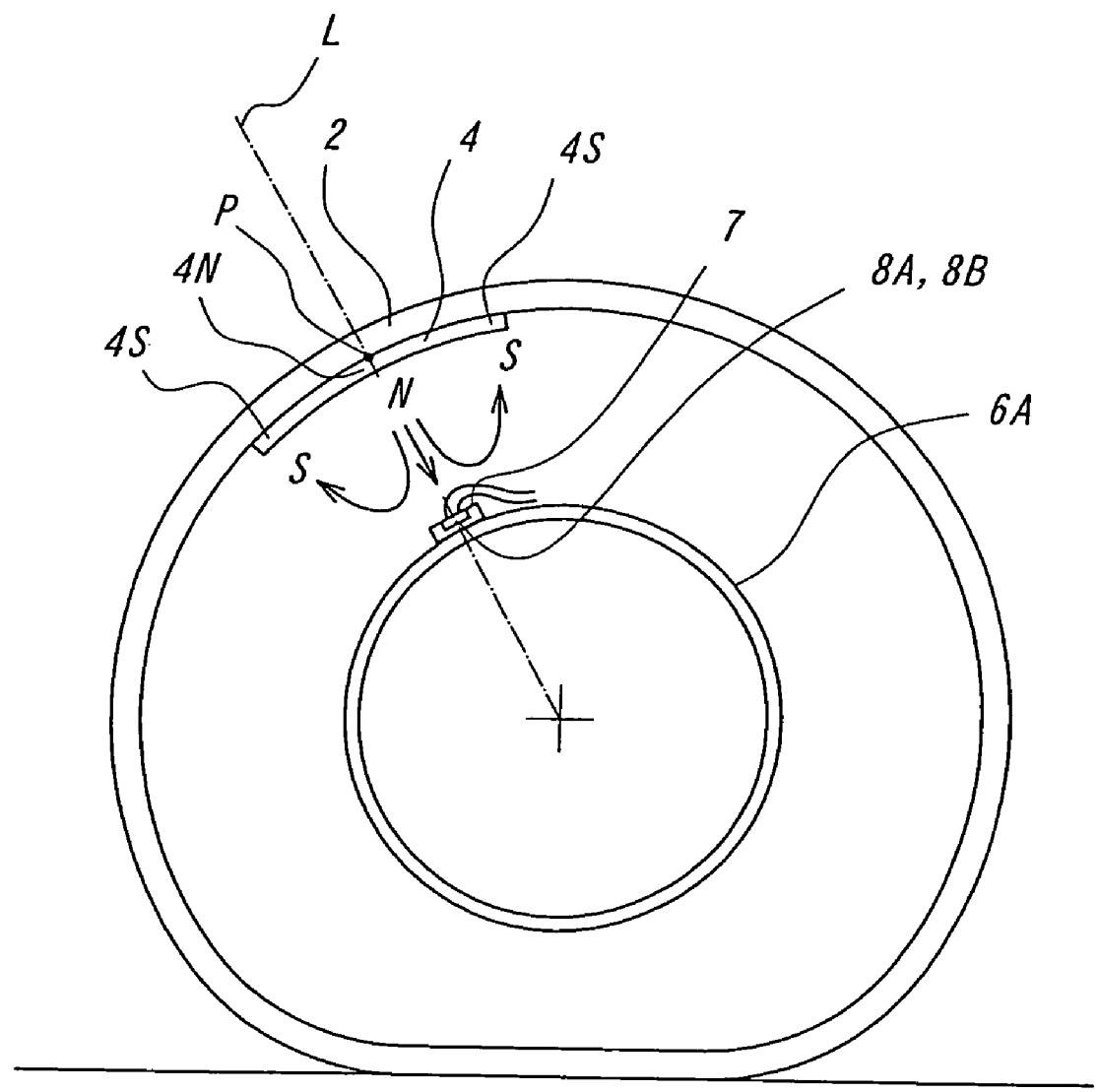
FIG. 5 is a section view of a tire showing a section A1-A1 of FIG. 4.

A first embodiment is described with reference to FIGS. 4-9. FIG. 4 is a view showing a section of a tire 1 at a meridional plane of the tire, and FIG. 5 is a section view corresponding to an arrow A1-A1 of FIG. 4. To a widthwise central portion of an inside face of a tread portion in a radial direction of the tire or an inner peripheral face of the tire is attached one rectangular sheet-shaped magnet 4, while a magnetic sensor 8 is fixed to a widthwise central portion of an outside face of a rim well portion 6A of a rim 6 in the radial direction of the tire. The magnet 4 is arranged so as to extend a longitudinal direction of the rectangle into a peripheral direction of the tire and to position a center of the rectangle to a point P on the inner peripheral face of the tire on a straight line L passing through a center of a detecting portion of the magnetic sensor 8 and extending inward and outward in the radial direction of the tire. An apparatus 10 for measuring forces acted upon the tire is constituted with the magnet 4 and the magnetic sensor 8.

The magnetic sensor 8 is comprised of a sensor 8A detecting a radial component Hr of a magnetic field emitted from the magnet 4 and a sensor 8B detecting a peripheral component H$\theta$. To the rim 6 is attached a transmitting device 7 for treating signals input from the magnetic sensor 8 through a junction line and a connector (not shown) and transmitting to a receiving device disposed on a vehicle body.

At both ends of the magnet 4 extending into the peripheral direction of the tire are formed magnetic poles of the same polarity and a magnetic pole of a polarity opposite to those of both the ends is formed at a central portion in the longitudinal direction. In the illustrated embodiment, for example, magnetic poles 4S of S-pole are formed at both the ends and a magnetic pole 4N of N-pole is formed at the central portion. According to the magnet having such a construction, a magnetic field is formed so that a magnetic force line distribution forms a plane symmetry with respect to a meridional plane including the point P or a plane including the straight line L and perpendicular to paper in FIG. 5.

In the above apparatus 10 for measuring forces acted upon the tire, when force is applied to a ground contact face of the tire 1 to cause the aforementioned displacement D in the point P attached with the magnet 4, a relative position of the magnetic pole 4N to the magnetic sensors 8A, 8B fixed to the rim 6 also changes only by the displacement D, and as a result, peripheral component H$\theta$ and radial component Hr of the magnetic field formed by the magnet 4 to be detected by the magnetic sensors 8A, 8B change.

When the displacement D of the point P is zero, the magnetic force lines direct into the radial direction at the positions of the magnetic sensors 8A, 8B, so that H$\theta$ is zero and Hr becomes a given value Hr0, and hence changes $\Delta H\theta$ and $\Delta Hr$ of peripheral component H$\theta$ and radial component Hr of magnetic flux density after the displacement of the point P to those before the displacement can be represented by the following equations:

$$\Delta H\theta = H\theta = A1 \cdot D\theta + B1 \cdot Dr \quad (7)$$

$$\Delta Hr = Hr0 - Hr0 = A2 \cdot D\theta + B2 \cdot Dr \quad (8)$$

wherein A1, B1, A2 and B2 can be approximated as a constant because they are not large in the displacement.

The magnetic sensors 8A, 8B are disposed on the straight line L opposite to the front of the magnetic pole 4N, so that the displacement of the magnetic pole 4N approaching to or separating apart from the magnetic sensors 8A, 8B along the straight line L, or the peripheral component H$\theta$ of the magnetic flux density is hardly influenced even if Dr increases or decreases, and also the displacement moving the magnetic pole 4N on the periphery of the same radius into the peripheral direction, or radial component Hr of the magnetic flux density at the magnetic sensors 8A, 8B is hardly influenced even if D$\theta$ increases or decreases, and hence A2 and B1 in the above equations can be approximated to zero. As a result, they can be represented by the following equations (9) and (10):

$$\Delta H\theta = A1 \cdot D\theta \quad (9)$$

$$\Delta Hr = B2 \cdot Dr \quad (10)$$

Figure 6A:
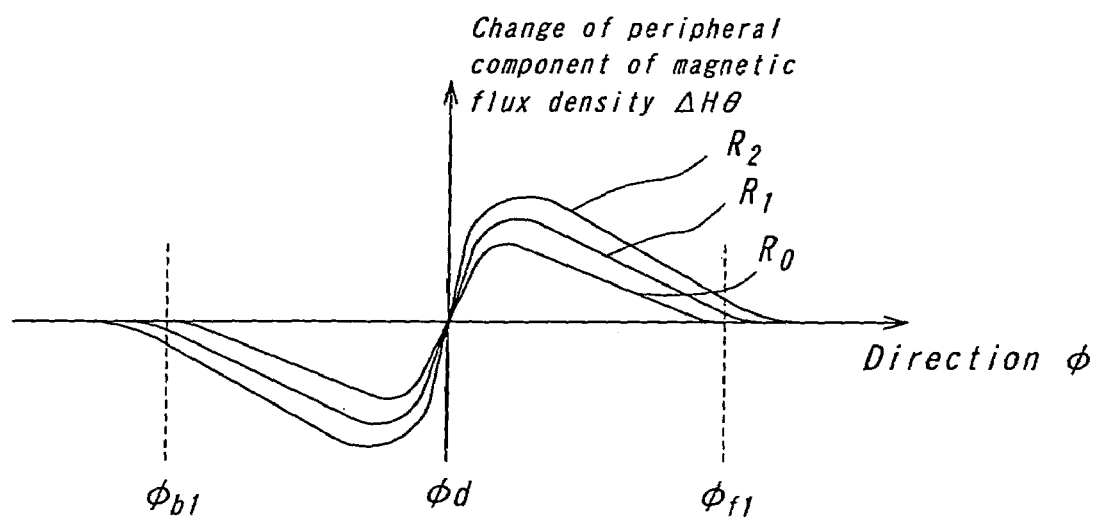
FIG. 6 is a graph showing a relation between a change of a peripheral component in a magnetic flux density and a direction φ.
Figure 6B:
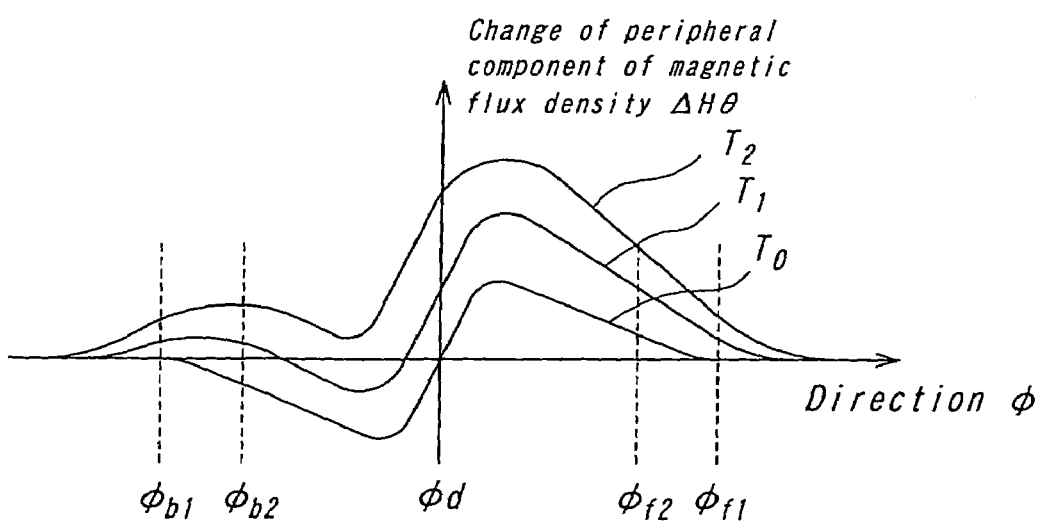
Figure 7A:
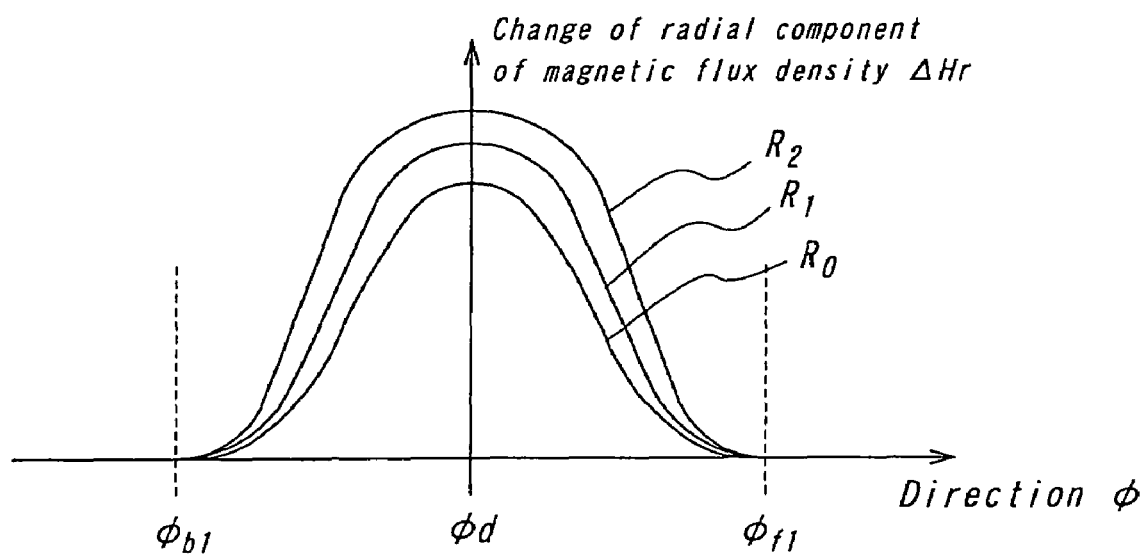
FIG. 7 is a graph showing a relation between a change of a radial component in a magnetic flux density and a direction φ.
Figure 7B:
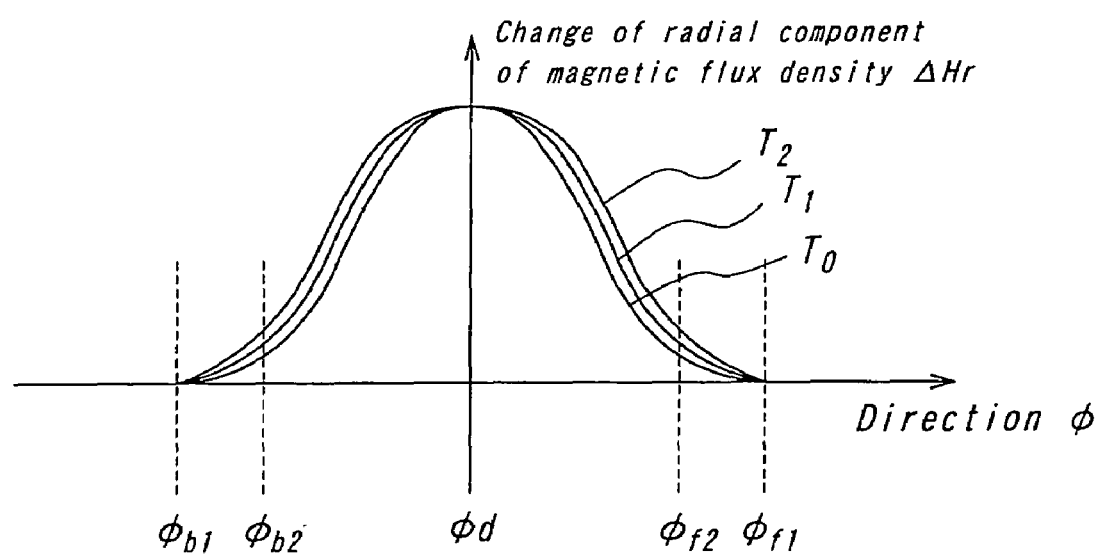

As seen from the equations (9) and (10), $\Delta H\theta$ is proportional to $D\theta$ and $\Delta Hr$ is proportional to Dr, so that graphs showing dependencies of $\Delta H\theta$ and $\Delta Hr$ to force R in the radial direction and force T in the peripheral direction from FIGS. 2, 3 are shown in FIGS. 6 and 7, respectively. FIGS. 6a and 6b are graphs showing dependencies of a change $\Delta H\theta$ of the peripheral component of the magnetic flux density upon the force R in the radial direction when the force T in the peripheral direction is zero and upon the force T in the peripheral direction when the force r in the radial direction is a constant value R0, respectively, and FIGS. 7a and 7b are graphs showing dependencies of a change $\Delta Hr$ of the radial component of the magnetic flux density upon the force R in the radial direction when the force T in the peripheral direction is zero and upon the force T in the peripheral direction when the force R in the radial direction is a constant value R0, respectively.

The following equations (11) to (14) can be obtained by substituting the equations (9) and (10) for the equations (3) to (5), from which it is understood that the force R in the radial direction of the tire and the force T in the peripheral direction of the tire can be determined from the changes $\Delta H\theta_{\phi 1}$ and $\Delta H\theta_{\phi 2}$ of the peripheral component of the magnetic flux density obtained on two different directions $\phi 1$ and $\phi 2$, while the force R in the radial direction of the tire can be determined from the change $\Delta Hr_{\phi 3}$ of the radial component of the magnetic flux density obtained on a given direction $\phi 3$.

$$R=(N1(\phi 2)\cdot \Delta H\theta_{\phi 1}-N1(\phi 1)\cdot \Delta H\theta_{\phi 2})/NN \quad (11)$$

$$T=(M1(\phi 1)\cdot \Delta H\theta_{\phi 2}-M1(\phi 2)\cdot \Delta H\theta_{\phi 1})/NN \quad (12)$$

$$R=\Delta Hr_{\phi 3}/(B2\cdot M2(\phi 3)) \quad (13)$$

provided that $NN=A1\cdot MM$ (14)

The above is described with respect to the generalized principle of the method for measuring the force R in the radial direction and/or the force T in the peripheral direction acting upon the tire 1 from the change of the magnetic flux density in the peripheral direction or the radial direction detected by the magnetic sensor 8A or 8B. Instead of $\phi 1$, $\phi 2$ and $\phi 3$ used as the above specified direction $\phi$ can be used direction $\phi$max corresponding to a maximum value of a peripheral change of the magnetic density, direction $\phi$min corresponding to a minimum value of the peripheral change of the magnetic density and direction $\phi$max1 corresponding to a maximum value of a radial change of the magnetic density, respectively. For example, $\phi$max and $\phi$min change in accordance with the acting forces R and T and are not constant values, but if the forces R and T are decided, values of magnetic density components $\Delta H\theta_{\phi max}$ and $\Delta H\theta_{\phi min}$ corresponding to these directions are primarily defined, and hence R and T can be calculated back from the values of $\Delta H\theta_{\phi max}$ and $\Delta H\theta_{\phi min}$. In this case, even when the directions $\phi$max, $\phi$min and $\phi$max1 are not specified by the measurement, $\Delta H\theta_{\phi max}$, $\Delta H\theta_{\phi min}$ and $\Delta Hr_{\phi max1}$ can be specified by holding values of peaks as a peak value of the change of each component of the magnetic flux density, and the measurement of the direction can be made useless.

When the specified values are set instead of $\phi 1$ to $\phi 3$ as mentioned above, as seen from FIG. 2a, if the force T in the peripheral direction of the tire is zero, the peripheral component D$\theta$ of the displacement D forms a displacement distribution symmetrical with respect to a ground contact center in the peripheral direction of the tire to establish the following equation (15), and also if the force T in the peripheral direction is acted, the peripheral component D$\theta$ of the displacement D in directions $\phi$max and $\phi$min symmetrical with respect to the ground contact center in the peripheral direction of the tire is rendered into a sum of adding a displacement in the peripheral direction of the tire of the same amount in the same direction to establish the following equation (16).

$$M1(\phi max)=-M1(\phi min) \quad (15)$$

$$N1(\phi max)=N1(\phi min) \quad (16)$$

Also, the following equations (17) and (18) can be obtained by substituting the equations (15) and (16) for the equations (11) and (12).

$$R=(\Delta H\theta_{\phi max}-\Delta H\theta_{\phi min})/AA \quad (17)$$

$$T=(\Delta H\theta_{\phi max}+\Delta H\theta_{\phi min})/AA \quad (18)$$

$$R=\Delta Hr_{\phi max1}/(B2\cdot M2(\phi max1)) \quad (19)$$

provided that $AA=2\cdot A1\cdot M1(\phi max)\cdot N1(\phi max)$ (20)

Although the above is described with respect to the principle of the method for determining the force R in the radial direction of the tire and the force T in the peripheral direction of the tire acting to the tire from changes of magnetic flux densities detected by the magnetic sensors 8A, 8B fixed to the rim 6 when the tire 1 is rotated once, a system for obtaining friction coefficient on road surface used in ABS from time changes of magnetic flux densities actually detected by the magnetic sensors 8A, 8B is described with reference to FIGS. 8-9.

FIG. 8 is a system construction view illustrating a construction example of a force measuring system 19 in which a force is measured by the method for measuring forces acted upon the tire according to the above embodiments and the measured value of the force is output onto ABS in real time. The force measuring system 19 comprises a transmitting device 7 disposed on a rim 6 of each wheel in a vehicle 5 and a receiving device 12 disposed on a vehicle body side of the vehicle 5. The transmitting device 7 comprises a transmission side CPU 9 for reading values of magnetic flux densities detected by a pair of magnetic sensors 8 in a given sampling time and calculating maximum value and minimum value of the change of these magnetic flux densities, and a transmission antenna 11 for receiving the calculated maximum value and minimum value from the transmission side CPU 9 and transmitting them to the receiving device 12. Also, the receiving device 12 comprises a receiving antenna 13 for receiving signals from the transmission antenna 11, and a receiving side CPU 14 for calculating forces acted upon the tire according to the above principle based on the maximum value and minimum value of the change of the magnetic flux densities and outputting the calculated results to ABS 18.

A method for determining maximum value and minimum value from changes of magnetic flux densities of respective components detected by the pair of the magnetic sensors 8 is as follows. FIG. 9a shows a time change $\Delta H\theta$ of a peripheral component of the magnetic flux density detected by the magnetic sensor 8A during the running of the vehicle, and FIG. 9b shows a change $\Delta Hr$ of a radial component of the magnetic flux density detected by the magnetic sensor 8B. When the magnetic sensor 8 locates at a position separated apart from the ground contact face, $\Delta H\theta$ is zero. While, when the magnetic sensor 8 passes through the ground contact face or through a zone in the vicinity thereof, as seen from FIGS. 6-7, the peripheral component $\Delta H\theta$ of the magnetic flux density appears as a pattern K. In this pattern K, $\Delta H\theta$ starts from zero and takes a minimum value $\Delta H\theta_{\phi min}(1)$ and then $\Delta H\theta_{\phi max}(1)$ with the lapse of time t. Although the maximum value may appear at two places in the pattern K, the maximum value appearing after the minimum value $\Delta H\theta_{\phi min}(1)$ is only one place, which is $\Delta H\theta_{\phi max}(1)$. Then, the forces acting to the tire during one rotation of the tire can be determined based on the aforementioned principle from a pair of $\Delta H\theta_{\phi min}(2)$ and $\Delta H\theta_{\phi max}(2)$ and a pair of $\Delta H\theta_{\phi min}(3)$ and $\Delta H\theta_{\phi max}(3)$ successively appearing every one rotation of the tire.

Moreover, the values of $\Delta H\theta_{\phi max}$ and $\Delta H\theta_{\phi min}$ can be specified as inflection points of maximum and minimum by reading values of $\Delta H\theta$ at a given sampling time and comparing the read values with values read immediately prior to the reading. In the embodiments of the invention, it is important that these maximum value and minimum value can be specified irrespectively of a vehicle speed. That is, even if the time required for the one rotation of the tire is T1 or T2, $\Delta H\theta_{\phi max}$ and $\Delta H\theta_{\phi min}$ can be specified without measuring a period of the time, so that the system can be constructed simply in a high precision without measuring a rotating speed of a wheel and using the rotating speed of the wheel in the calculation treatment of the forces. Similarly, maximum values $\Delta Hr_{\phi max1}(1)$, $\Delta Hr_{\phi max1}(2)$ and $\Delta Hr_{\phi max1}(3)$ of the radial component of the magnetic flux densities shown in FIG. 9b can be determined every one rotation of the tire.

In the above case, a pair of the magnet 4 and the magnetic sensor 8 arranged on one straight line extending inward and outward in the radial direction of the tire is one pair on the tire 1, but it may be disposed at two or more places on the periphery within a range not causing an interference of magnetic force to each other, whereby it is possible to shorten the measuring period and conduct the measurement of forces in a higher precision.

In the invention, the sheet-shaped magnet 4 attached to the tire 1 is preferable to have a flexibility provided by mixing and dispersing magnetic powder of ferrite or a rare earth magnetic body such as samarium-cobalt, iron-neodymium-boron or the like with rubber or a resin. Thus, the magnet 4 can be deformed following to the deformation of the tire, whereby the breakage of the magnet 4 or the peeling from the tire 1 can be prevented and also the breakage due to vibrations through the running vehicle or shocks can be prevented.

As the magnetic sensor 8A, 8B, it is preferable to use MI sensor or MR sensor capable of detecting a magnetic flux density of a magnetic field even at a position separated apart from the magnet 4 in a good sensitivity. Moreover, the force R in the radial direction of the tire and the force T in the peripheral direction of the tire can be simultaneously measured by only the 8A detecting the peripheral component among the magnetic sensors 8A and 8B, so that the magnetic sensor 8B used for detecting only the force R in the radial direction of the tire may be omitted, but it can be applied for checking the results measured by the magnetic sensor 8A by using together with the magnetic sensor 8A.

Figure 10:
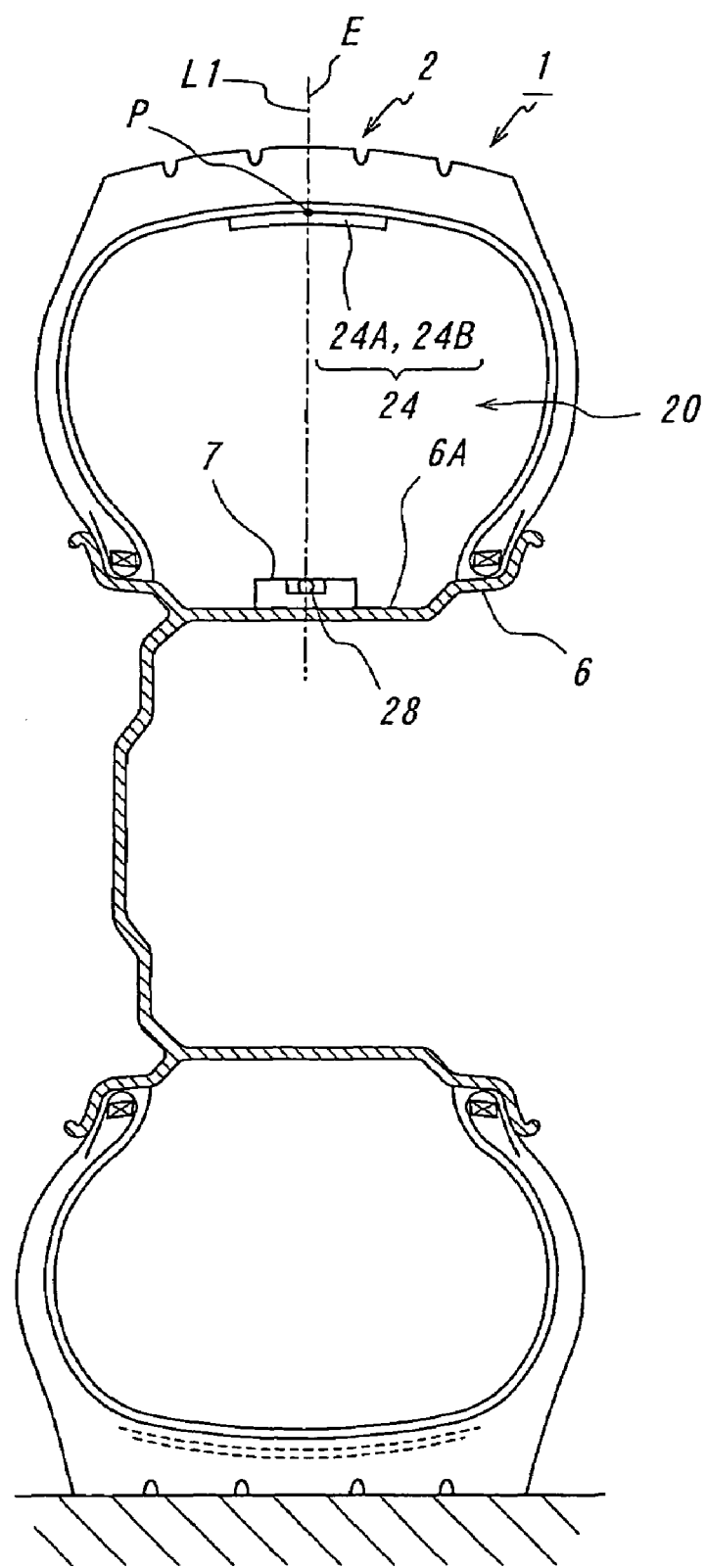
FIG. 10 is a section view of a tire used in a method for measuring forces acted upon the tire according to a second embodiment of the invention.
Figure 11:
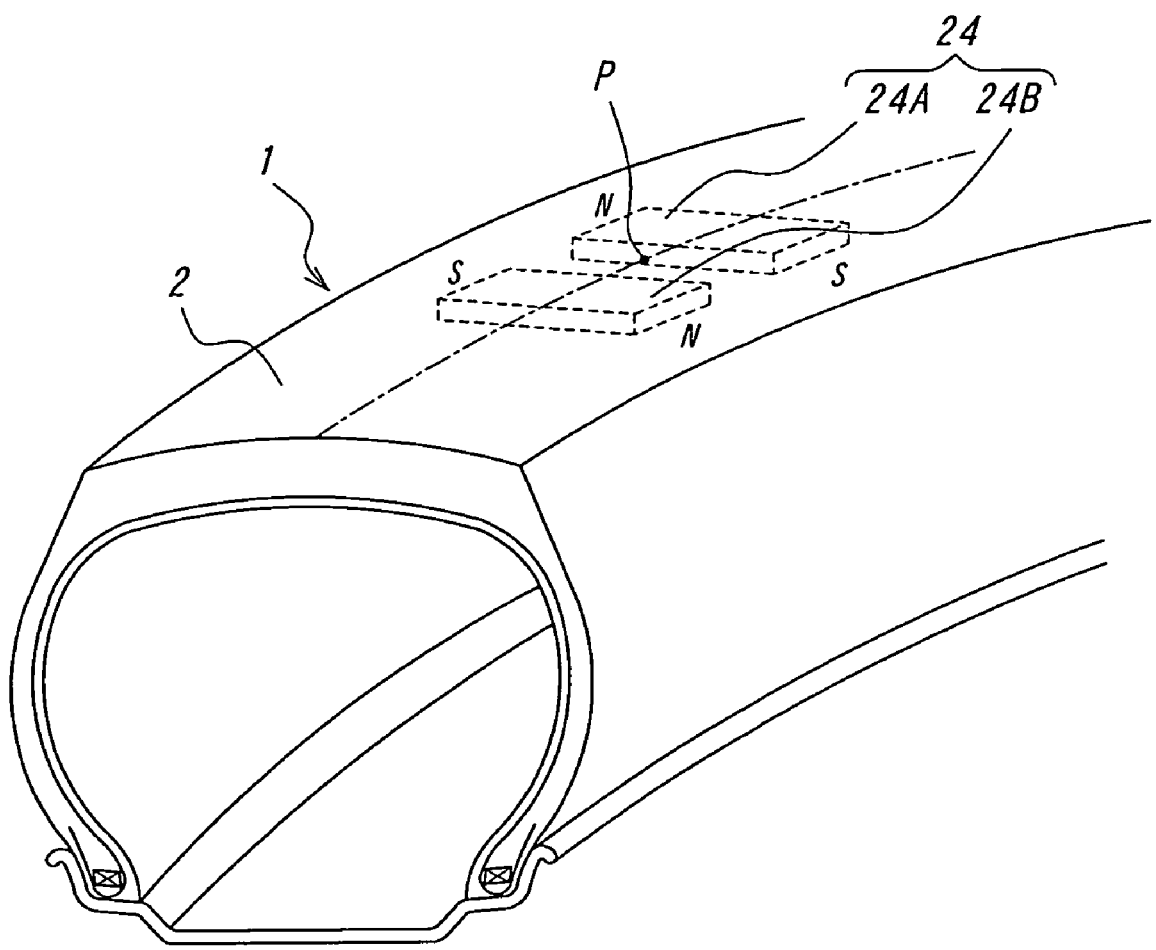
FIG. 11 is a perspective view of a tire illustrating an arrangement of magnets.

Then, a second embodiment of the invention is described with reference to FIGS. 10-14. In these figures, the same parts as in the first embodiment are represented by the same numerals. FIG. 10 is a section view of the tire 1 at a meridional plane of the tire, and FIG. 11 is a perspective view showing an arrangement of sheet-shaped magnets 24A, 24B. To inner surface of a tread portion 2 of the tire 1 in a radial direction of the tire are attached two sheet-shaped magnets 24A, 24B having a flexibility and the same characteristics. These magnets 24A, 24B have magnetic poles having opposite polarities at both ends thereof and are arranged side by side in a peripheral direction of the tire so that the magnetic poles of these magnets are opposite to each other in a widthwise direction of the tire. That is, if N-pole of the magnet 24A locates at left side in the widthwise direction of the tire, N-pole of the magnet 24B locates at right side in the widthwise direction of the tire. These magnets 24A, 24B cooperate with each other to form a magnet 24 forming a magnetic field to be detected. Therefore, the magnet 24 is attached so as to coincide the center thereof with a point P on an inner peripheral face of the tire.

On the other hand, a transmitting device 7 is attached to an outer surface of a rim well portion 6A of a rim 6 in the radial direction of the tire and a magnetic sensor 28 is fixed thereinto at a posture of detecting a magnetic flux density Hz in the widthwise direction of the tire. Under no action of external force to the tire, the magnetic sensor 28 locates on a straight line L1 passing through the point P and extending inward and outward in the radial direction of the tire and is arranged on an equatorial plane E located at a center in the widthwise direction of the tire. The magnet 24 and the magnetic sensor 28 constitute an apparatus 20 for measuring forces acted upon the tire.

Figure 12:
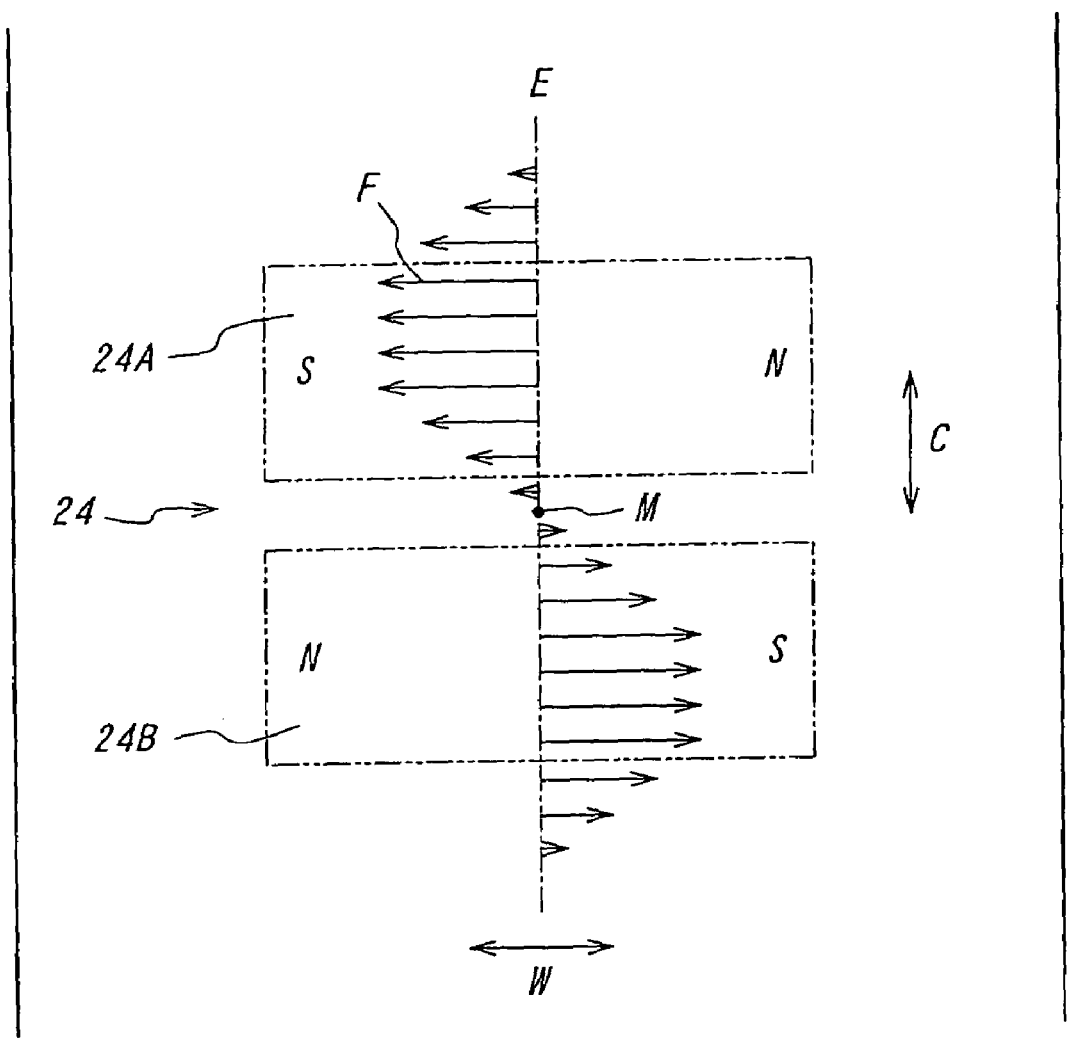
FIG. 12 is a schematically developed view showing a tire widthwise component of a magnetic flux density on an equator at the same height in a radial direction of the tire as that of a magnetic sensor.

FIG. 12 is a schematically developed view showing widthwise component F of a magnetic flux density by arrows in a magnetic field formed by the magnet 24 comprised of the magnets 24A, 24B on a peripheral face having the same height in the radial direction of the tire as in the magnetic sensor 28. In this figure, a point M shows a position of detecting the magnetic field by the magnetic sensor 28. When the displacement D of the point P on the tread portion 2 attached with the magnet 24 is zero, i.e. the action of external force to the tire is none, the center P of the magnet 24 coincides with M. Moreover, symbol C shows a peripheral direction of the tire and symbol W shows the widthwise direction of the tire.

In FIG. 12, when a magnitude of the widthwise component F of the magnetic flux density is shown by a length of the arrow and a direction of F is shown by a direction of the arrow directing from N-pole to S-pole, the widthwise component of the magnetic flux density is left-directing at an inside of the magnet 24A in the radial direction and right-directing at an inside of the magnet 24B in the radial direction, and these directions are reversed in the vicinity of a middle between the magnets 24A and 24B in the peripheral direction. When the displacement of the point on the tread portion 2 attached with the magnet is zero, the widthwise component Hz of the magnetic force lines at the detecting position M of the magnetic sensor 28 is zero.

When the displacement $D\theta$ in the peripheral direction of the tire is caused at the point P, the magnetic field formed by the magnet 24 and the position M of the magnetic sensor are relatively shifted to each other in the peripheral direction. That is, the point M relatively moves to the widthwise component F of the magnetic flux density in a direction perpendicular thereto in FIG. 12, so that the widthwise component Hz of the magnetic flux density detected by the magnetic sensor 28 becomes not zero. Within a range of a usually creatable displacement, a displacement amount $D\theta$ in the peripheral direction and a change $\Delta Hz$ of the widthwise component Hz of the magnetic flux density to a value when $D\theta$ is zero are substantially proportional to each other and the following equation (21) is established. In this case, A3 is a proportional constant and Hz is zero when the displacement is zero, so that $\Delta Hz$ itself shows Hz.

$$\Delta Hz = A3 \cdot D\theta \tag{21}$$

Figure 13A:
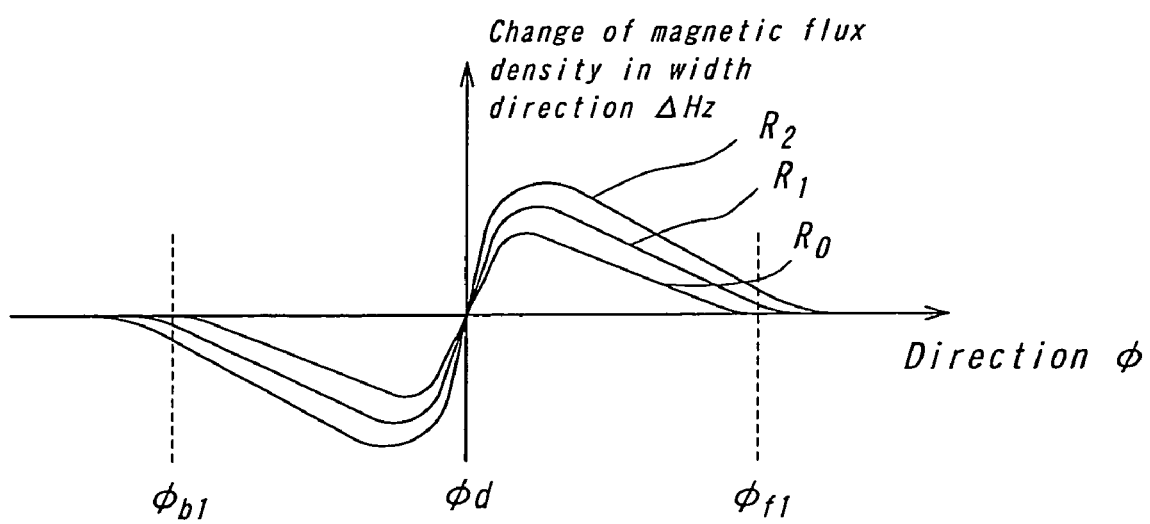
FIG. 13 is a graph showing a relation between a change of a peripheral component of a magnetic flux density and a direction φ.
Figure 13B:
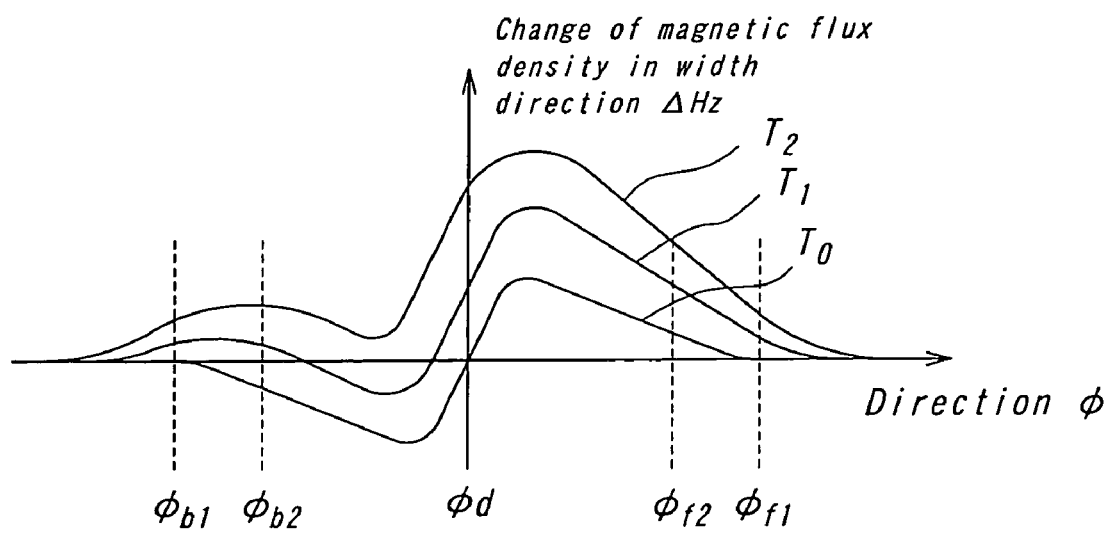

As seen from the case of the first embodiment with reference to FIGS. 2 and 3, a graph showing a dependency of $\Delta Hz$ upon the force R in the radial direction and the force T in the peripheral direction is shown in FIG. 13. FIG. 13a is a graph showing a dependency of the change $\Delta Hz$ of the peripheral component of the magnetic flux density upon the force R in the radial direction (T=0), and FIG. 13b is a graph showing a dependency of $\Delta Hz$ to the force T in the peripheral direction (R=R0).

The force R in the radial direction and the force T in the peripheral direction can be determined from the detected Hz by substituting two values of the detected $\Delta Hz$, i.e. maximum value $\Delta Hz_{\phi max}$ and $\Delta Hz_{\phi min}$ for equations (22)-(24)

derived in the same manner as in the equations (17), (18), (20) used in the explanation of the first embodiment.

$$R=(\Delta Hz_{\phi max}-\Delta Hz_{\phi min})/AA \quad (22)$$

$$T=(\Delta Hz_{\phi max}+\Delta Hz_{\phi min})/AA \quad (23)$$

$$\text{provided that } AA=2 \cdot A3 \cdot M1(\phi max) \cdot N1(\phi max) \quad (24).$$

Moreover, M1(φmax) and N1(φmax) are values determined by the equation (1) in a direction φmax giving a maximum value $\Delta Hz_{\phi max}$.

The construction of the force measuring system in which forces are actually measured based on the method for measuring forces acted upon the tire in the second embodiment and then the measured values of the forces are output to ABS in a real time, and the method for determining maximum value $\Delta Hz_{\phi max}$ and minimum value $\Delta Hz_{\phi min}$ from the change ΔH of the magnetic flux density on the widthwise component detected by the magnetic sensor 28 are the same as in the first embodiment and the detailed explanation thereof is omitted here.

The time change of the magnetic flux densities detected is shown in a graph plotting a time on an abscissa. In general, an influence of earth magnetism is actually developed in results of the above magnetic measurement, so that if this influence is large, it is required to eliminate the influence. Although a direction of the earth magnetism is constant irrespectively of the rotation of the tire, since the magnetic sensor 8, 28 rotates together with the rotation of the tire 1, when the direction of magnetism to be measured is a direction other than the widthwise direction of the tire as in the first embodiment, a waveform of a linear harmony function through the earth magnetism appears. Therefore, the waveform measured by the magnetic sensor 8 in the first embodiment is formed by overlapping the waveform shown in FIG. 9 through the magnetic field formed by the magnet 4 with the waveform of the linear harmony function through the earth magnetism, so that the maximum value and minimum value through the earth magnetism appear in addition to the maximum value and minimum value of the magnetic field through the magnet 4, and hence if the influence of the earth magnetism is large, there is caused a problem on the identification of the maximum value and minimum value.

In the measuring method of the second embodiment, however, the magnetic flux density in the widthwise direction of the tire, i.e. the magnetic flux density in the direction parallel to the rotating axis of the tire is measured, so that the direction measured to the road surface is unchangeable even when the magnetic sensor 28 arrives at any position accompanied with the rotation of the tire, and hence the earth magnetism becomes constant irrespectively of the rotation of the tire and the influence of the earth magnetism is not revealed in the rotation of the tire. Therefore, the identification of the maximum value and minimum value of the widthwise component of the magnetic field of the magnet 24 as it is expected can be carried out by the aforementioned method.

Moreover, the method of the latter embodiment can remove the change of the influence of the earth magnetism accompanied with the rotating position of the tire, but can not eliminate the influence of the earth magnetism changing by the direction of the vehicle or a vehicle running area. If it is required to remove the latter influence, forces acting to the tire not influenced by the earth magnetism can be determined by detecting the position or direction of the vehicle to determine earth magnetism and subtracting the influenced amount from the measured value of the magnetic flux density to conduct the correction thereof.

The formation example of the sheet-shaped magnets 24A, 24B and magnetic sensor 28 used in the second embodiment is the same as in the first embodiment and the detailed explanation thereof is omitted here.

Figure 15:
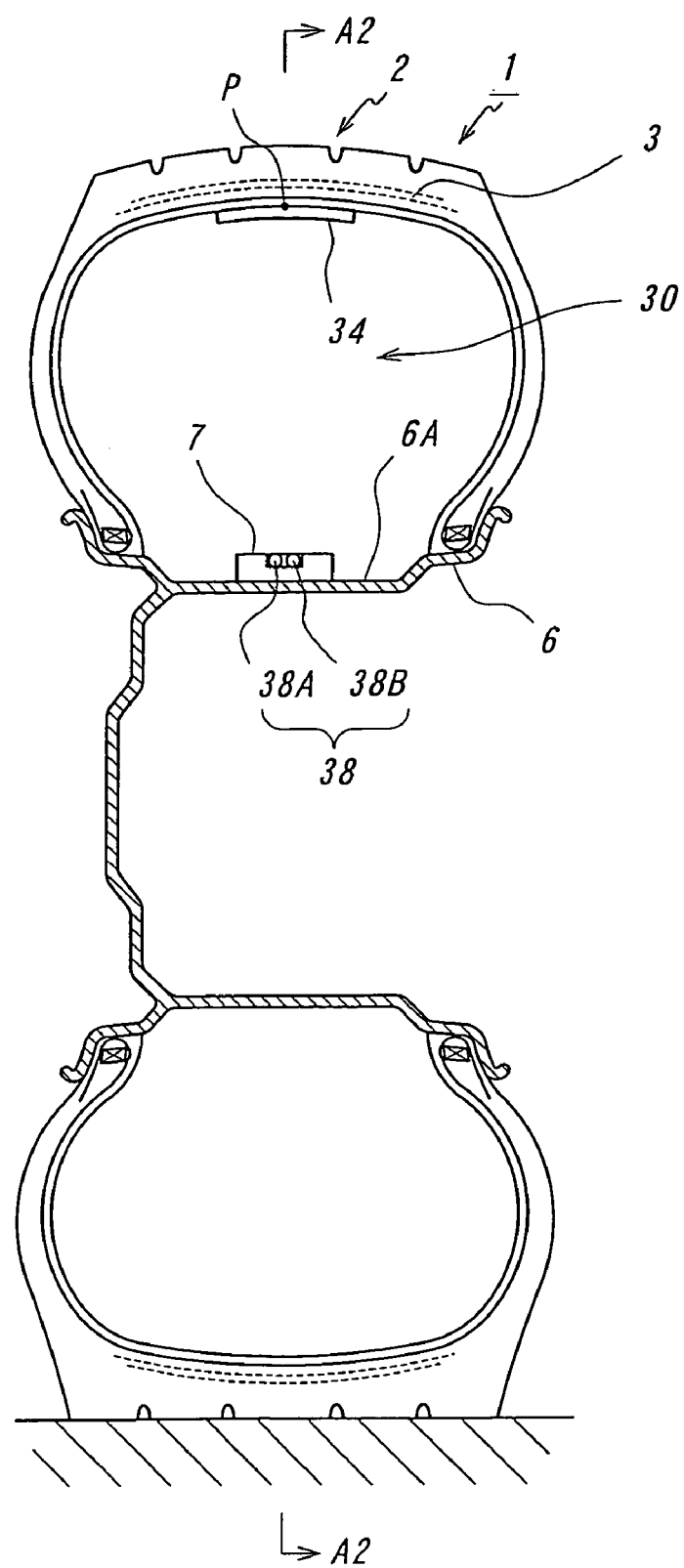
FIG. 15 is a section view of a tire used in a method for measuring forces acted upon the tire according to a third embodiment of the invention.
Figure 16:
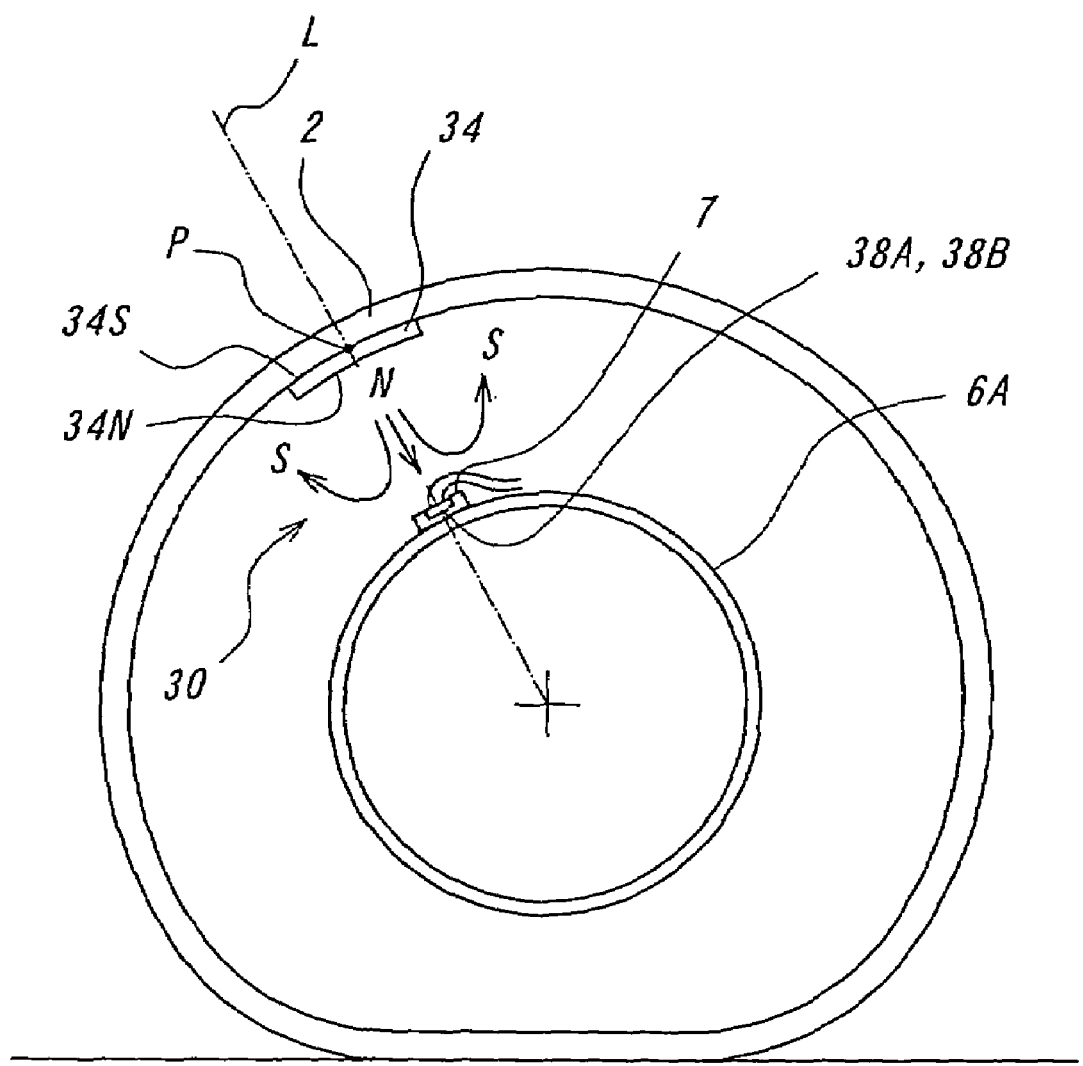
FIG. 16 is a section view of a tire showing a section A2-A2 of FIG. 15.

Then, a third embodiment is described with reference to FIGS. 15-17. In these figures, the same parts as in the first embodiment are shown by the same numerals. FIG. 15 is a section view of the tire 1 at a meridional plane of the tire, and FIG. 16 is a section view corresponding to an arrow A2-A2 of FIG. 15. In the tread portion 2 of the tire 1 is arranged a steel belt 3 comprised of two belt layers containing steel cords, and one rectangular sheet-shaped magnet 34 is attached to an inner face of the tread portion 2 in the radial direction of the tire or an inner peripheral face 2a of the tire at a point P of a widthwise center so as to coincide the center with the point P, while a magnetic sensor 38 is fixed onto an outer surface of a rim well portion 6A of a rim 6 in the radial direction of the tire at a widthwise center thereof. The magnet 34 is arranged so as to extend one side of the rectangle in the peripheral direction of the tire, and the magnetic sensor 38 is arranged so as to position its magnetic detecting center on a straight line L passing through the point P and extending inward and outward in the radial direction of the tire, and an apparatus 30 for measuring forces acted upon the tire is constituted with the sheet-shaped magnet 34 and the magnetic sensor 38.

The magnetic sensor 38 is comprised of a sensor 38A detecting a radial component Hr and a sensor 38b detecting a peripheral component Hθ in a magnetic field formed by the magnet 34. To the rim 6 is attached a transmitting device 7 for treating signals input from the magnetic sensor 38 through a junction line and a connector (not shown) and transmitting to a receiving device disposed on a vehicle body.

The magnet 34 is constructed so that the polarity differs between front and back. For example, N-pole 34n is formed on an inner face of the magnet 34 in the radial direction of the tire or a non-adhesion face and S-pole 34S is formed on an outer face in the radial direction of the tire or an adhesion face. Also, the magnet 34 is formed at a uniform thickness, and magnetization of N-pole or S-pole is uniformly distributed over a whole of each respective face.

Figure 17A:
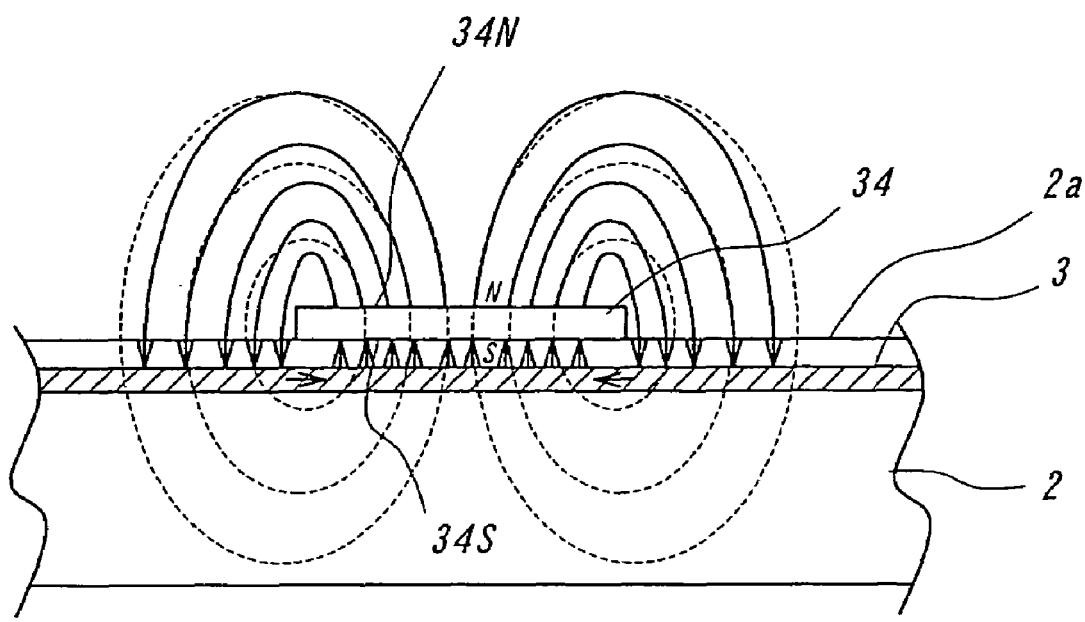
FIG. 17 is a diagrammatic view showing a distribution of magnetic force lines radiated from a sheet-shaped magnet.

FIG. 17a is a schematic view showing a distribution of magnetic force lines radiated from the sheet-shaped magnet 34 attached to the inner peripheral face 2a of the tread portion 2. If the steel belt 3 is not existent, the form of the magnetic force lines of the magnet 34 having the magnetization uniformly distributed over the whole of the face is a plane symmetry with respect to a magnet plane as a symmetrical plane as shown by dotted lines in the figure. However, the steel belt 3 is actually arranged just near to the inner peripheral face 2a attached with the magnet 34, so that the magnetic force lines passing through the interior of the tread portion 2 pass through the steel cords having a high permeability and hence the magnetic force lines form the distribution similar to that when S-pole is formed in a region around the magnet 34 in the inner peripheral face 2a of the tire. Further, an intensity of the magnetic field is equal to or more than that in case of using no steel belt 3, for example, at a point just above a center of N-pole face.

Figure 17B:
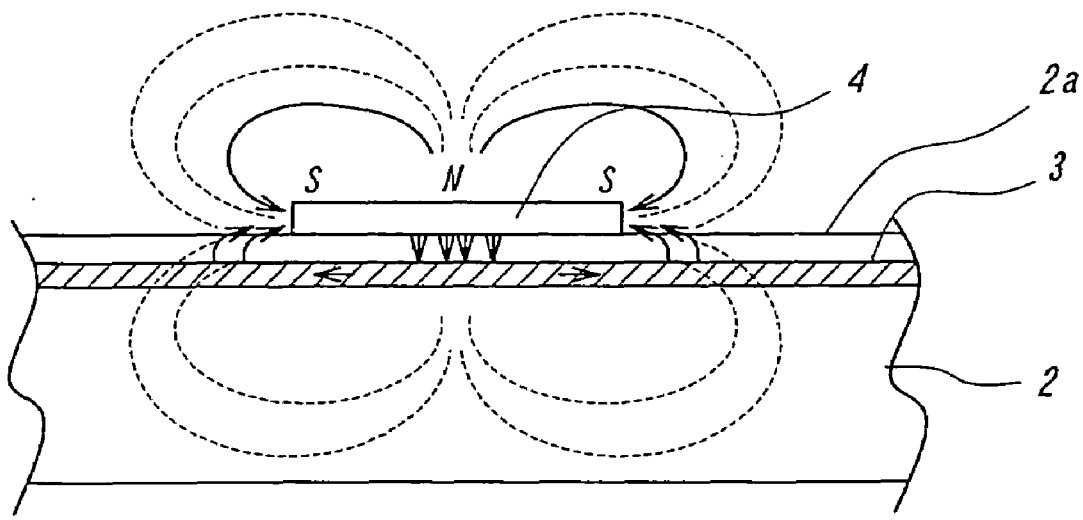

Even in the magnet 4 used in the first embodiment, the similar distribution of the magnetic force lines is formed, and a detail of such a magnetic force line distribution is shown in FIG. 17b in the form compared with FIG. 17a. When the magnet 4 is attached to the inner peripheral face 2a of the tread portion 2 having no steel belt 3, the magnetic force line distribution symmetrical between the front and the back is formed as shown by dotted lines in FIG. 17b, while when the tread portion 2 has the steel belt 3, almost all of the magnetic force lines pass through the steel cords to reduce magnetic force lines distributed on an outside of the tire 1.

If the magnet 4 is made large, the magnetic field enough to be detected by the magnetic sensor 8 can be formed, but there is a possibility that unnecessary unbalance is given to the tire and hence performances inherent to the tire such as ride comfort and the like are damaged. On the contrary, in the magnet 34 having different polarities at front and back faces used in the third embodiment, the magnetic force lines passing through the steel cords are necessarily distributed even at the outside of the tire 1, so that the magnetic field at the detecting position of the magnetic sensor 38 is not reduced due to the presence of the steel cords, and the given object can be attained by a lighter magnet, which is more advantageous as compared with the magnet 4 of the first embodiment in a point that the tire performances such as ride comfort and the like are not badly affected.

Insofar as the magnet 34 being advantageous as compared with the magnet 4 of the first embodiment is used in the tire having the steel cords as mentioned above, the radiated form of the magnetic force lines is the same as shown in the first embodiment and the force in the peripheral direction acting to the tire and the force in the radial direction acting to the tire can be measured in the same manner as described in the first embodiment, so that the detailed explanation thereof is omitted here.

Figure 18:
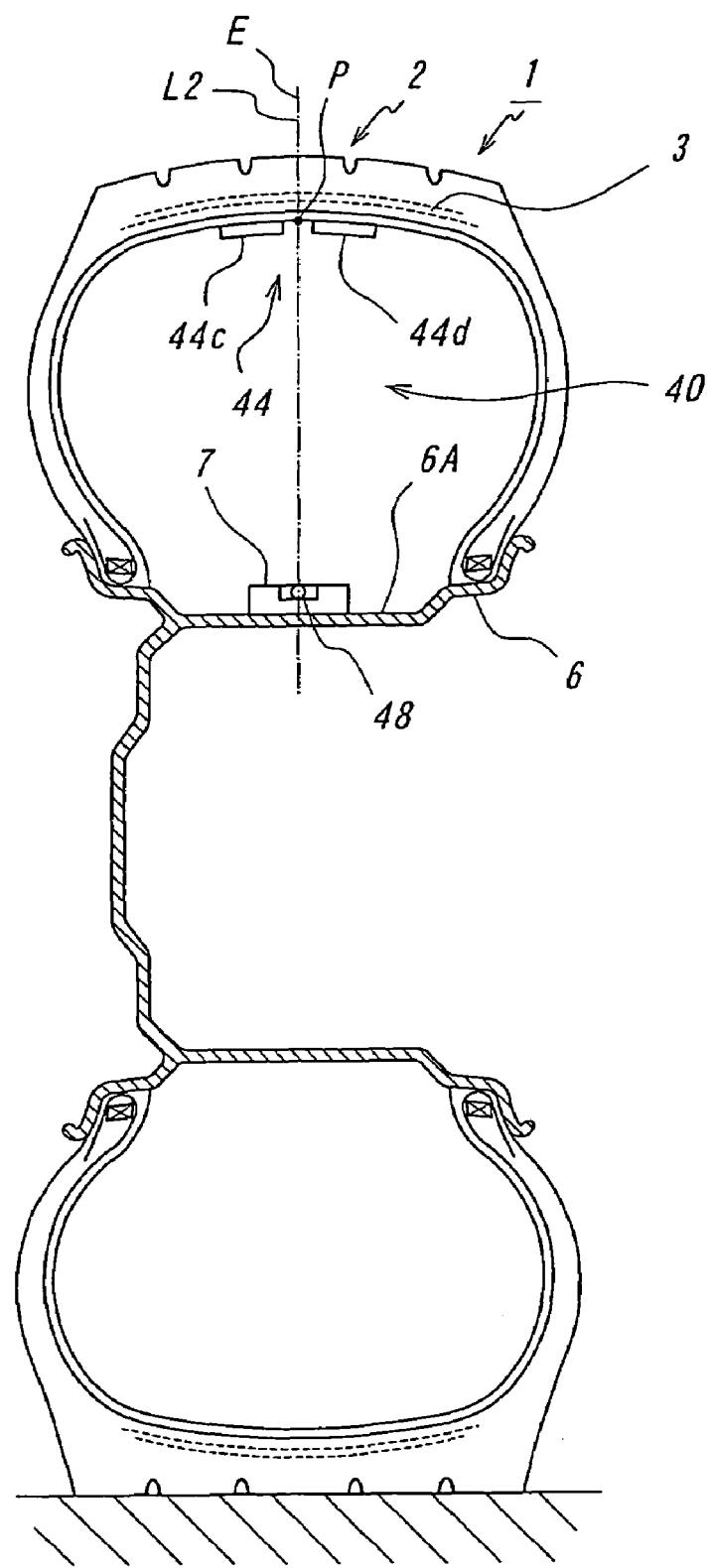
FIG. 18 is a section view of a tire used in a method for measuring forces acted upon the tire according to a fourth embodiment of the invention.
Figure 19:
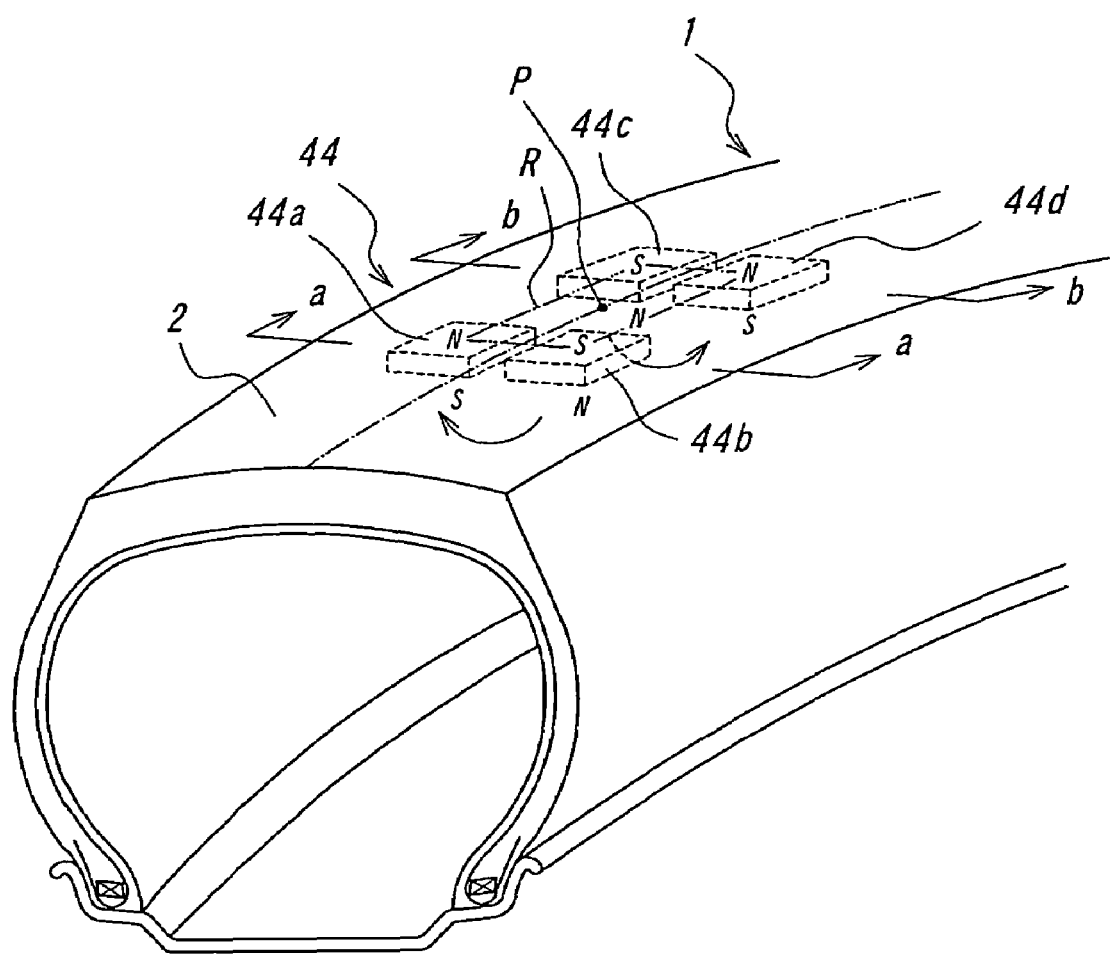
FIG. 19 is a perspective view illustrating an arrangement of magnets.

Next, a fourth embodiment is described with reference to FIGS. 18-21. FIG. 18 is a section view at a meridional plane of the tire, and FIG. 19 is a perspective view showing an arrangement of a magnet 44. In the tread portion 2 of the tire 1 is arranged the steel belt 3 comprised of two belt layers having steel cords therein, and the magnet 44 comprised of four sheet-shaped magnets 44a, 44b, 44c and 44d is attached to an inner face of the tread portion 2 of the tire 1 in the radial direction of the tire, and a magnetic sensor 48 is attached to a rim well portion 6A of a rim 6 opposing to the magnet 44, and hence an apparatus 40 for measuring forces acted upon the tire is constituted with the magnet 44 and the magnetic sensor 48.

The magnetic sensor is attached to a rim well portion 6A in a position on an equatorial plane E of the tire at a posture of detecting a magnetic flux density Hz in the widthwise direction, and also to the rim 6 is attached a transmitting device 7 for treating signals input from the magnetic sensor 48 through a junction line and a connector (not shown) and transmitting to a receiving device disposed on a vehicle body.

Each of the sheet-shaped magnets 44a, 44b, 44c and 44d is made of a rubber sheet being rectangular at the same size and having an approximately uniform thickness over the full face, in which the magnetization is approximately uniformly distributed on each face. Also, they are arranged so that a center of each rectangle is positioned in each apex of a rectangle R centering a point P on the inner peripheral face of the tire and directing one side in the peripheral direction and either side of each of them is directed in parallel to the peripheral direction of the tire. Further, the magnetic sensor 48 is arranged so that a magnetic detecting center is positioned on a straight line L2 passing through the point P and extending inward and outward in the radial direction of the tire.

Furthermore, the polarities in the inner faces of the magnets in the radial direction located at mutually adjoining apexes of the rectangle R or the non-adhesion faces are opposite to each other. In the embodiment of FIG. 19, the polarities of the magnets 44a, 44d located at opposing corners and inside in the radial direction are magnetized to N-pole, and the polarities of the magnets 44b, 44c located at different opposing corners and inside in the radial direction are magnetized to S-pole.

Figure 20A:
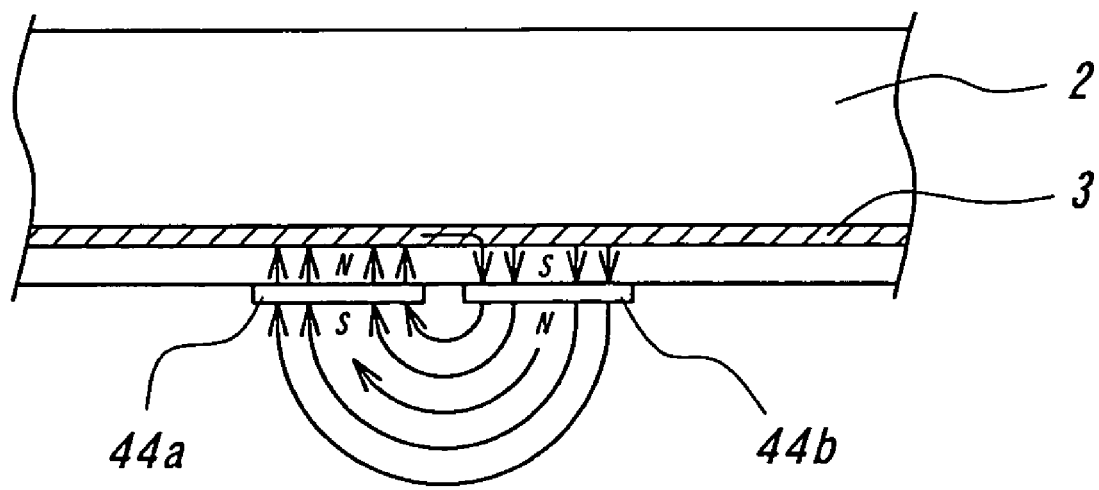
FIG. 20 is a diagrammatic view showing a distribution of magnetic force lines radiated from a sheet-shaped magnet.
Figure 20B:
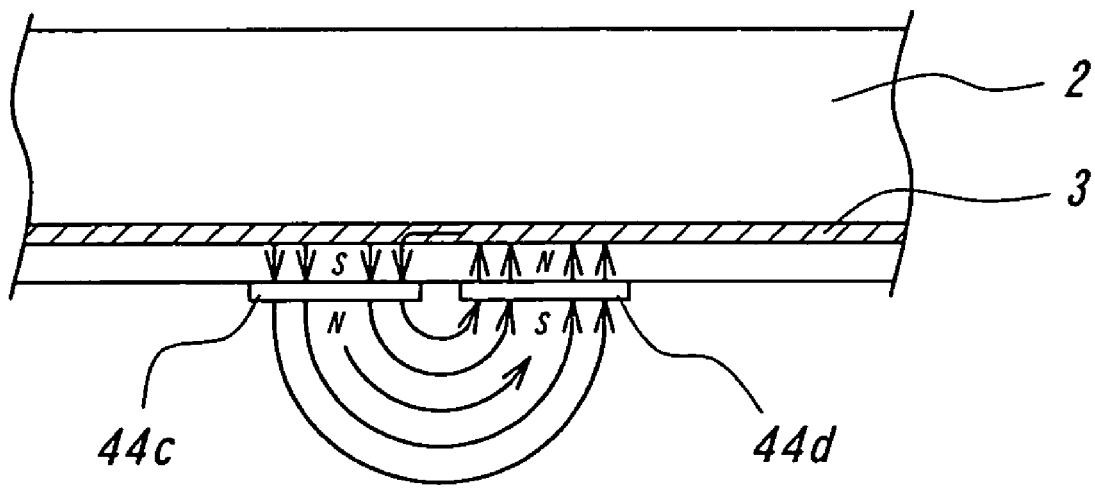

FIG. 20 is a schematic view showing a distribution of magnetic force lines from the magnet 44 having the above construction, in which FIG. 20a shows a distribution of magnetic force lines at a section corresponding to an arrow a-a of FIG. 19, and FIG. 20b shows a distribution of magnetic force lines at a section corresponding to an arrow b-b of FIG. 19. The magnetic force lines radiated between the magnets 44a and 44b lining in the widthwise direction of the tire and the magnetic force lines radiated between the magnets 44c and 44d lining in the widthwise direction of the tire are opposite to each other in the widthwise direction of the tire, while they are distributed at the outside of the tire without being influenced by the steel belt 3.

Figure 21:
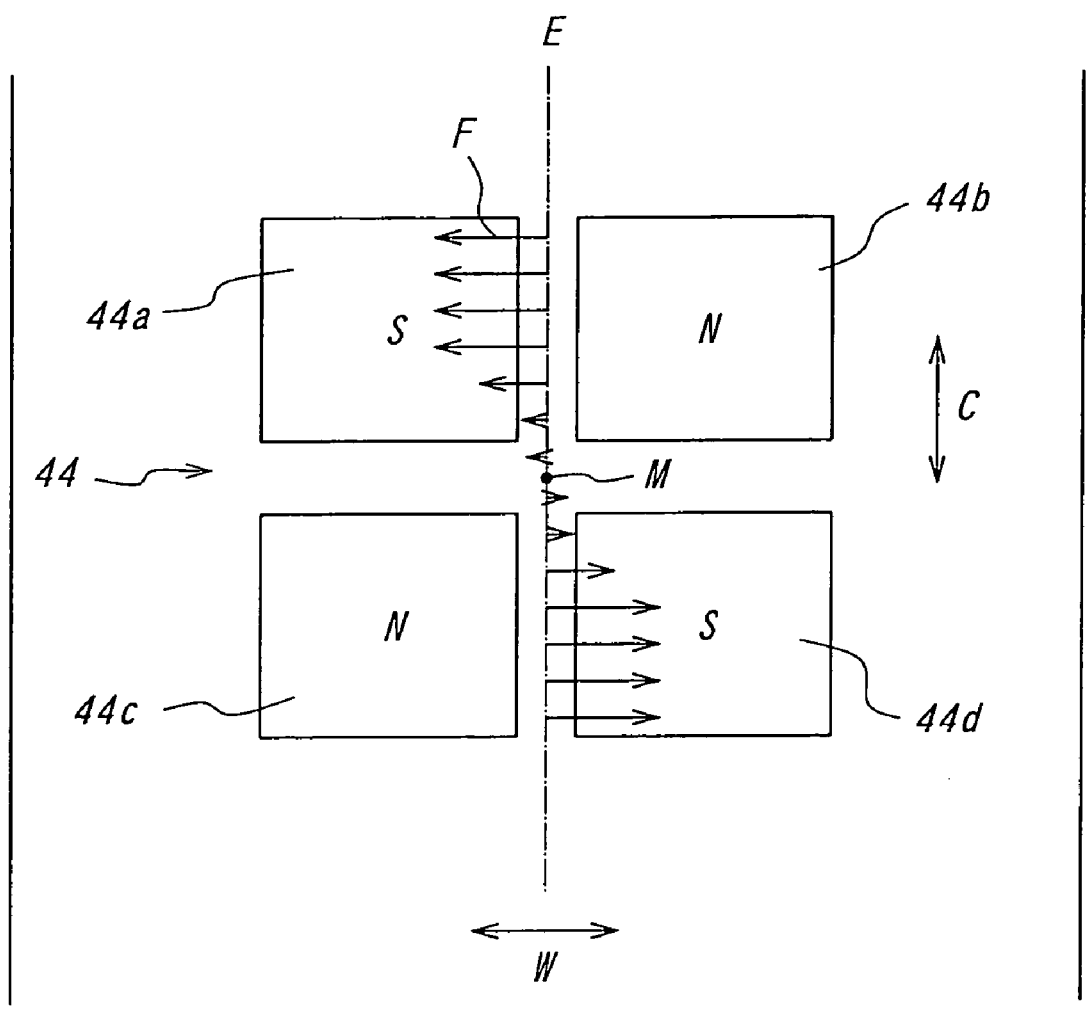
FIG. 21 is a schematically developed view showing a tire widthwise component of a magnetic flux density on an equator at the same height in a radial direction of the tire as that of a magnetic sensor.

FIG. 21 is a schematically developed view showing a widthwise component F of the magnetic flux density in the magnetic field formed by the magnet 44 on an equator E having the same height in the radial direction of the tire as in the magnetic sensor 48 viewing from a side of a rotating center of the tire. In this figure, a point M shows a magnetic detecting position of the magnetic sensor 48. When the displacement D of the point P is zero, the center of the magnet 44 coincides with M in FIG. 21. Moreover, an arrow C shows a peripheral direction of the tire and an arrow W shows a widthwise direction of the tire.

In FIG. 21, when a magnitude of the widthwise component F of the magnetic flux density is a length of the arrow and a direction of F shows a direction of the arrow indicating a direction from N-pole to S-pole, the arrow of F is left-directing at the inside between the magnets 44a and 44b in the radial direction, while it is right-directing at the inside between the magnets 44c and 44d in the radial direction, and also the direction of the magnetic force lines is reversed at a middle position of the magnet 44 in the peripheral direction. That is, when the displacement D of the point P is zero, the widthwise component Hz of the magnetic flux density is zero at the detecting position M of the magnetic sensor 48.

The form of the magnetic force lines shown in FIG. 21 is quite the same as described in the second embodiment, and hence the force in the peripheral direction and the force in the radial direction acting to the tire can be measured in the same manner as described in the second embodiment, so that the detailed explanation is omitted here. Moreover, this embodiment is different from the second embodiment in a point that when the steel belt 3 is disposed in the tire, the stronger magnetic field can be formed by this embodiment, which is as explained on the comparison between the first embodiment and the third embodiment.

Figure 22:
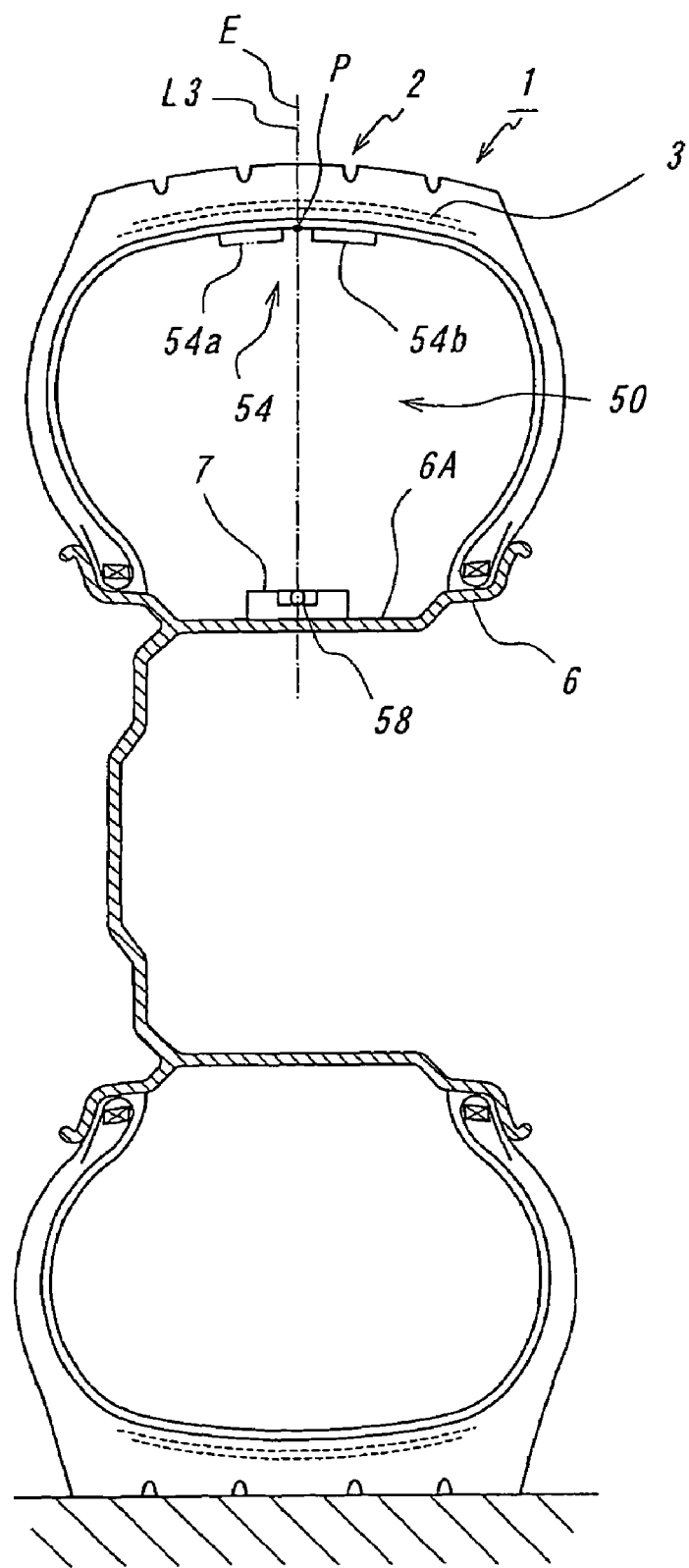
FIG. 22 is a section view of a tire showing a modification example of the fourth embodiment of the invention.
Figure 23:
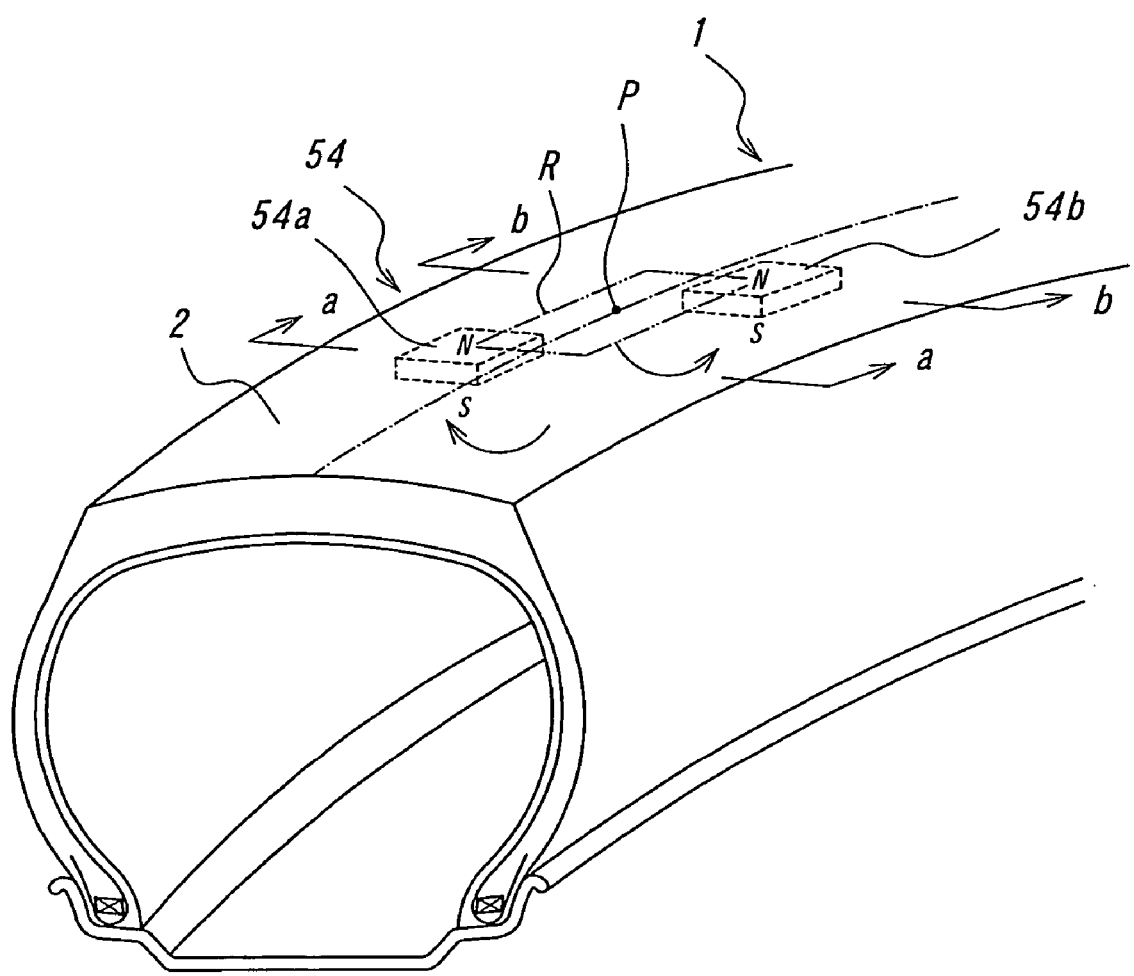
FIG. 23 is a perspective view of a tire illustrating an arrangement of magnets.

Next, a modified example of the fourth embodiment is described with reference to FIGS. 22-25 using a magnet 54 instead of the magnet 44. FIG. 22 is a section view of the tire 1 at a meridional plane of the tire, and FIG. 23 is a perspective view showing an arrangement of the magnet 54. To the inner face of the tread portion 2 of the tire 1 in the radial direction is attached the magnet 54 comprised of two sheet-shaped magnets 54a, 54b, and a magnetic sensor 58 is attached to a rim well portion 6A of a rim 6 facing to the magnet 54, and an apparatus 50 for measuring forces acted upon the tire is constructed with the magnet 54 and the magnetic sensor 58.

The magnetic sensor 58 is attached to the rim well portion 6A in a position on an equatorial plane E of the tire at a posture of detecting a magnetic flux density Hz in the widthwise direction likewise the fourth embodiment, and also to the rim 6 is attached a transmitting device 7 for treating signals input from the magnetic sensor 58 through a junction line and a connector (not shown) and transmitting to a receiving device disposed on a vehicle body.

Each of the sheet-shaped magnets 54a and 54b is made of a rubber sheet being rectangular at the same size and having an approximately uniform thickness over the full face, in which the magnetization is approximately uniformly distributed on each face. These magnets 54a, 54b are arranged so that centers thereof are positioned in a pair of apexes of a rectangle R centering a point P on the inner peripheral face of the tire and directing in the peripheral direction and either side of each of them is directed in parallel to the peripheral direction of the tire. Further, the magnetic sensor 58 is arranged on a straight line L3 passing through the point P and extending in the radial direction of the tire under no action of external force to the tire.

The polarities of magnetic poles in these magnets 54a, 54b at an inner face in the radial direction or a non-adhesion face thereof are the same. In the example of FIG. 23, the polarities of the magnets 54a, 54b at the inside in the radial direction are magnetized to S-pole.

Figure 24A:
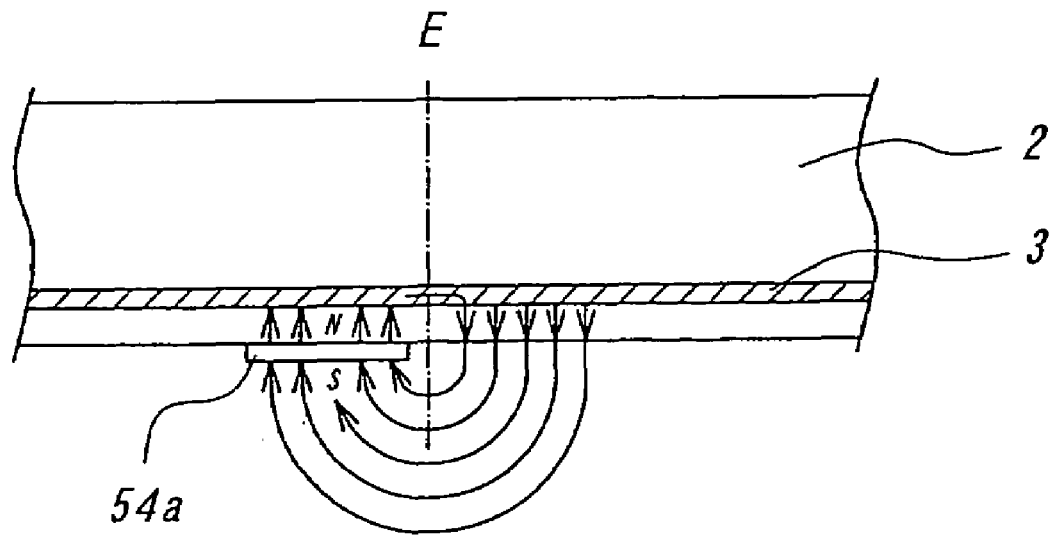
FIG. 24 is a diagrammatic view showing a distribution of magnetic force lines radiated from a sheet-shaped magnet.
Figure 24B:
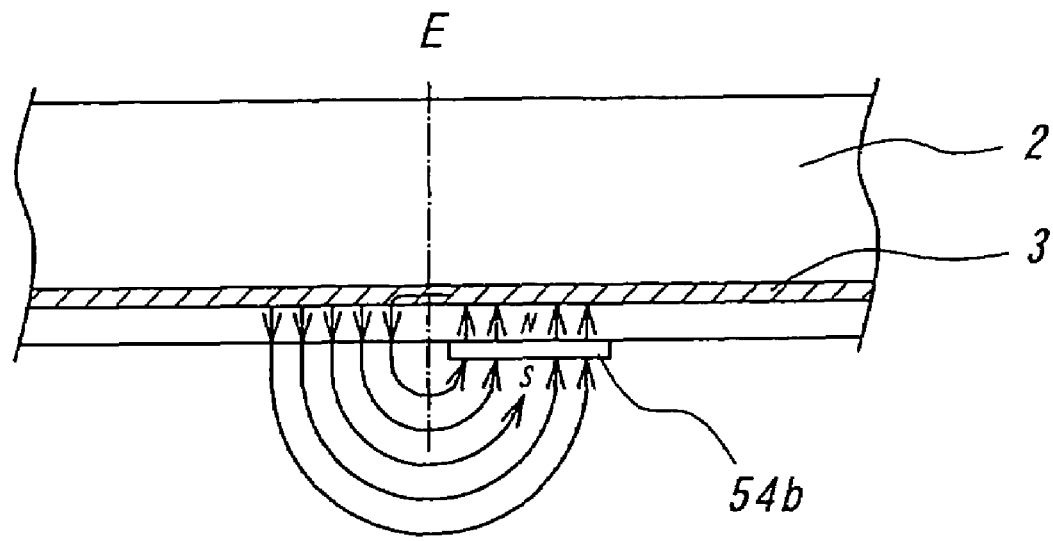

FIG. 24 is a schematic view showing a distribution of magnetic force lines from the magnet 54 having the above construction, in which FIG. 24a shows a distribution of magnetic force lines at a section corresponding to an arrow a-a of FIG. 23, and FIG. 24b shows a distribution of magnetic force lines at a section corresponding to an arrow b-b of FIG. 23. Also, FIG. 25 is a schematically developed view showing a widthwise component F of the magnetic flux density in the magnetic field formed by the magnet 44 on an equator E having the same height in the radial direction of the tire as in the magnetic sensor 58 viewing from a side of a rotating center of the tire.

The magnetic poles of the magnets 54a, 54b at an outer face in the radial direction of the tire or an adhesion face are N-poles in FIG. 23. The magnetic force lines directing from these N-poles to S-poles of the magnets 54a, 54b at an outer face in the radial direction of the tire or a non-adhesion face are distributed so as to pass through the steel belt 3 and intersect the inner peripheral face 2a at opposite positions of the magnets 54a, 54b in the widthwise direction of the tire with respect to the equatorial plane E and direct toward the respective S-poles. When the magnetic force line distribution shown in FIG. 25 is compared with the aforementioned magnetic force line distribution shown in FIG. 20, it is clear that they are substantially the same distribution, which means that the magnet 54 comprised of two magnets 54a and 54b also forms the same magnetic field as the magnet 44 comprised of four magnets 44a, 44b, 44c and 44d.

Figure 25:
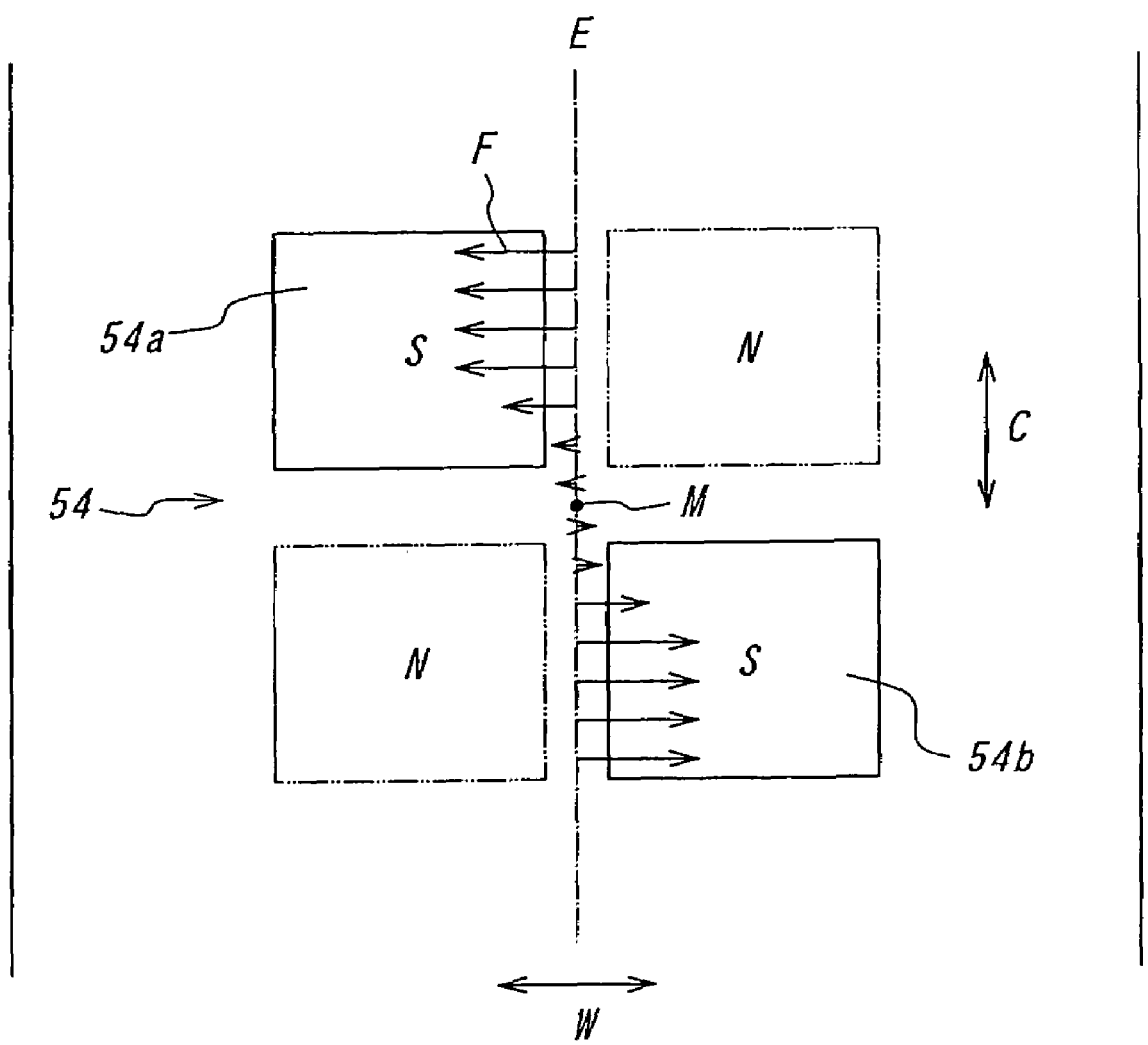
FIG. 25 is a schematically developed view showing a tire widthwise component of a magnetic flux density on an equator at the same height in a radial direction of the tire as that of a magnetic sensor.

In FIG. 25, C is a peripheral direction of the tire and W is a widthwise direction of the tire. When the displacement D of the point P is zero, the center of the magnet 54 coincides with a magnetic detecting position M of the magnetic sensor 58. In this figure, when a magnitude of the widthwise component F of the magnetic flux density is a length of the arrow and a direction of F shows a direction of the arrow indicating a direction from N-pole to S-pole, the arrow is left-directing on an equator E in the peripheral position corresponding to the magnet 54a, while the arrow is right-directing on the equator E in the peripheral position corresponding to the magnet 54b, and the direction of the arrow is reversed at a middle position of the magnet 54 in the peripheral direction. That is, the modified example also means that the force-T in the peripheral direction of the tire and the force R in the radial direction of the tire can be measured in the same manner as described in the second embodiment, so that the detailed explanation on this modified example is omitted.

Figure 26:
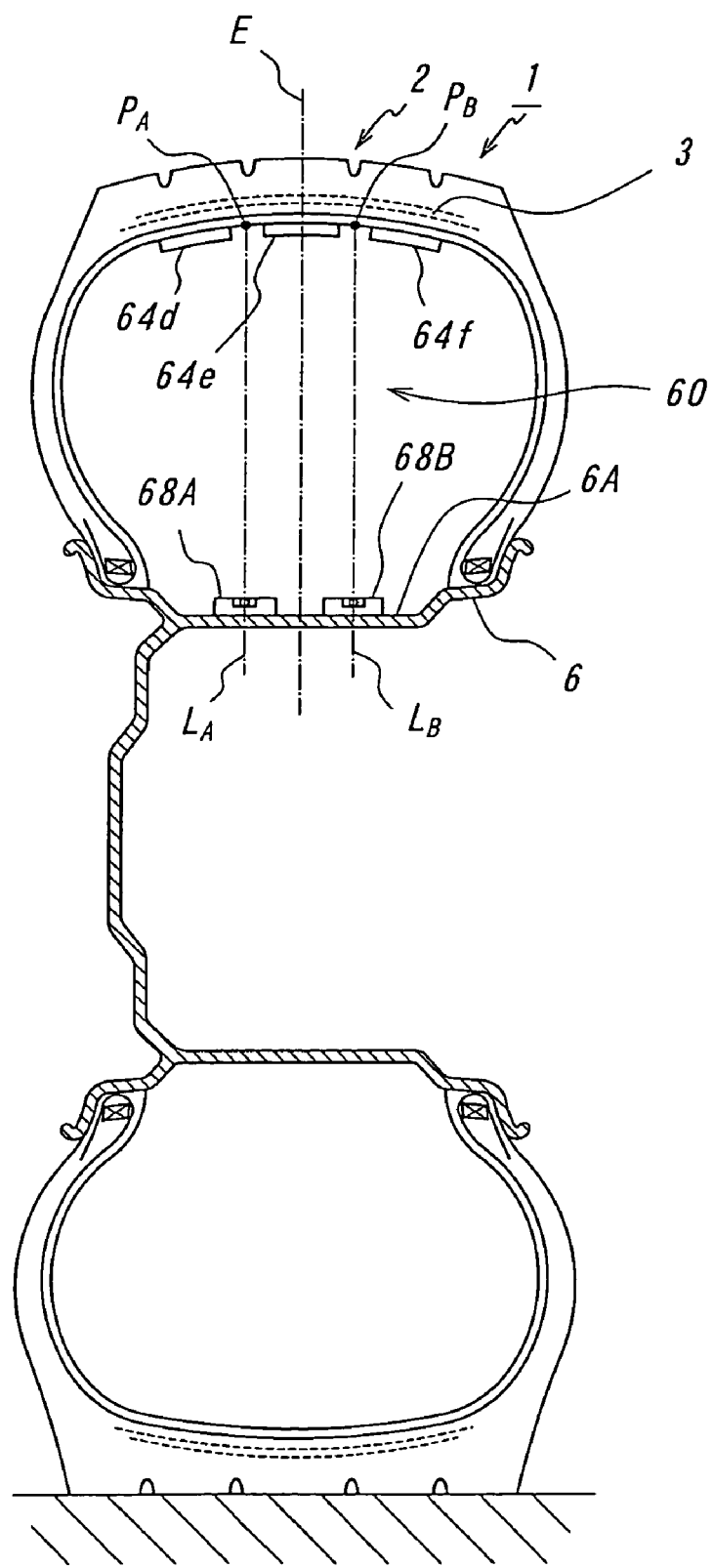
FIG. 26 is a section view of a tire used in a method for measuring forces acted upon the tire according to a fifth embodiment of the invention.
Figure 27:
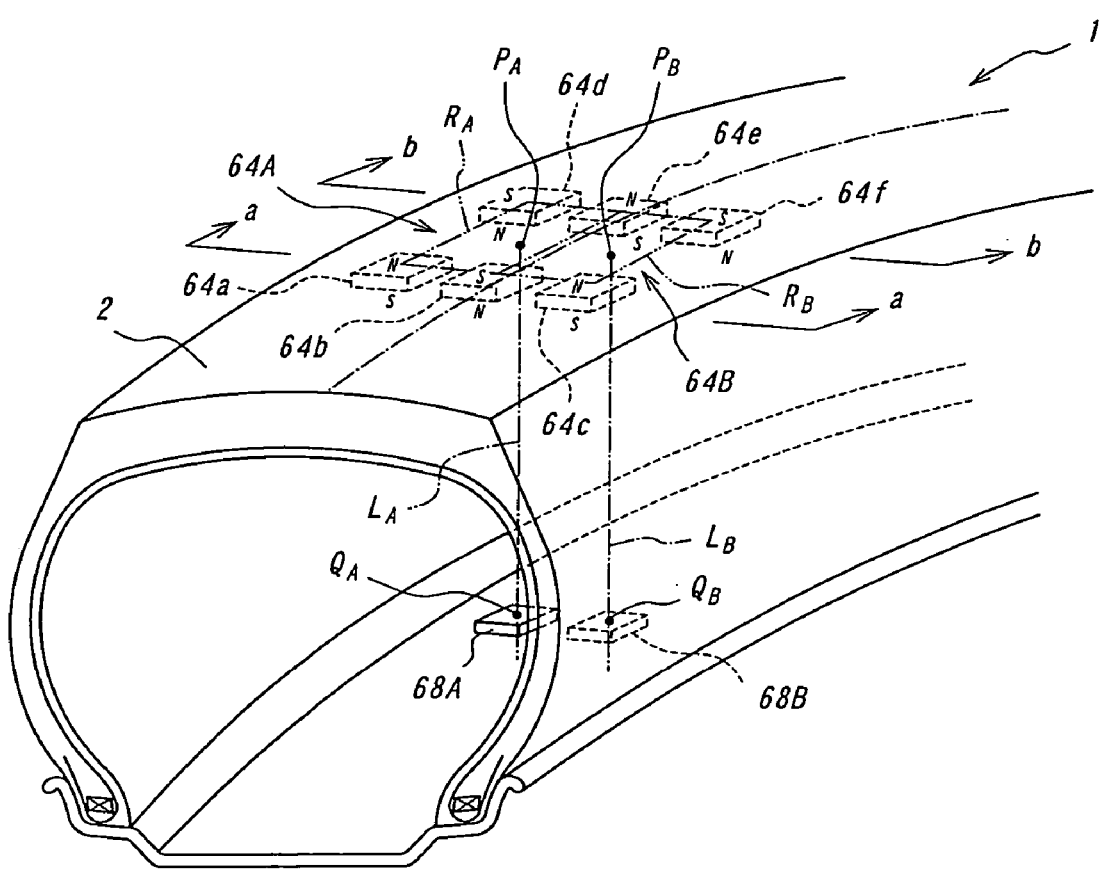
FIG. 27 is a perspective view illustrating an arrangement of magnets.

Then, a fifth embodiment of the invention is described with reference to FIGS. 26-30. FIG. 26 is a section view of the tire 1 at a meridional plane thereof, and FIG. 27 is a perspective view showing an arrangement of a magnet and a magnetic sensor. In the tread portion 2 of the tire 1 is arranged the steel belt 3 comprised of two belt layers having steel cords therein, and six sheet-shaped magnets 64a, 64b, 64c, 64d, 64e and 64f are attached to an inner face of the tread portion 2 of the tire 1 in the radial direction of the tire, and two magnetic sensors 68A, 68B are attached to a rim well portion 6A of a rim 6 at a posture of detecting widthwise components of respective magnetic flux densities.

Each of the six sheet-shaped magnets 64a, 64b, 64c, 64d, 64e and 64f is made of a rubber sheet being rectangular at the same size and having an approximately uniform thickness over the full face, in which the magnetization is approximately uniformly distributed on each face so as to make polarities of front and back faces different. Also, these magnets 64a, 64b, 64c, 64d, 64e and 64f are arranged in three rows symmetrical with respect to an equatorial plane E and every two along the peripheral direction at equal intervals, in which a side of each of these magnets is directed in parallel to the peripheral direction and distances separated between the adjoining magnets in the peripheral direction and in the widthwise direction are not more than 100 mm, respectively, and directions of magnetic poles are opposite to each other between the adjoining magnets in the peripheral direction and the widthwise direction of the tire. For example, the three sheet-shaped magnets 64b, 64d and 64f adjoining the sheet-shaped magnet 64e having N-pole at an outside in the radial direction are arranged so as to have N-pole at an inside in the radial direction different from 64e.

These six sheet-shaped magnets 64a, 64b, 64c, 64d, 64e and 64f can be seen to constitute a double magnet of a first magnet 64A consisting of the four sheet-shaped magnets 64a, 64b, 64e and 64d arranged at apexes of a first rectangle $R_A$, respectively, and a second magnet 64B consisting of the four sheet-shaped magnets 64b, 64c, 64f and 64e arranged at apexes of a second rectangle $R_B$, respectively. Under no action of external force to the tire 1, a first magnetic sensor 68A is arranged at a point $Q_A$ of the rim on a straight line passing through a center $P_A$ of the rectangle $R_A$ in the radial direction, and a second magnetic sensor 68B is arranged at a point $Q_B$ of the rim on a straight line passing through a center $P_B$ of the rectangle $R_B$ in the radial direction. As a result, an apparatus 60 for measuring forces acted upon the tire is constituted with the first and second magnets 64A, 64B consisting of the six sheet-shaped magnets 64a, 64b, 64c, 64d, 64e and 64f and the first and second magnetic sensors 68A, 68B.

The apparatus 40 for measuring forces acted upon the tire according to the fourth embodiment can remove the influence of the change of earth magnetism on the rotating position of the tire, but can not remove the influence of earth magnetism changing in accordance with the position or direction of the vehicle unless another means for measuring the earth magnetism is used together. On the contrary, the apparatus 60 for measuring forces acted upon the tire according to the fifth embodiment is not subjected to the influence even if the earth magnetism changes in accordance with the position or direction of the vehicle and is advantageous in a point that the influence of earth magnetism is not corrected separately. Next, the action of the latter apparatus is explained.

Figure 28A:
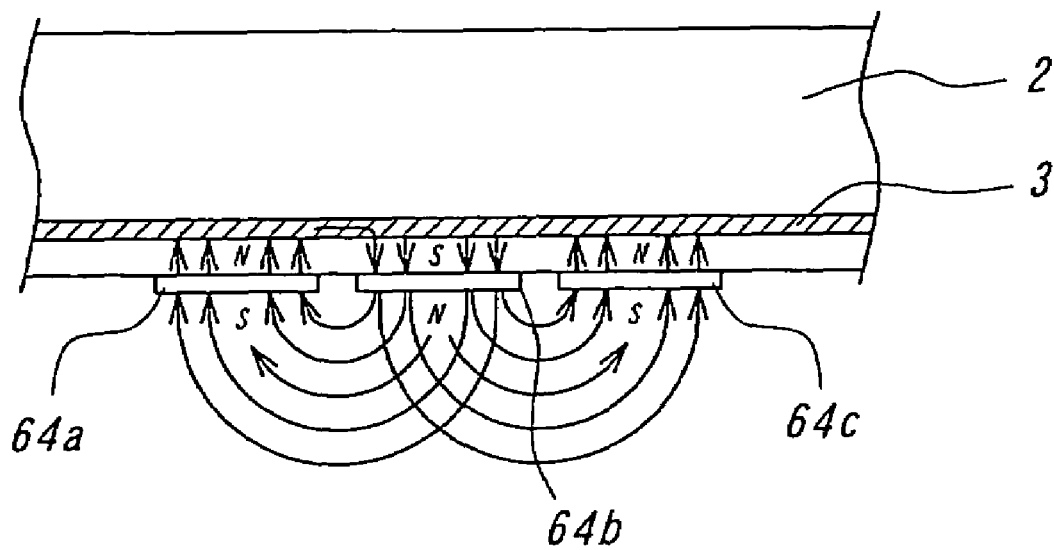
FIG. 28 is a diagrammatic view showing a distribution of magnetic force lines radiated from a sheet-shaped magnet.
Figure 28B:
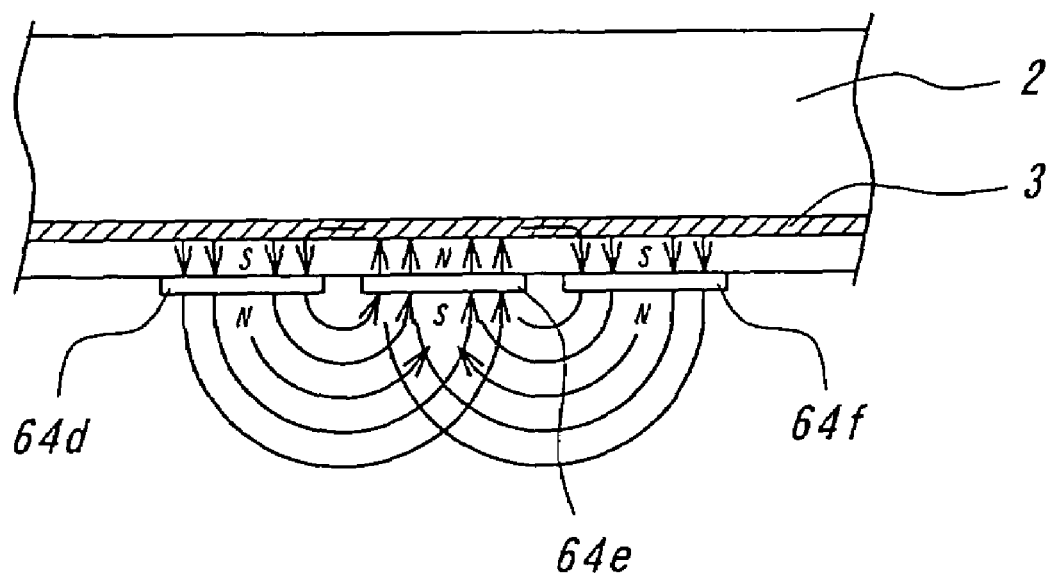

FIG. 28 is a schematic view showing a distribution of magnetic force lines from the magnets 64A, 64B having the above construction, in which FIG. 28a shows magnetic force lines at a section corresponding to an arrow a-a of FIG. 27, and FIG. 28b shows magnetic force lines at a section corresponding to an arrow b-b. The magnetic force lines radiated among the magnets 64a, 64b, 64c arranged side by side in the widthwise direction of the tire and the magnetic force lines radiated among the magnets 64d, 64e, 64f are the same form, but they are formed so as to make directions of these magnetic force lines at the different sections opposite to each other.

Figure 29:
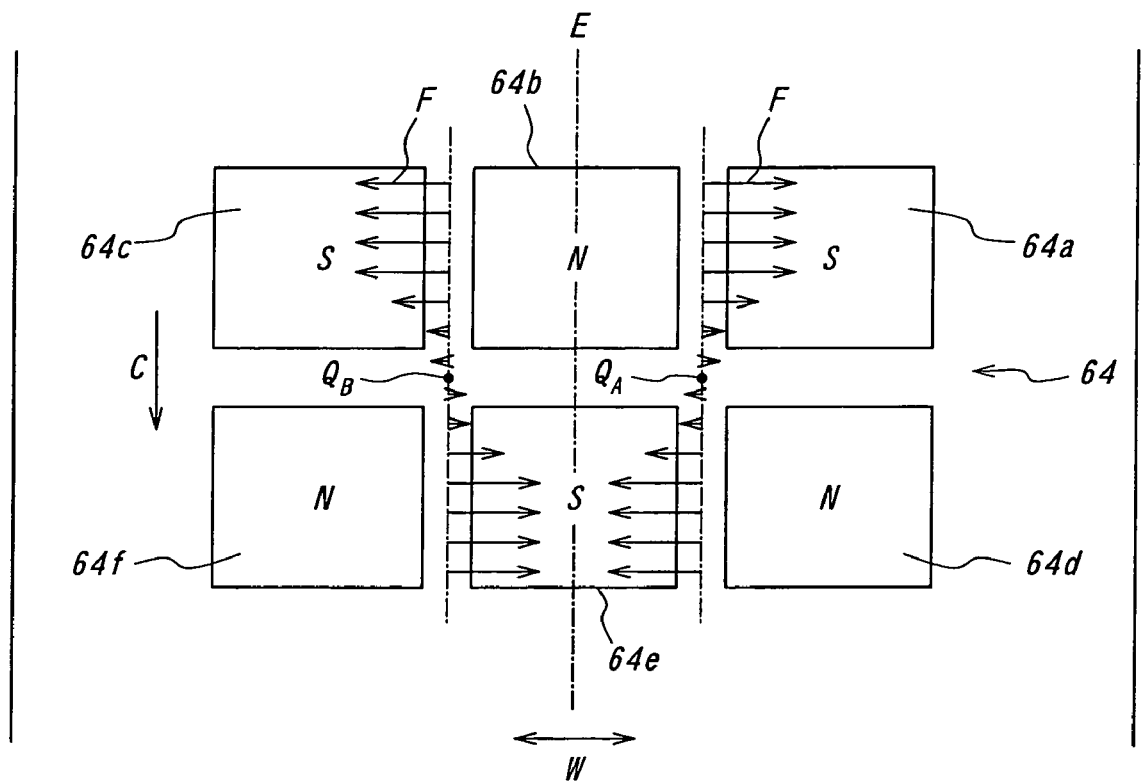
FIG. 29 is a schematically developed view showing a tire widthwise component of a magnetic flux density on an equator at the same height in a radial direction of the tire as that of a magnetic sensor.

FIG. 29 is a schematically developed view showing a widthwise component F of the magnetic flux density in the magnetic field formed by the magnets 64A, 64B on an equator E having the same height in the radial direction of the tire as in the magnetic sensors 68A, 68B viewing from a side of a rotating center of the tire. In this figure, a point $Q_A$ is a magnetic detecting position of the magnetic sensor 68A, and a point $Q_B$ is a magnetic detecting position of the magnetic sensor 68B, and an arrow C is a peripheral direction of the tire and an arrow W is a widthwise direction of the tire.

In FIG. 29, when the magnitude of the widthwise component F of the magnetic flux density is shown by a length of an arrow and an arrow from N-pole to S-pole is left-directing as a plus direction, the widthwise component F of the magnetic flux density in the magnetic field formed by the magnet 64A in the vicinity of the point $Q_A$ decreases toward the peripheral direction C and reverses at the point $Q_A$ from plus to minus, while the widthwise component F of the magnetic flux density in the magnetic field formed by the magnet 64B in the vicinity of the point $Q_B$ increases toward the peripheral direction C and reverses at the point $Q_B$ from minus to plus. In other words, the magnets 64A and 64B are arranged so as to come close to each other and render the change of the widthwise component F of the magnetic flux density along the peripheral direction C of the tire under no action of external force to the tire into a reversal relation.

As seen from FIG. 29, the change of the widthwise component of the magnetic flux density in the peripheral direction in the vicinity of the points $Q_A$, $Q_B$ is the same as in FIG. 12 corresponding to the second embodiment or a reversal thereof, so that the forces R and T can be determined based on the equations (22)-(24) as explained in the second embodiment. However, since the change of the earth magnetism due to the direction or position of the vehicle is ignored in the method of the second embodiment as previously mentioned, a sum of widthwise component $F_G$ through the earth magnetism and widthwise component F through the magnet 64A, 64B is actually detected by the magnetic sensor 68A, 68B, so that the forces R and T determined by the equations (22)-(24) based on such sum of widthwise components are subjected to an influence of changing $F_G$ and become low in the precision.

The method of the fifth embodiment intends to completely remove the influence of the earth magnetism by taking out only the change of magnetic flux density F through the magnet from the change of magnetic flux density detected and applying the equations (22)-(24) thereto. A method of extracting F is described below. FIG. 30 is a graph showing a change ΔHz of widthwise magnetic flux density when the tire 1 is rotated in the direction C by using a direction φ on an abscissa, in which FIG. 30a shows ΔHz detected by the magnetic sensor 68A, and FIG. 30b shows ΔHz detected by the magnetic sensor 68B, and FIG. 30c is a reversal of the graph of FIG. 30b.

In these figures, a curve PTa of magnetic flux density change actually detected is a total of a curve PTa0 of magnetic flux density change through only the magnet 64A and earth magnetism $F_G$, and similarly PTb is a total of a curve PTb0 of magnetic flux density change through only the magnet 64B and earth magnetism $F_G$. In this case, the changes of the magnetic fields formed by the magnets 64A, 64B in the peripheral direction have a reversal relation, so that PTa0 and PTb0 are curves reversing to each other with respect to an axis of ΔHz=0, and $F_G$ acts in the same direction in any cases. Now, the curve PTb of FIG. 30b is reversed to obtain a curve PTc as shown in FIG. 30c and then the curves PTa and PTc are arithmetically added to obtain a curve PTd as shown in FIG. 30d, whereby the component through the earth magnetism can be rendered into zero to extract only the components through the magnets 64A and 64B.

As seen from the above, the forces R and T can be determined by replacing $\Delta Hz_{\phi max}$ and $\Delta Hz_{\phi min}$ of the equations (22) and (23) with the following equations (25) and (26) without considering the influence of the earth magnetism.

$$\Delta Hz_{\phi max}=(\Delta Hz_{\phi max-a}+\Delta Hz_{\phi max-c})/2 \qquad (25)$$

$$\Delta Hz_{\phi min}=(\Delta Hz_{\phi min-a}+\Delta Hz_{\phi min-c})/2 \qquad (26)$$

In this case, $\Delta Hz_{\phi max-a}$ and $\Delta_{Hz\phi max-c}$ are maximum value and minimum value of widthwise magnetic flux density detected by the first magnetic sensor 68A, and $\Delta Hz_{\phi min-a}$ and $\Delta Hz_{\phi min-c}$ are maximum value and minimum value of a curve obtained by reversing the curve of widthwise magnetic flux density change detected by the second magnetic sensor 68B.

In the above embodiments, the magnet is attached to the inner peripheral face of the tire and the magnetic sensor is attached to the rim. In the invention, it is enough to measure the relative displacement between the tire tread portion and the rim. Therefore, the similar effects can be obtained by attaching the magnetic sensor to the inner peripheral face of the tire and the magnet to the rim even in any one of the above embodiments. As a modified example of the first embodiment, the case that the magnet is attached to the rim and the magnetic sensor is attached to the inner peripheral face of the tire is shown in FIGS. 31 and 32.

Figure 31:
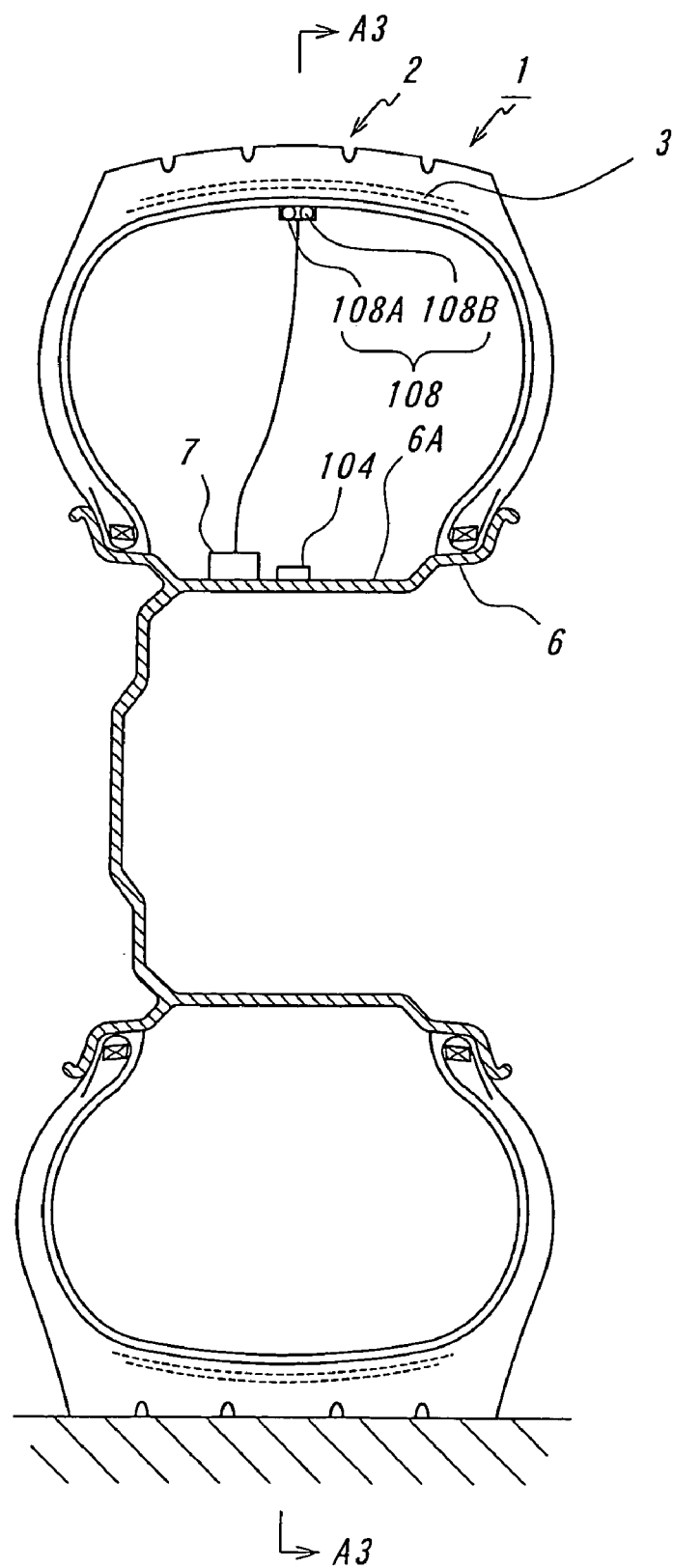
FIG. 31 is a section view of a tire showing a modification example of the other embodiment of the invention.
Figure 32:
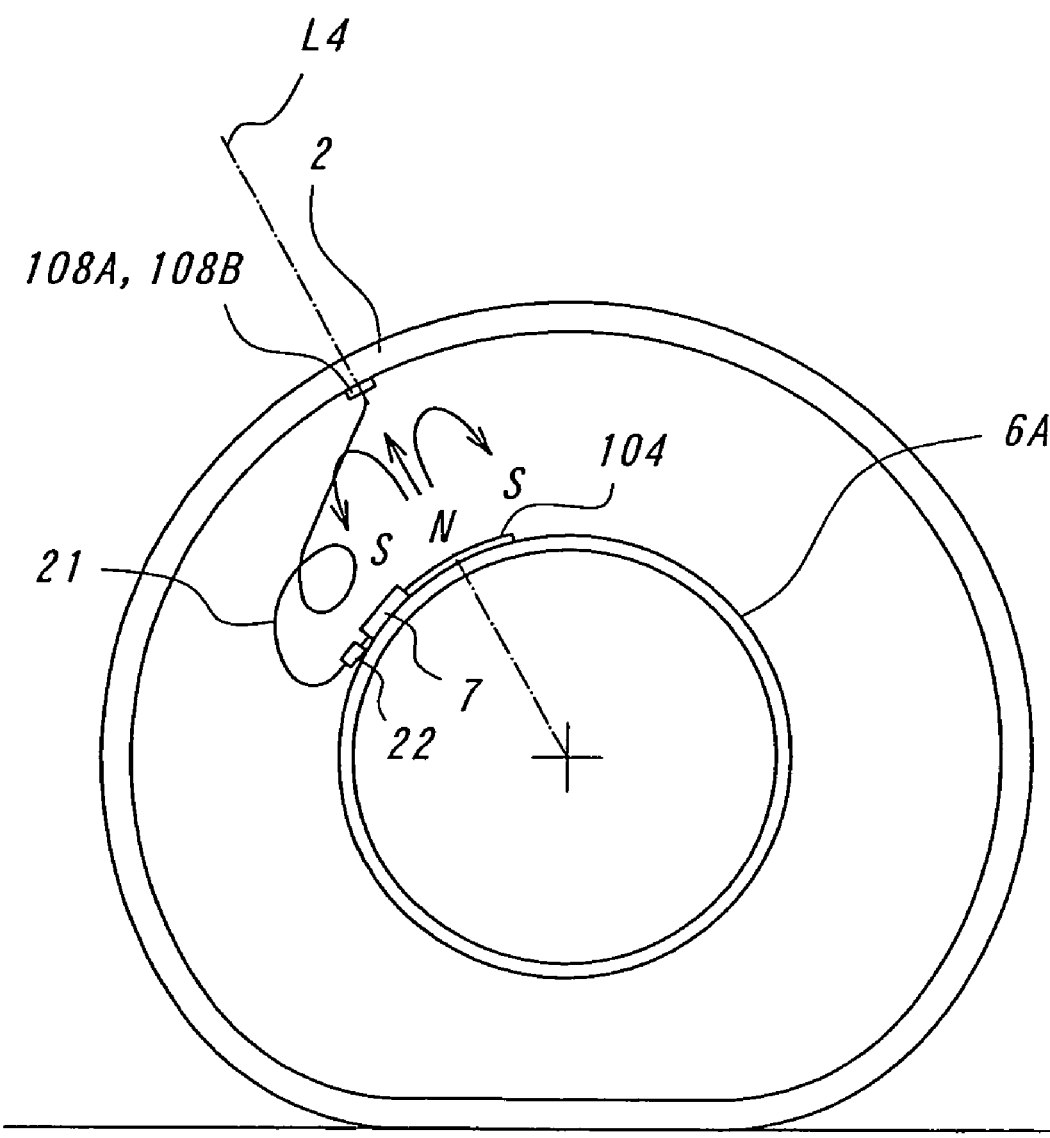
FIG. 32 is a section view of a tire showing a section A3-A3 of FIG. 31.

FIG. 31 is a section view of the tire 1 at a meridional plane of the tire, and FIG. 32 is a section view corresponding to an arrow A3-A3 of FIG. 31. To an inner face in the radial direction and a center in the widthwise direction of the tread portion 2 of the tire 1 is attached a magnetic sensor 108, while onto an outer face in the radial direction and a center in the widthwise direction of the rim well portion 6A of the rim 6 is arranged a magnet 104 having a magnetic pole of one polarity at its center such as N-pole and magnetic poles of the other polarity at both ends such as S-poles so as to position the center on a straight line L4 passing through the magnetic sensor 108 and extending inward and outward in the radial direction under no action of external force to the tire and oppose both ends in the peripheral direction of the tire. The magnetic sensor 108 comprises a sensor 108A detecting a radial component Hr in the magnetic field radiated from the magnet 104 and a sensor 108B detecting a peripheral component Hθ thereof. Onto the rim 6 is attached a transmitting device 7 for treating signals input from the magnetic sensor 108 through a junction line 21 and a connector 22 and transmitting to a receiving device disposed on a vehicle body.

Figure 33:
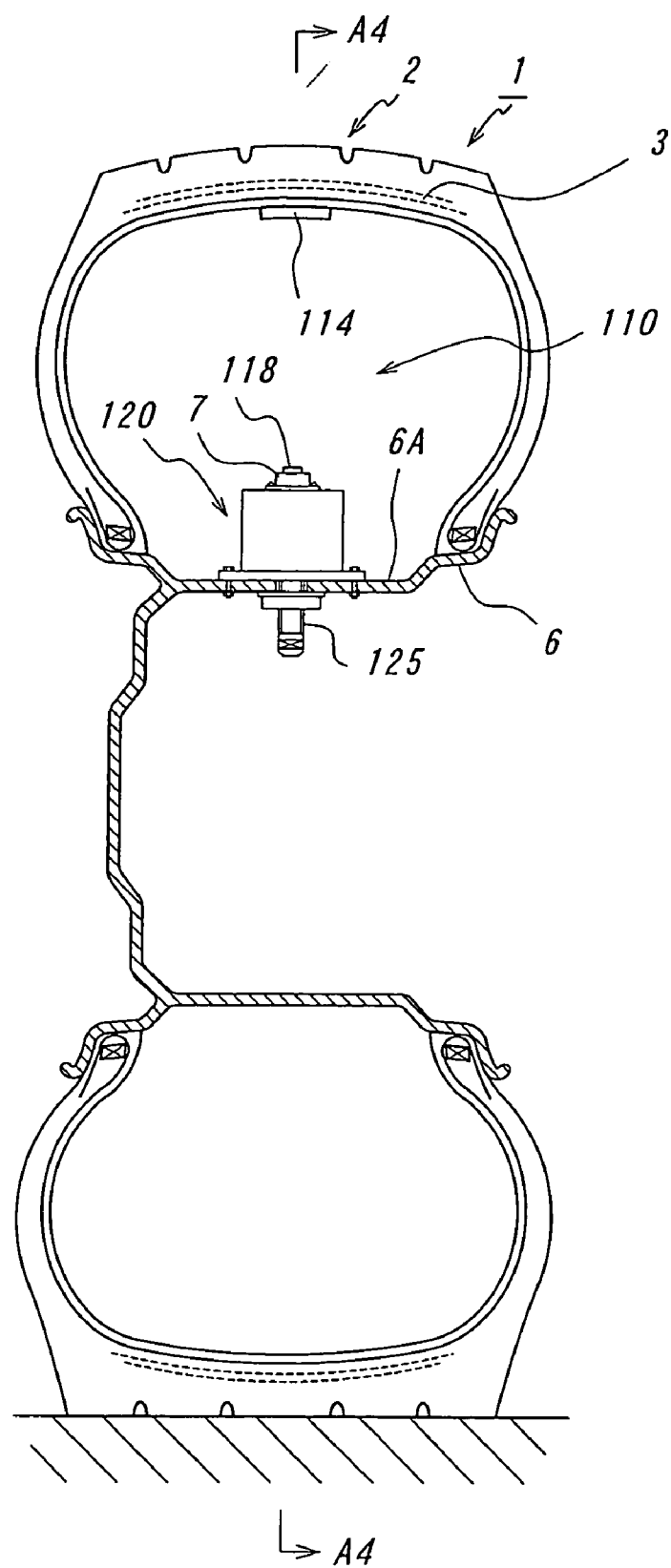
FIG. 33 is a section view of a tire showing a modification example of the other embodiment of the invention.
Figure 34:
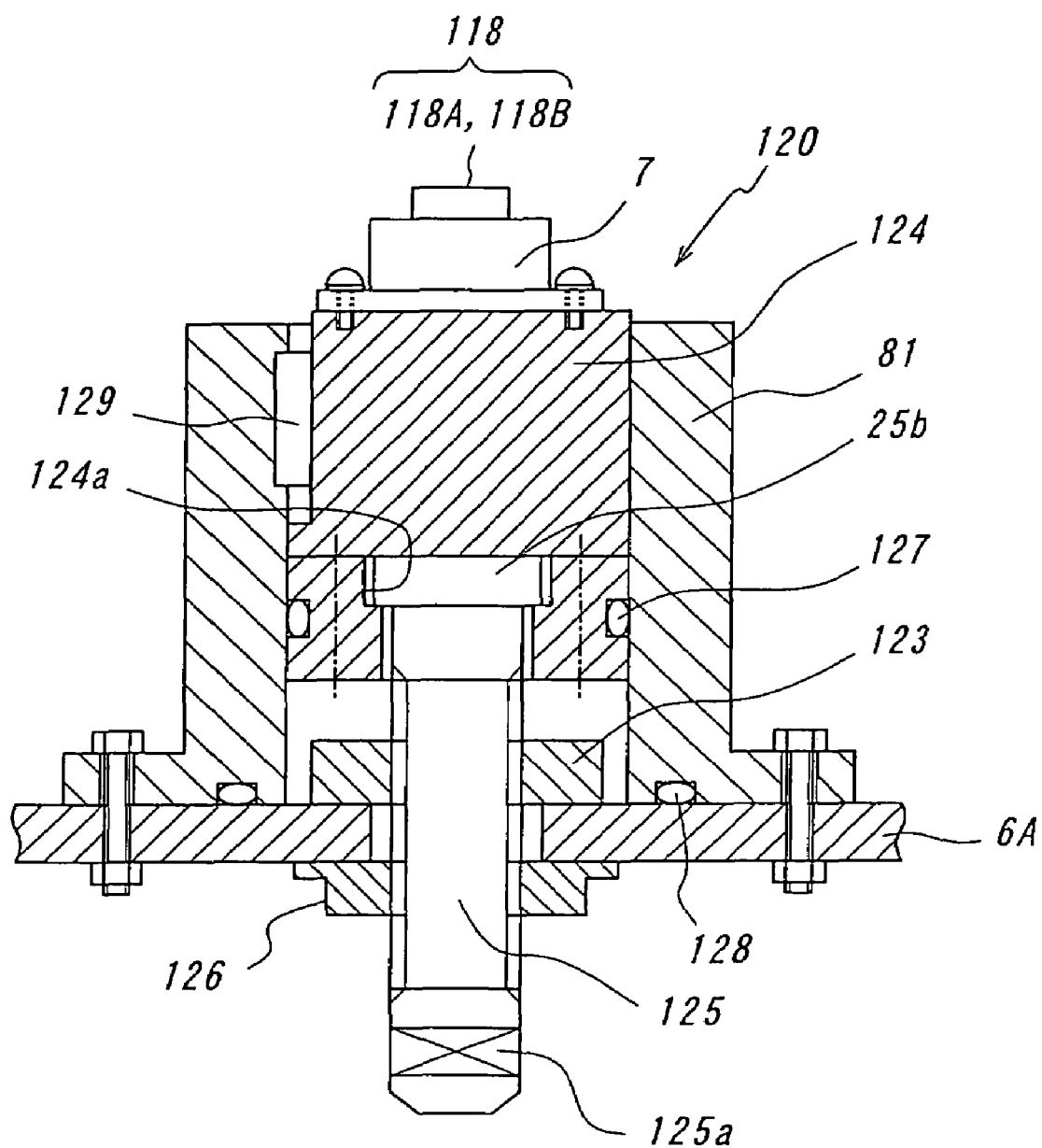
FIG. 34 is a section view illustrating an embodiment of attaching a magnetic sensor.
Figure 35:
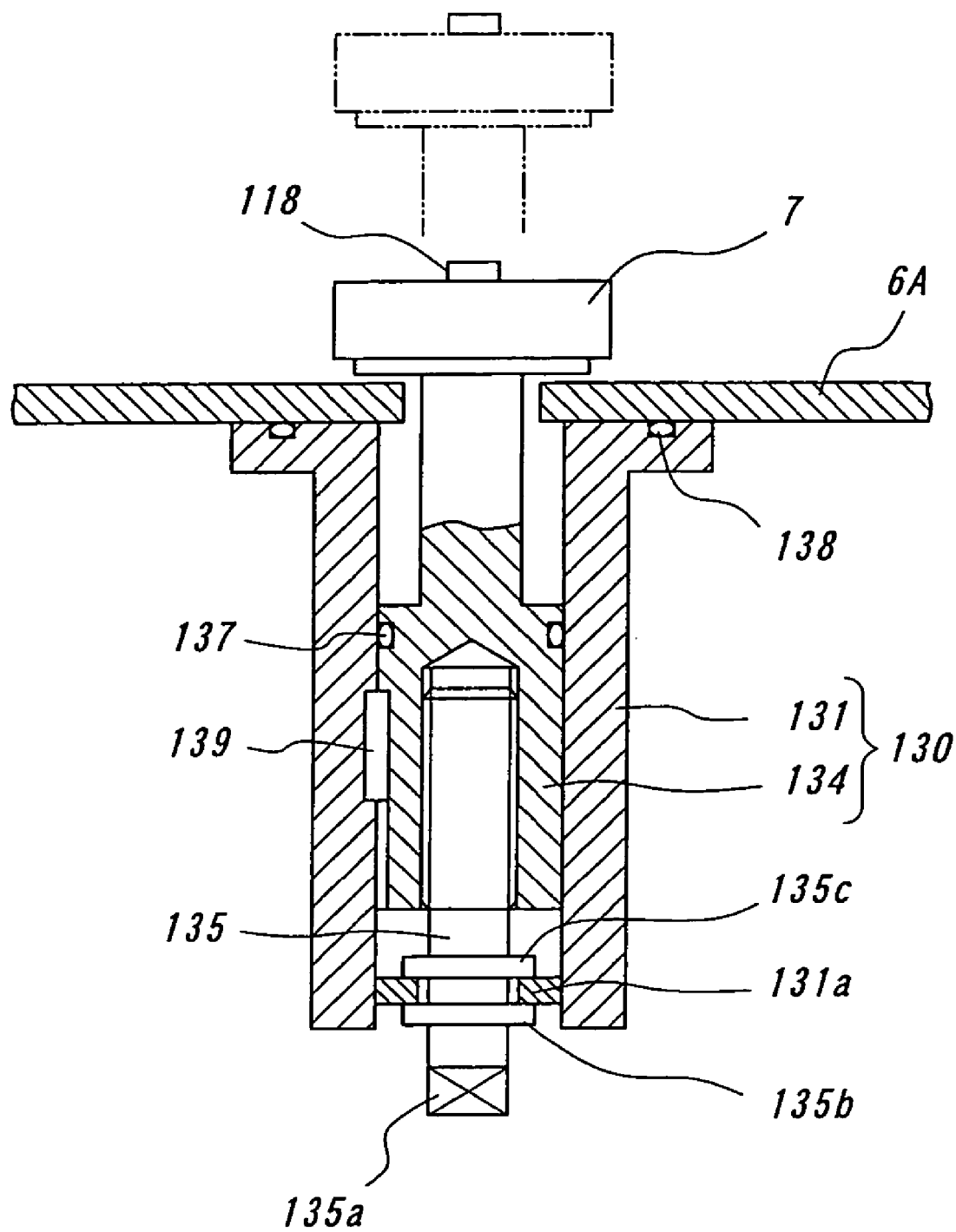
FIG. 35 is a section view illustrating another embodiment of attaching a magnetic sensor.
Figure 36:
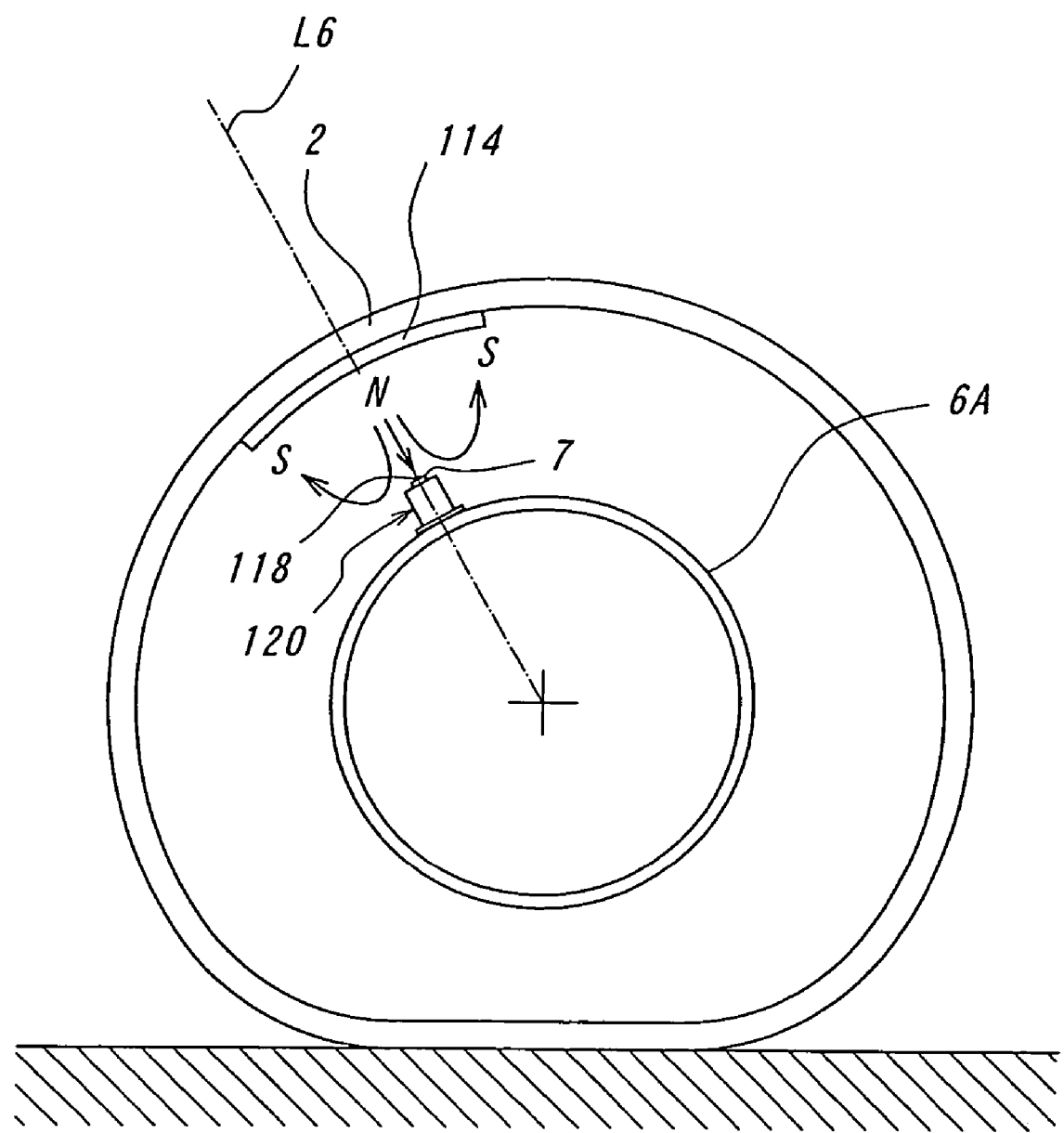
FIG. 36 is a section view of a tire showing a section A4-A4 of FIG. 33.

When the magnetic sensor or the magnet is attached and fixed to the rim, if it is arranged to separate apart from the rim, a distance to the magnet or magnetic sensor attached to the tire becomes short, so that a weak magnetic force or a light magnet can be detected by the magnetic sensor having the same sensitivity, which is advantageous in a point that an influence of the tire on unbalance can be reduced. As such an example, an apparatus 110 for measuring forces acted upon the tire, in which the magnetic sensor fixed to the rim is positioned to an outside of the rim in the radial direction, is explained with reference to FIGS. 33-36. FIG. 33 is a section view of the tire 1 showing a section in a plane passing through a rotating axis of the tire, and FIG. 34 is a partial section view illustrating an attaching form of a magnetic sensor 118, and FIG. 35 is a partial section view illustrating another attaching form of a magnetic sensor 118, and FIG. 36 is a section view corresponding to an arrow A4-A4 of FIG. 33.

The apparatus 110 for measuring forces acted upon the tire according to this embodiment comprises a sheet-shaped magnet 114 attached to an inner face of the tread portion 2 of the tire 1 in the radial direction and having a flexibility, and a magnetic sensor 118 measuring a magnetic field from the magnet 114. The magnet 114 has a plane symmetry in which one of magnetic poles, e.g. N-pole is a center of the plane symmetry and magnetic poles of the other polarity, e.g. S-poles are disposed at both ends, and is arranged so that a symmetrical plane PL coincides with a meridional plane of the tire under no action of external force to the tire 1 and a radiating direction of magnetic force lines from N-pole at a surface of the magnetic pole directs toward a center in the radial direction of the tire.

On the other hand, the magnetic sensor 118 is disposed so as to separate outward from the rim well portion 6A of the rim 6 in the radial direction of the tire and is positioned on the symmetrical plane PL and comprises a sensor 118A detecting a radial component Hr of the magnetic field radiated from N-pole and a sensor 118B detecting a peripheral component Hθ.

The attaching form of the magnetic sensor 118 is as follows. The magnetic sensor 118 is mounted onto a transmitting device 7 for treating signals detected by the magnetic sensor 118 to transmit to a receiving device disposed on a side of a vehicle body. The transmitting device 7 is attached to a block 124. The block 124 is disposed so as to be displaceable inward and outward in the radial direction along an inner peripheral face of a cylindrical guide 121 attached to an outer face of the rim well portion 6A in the radial direction, while the rotation thereof around the radius of the tire is controlled by a key 129. Here, the block 124 and the guide 121 constitute a stay 120 fixing the magnetic sensor 118 to the rim 6.

On the other hand, a nut 123 is attached to the rim well portion 6A, and an adjusting bolt 125 is threadedly attached to the nut 123 so as to reciprocatedly displace in the radial direction through a turning operation of its operating part 125a, and a disc-shaped head 125b is provided on a top of the adjusting bold 125. The head 125b is rotatably engaged with a disc-shaped cavity portion 124a of a block 124. The nut 123 and the adjusting bolt 125 constitute an adjusting means for adjusting a distance of the magnetic sensor 118 separated from the rim 6.

In the thus attached magnetic sensor 118, the distance of the magnetic sensor 118 separated from the rim 6 can be adjusted by turning the adjusting bolt 125 to displace the block 124 engaged with the disc-shaped head 125b located at the top thereof inward and outward in the radial direction. Further, the rotation of the block 124 around the radius is controlled, so that the separating distance of the sensor 118 can be adjusted without changing the attaching posture of the sensor 118. In this way, a fine-tuning of a sensitivity of the magnetic sensor 118 can be easily conducted by operating the operating portion 125a to change only the separating distance of the magnetic sensor 118 even at a state of mounting the tire 1 onto the rim 6.

On the stay 120 are disposed O-rings 127, 128 for the sealing of a tire internal pressure, while a fixed nut 126 is also arranged so as to fix the adjusting bolt 125 after the completion of the fine-tuning to prevent a position shift to vibration shock.

The magnetic sensor 118 may be attached in an attaching form shown in FIG. 35 instead of the attaching form of the magnetic sensor shown in FIG. 34. The transmitting device 7 mounted with the magnetic sensor 118 is attached to a block 134. The block 134 is disposed so as to be displaceable inward and outward in the radial direction along an inner peripheral face of a cylindrical guide 131 attached to an inner face of the rim well portion 6A in the radial direction, while the rotation thereof around the radius of the tire is controlled by a key 139. Here, the block 134 and the guide 131 constitute a stay 130 fixing the magnetic sensor 118 to the rim 6.

To the guide 131 is attached a ring 131a, and an adjusting bolt 135 having collars 135b, 135c engaged with the ring 131a and restraining an axial displacement through the collars 135b, 135c is threadedly arranged in a female screw hole 134a formed in the block 134. The adjusting bolt 135 constitutes an adjusting means for adjusting a distance of the magnetic sensor 118 separated from the rim 6, which can be reciprocatedly displaced in the radial direction by turning an operating portion 135a without rotating the block 134.

Even in the latter attaching form, a fine-tuning of a sensitivity of the magnetic sensor 118 can be easily conducted at a state of mounting the tire 1 onto the rim 6 as previously mentioned. Also, O-rings 137, 138 for the sealing of a tire internal pressure are arranged in the stay 130 as previously mentioned. In the attaching form shown in FIG. 35, a portion protruding from the rim 6 in the radial direction can be made minimum, so that the tire 1 is mounted onto the rim 6 at a state of positioning the magnetic sensor 118 near to the rim 6 and thereafter the magnetic sensor 118 is separated apart from the rim 6 to approach to the magnet 114, whereby the sensitivity detecting the magnetic field from the magnet 114 can be raised and hence the mounting of the tire 1 onto the rim 6 can be facilitated.

Even in the aforementioned attaching forms, the magnetic sensor 118 is fixed to the rim 6 through the stay 120, 130 at a position separated apart from the rim 6 in the radial direction of the tire, so that the magnetic sensor 118 is arranged near to the magnet 114 attached to the inner face of the tire, whereby it is possible to detect a change of a magnetic field by the magnetic sensor 118 even in a magnet having a weak magnetic force and the influence of the magnet 114 on the tire balance or the like can be made minimum by reducing the weight of the magnet.

In the above explanation, an annular bracket protruding outward from an outer peripheral face of the rim in the radial direction over a full periphery can be used instead of the stay 120 protruding outward from the outer peripheral face of the rim at one place on the periphery.

Although the above is described with respect to each of the embodiments, the function and effects of the invention are summarized below. Moreover, the following numerals (1)-(19) correspond to the numerals used in DISCLOSURE OF THE INVENTION.

According to the method for measuring forces acted upon the tire in (1), the forces in the peripheral direction and the radial direction acting to the ground contact face of the tire are determined from a variant pattern of the displacement produced in the ground contact portion of the tire, so that these forces can be accurately determined and as a result, a value of friction coefficient with a high precision can be obtained in real time.

According to the method for measuring forces acted upon the tire in (2), the displacement of the tire portion is measured magnetically, so that the influence of noise or the like is less and it is possible to stably conduct the measurement.

According to the method for measuring forces acted upon the tire in (3), the force acting in the peripheral direction of the tire is determined from an average of maximum value and minimum value in a variant pattern of a peripheral component of a magnetic flux density and the force acting in the radial direction of the tire is determined from a difference between the maximum value and the minimum value, so that the maximum value and minimum value can be specified irrespectively of the rotating speed of the tire, and hence it is useless to measure the rotating speed of the tire and the measuring system of a high precision can be constructed simply.

According to the method for measuring forces acted upon the tire in (4), the force acting in the radial direction of the tire is determined from the maximum value or the minimum value in the variant pattern of the radial component of the above magnetic flux density likewise the above, so that it is useless to measure the rotating speed of the tire and the measuring system of a high precision can be constructed simply.

According to the method for measuring forces acted upon the tire in (5), the force acting in the peripheral direction of the tire is determined from an average of maximum value and minimum value in a variant pattern of a widthwise component of the above magnetic flux density and the force acting in the radial direction of the tire is determined from a difference between the maximum value and the minimum value likewise the above, so that the maximum value and minimum value can be specified irrespectively of the rotating speed of the tire, and hence it is useless to measure the rotating speed of the tire and the measuring system of a high precision can be constructed simply, and further since the magnetic sensor measures the magnetic flux density in the widthwise direction of the tire, the widthwise component of earth magnetism is not changed accompanied with the rotation of the tire, which does not affect the identification of the maximum value and minimum value of the magnetic flux density formed by the magnet.

According to the method for measuring forces acted upon the tire in (6), the force acting in the peripheral direction of the tire is determined from an average of maximum value and minimum value in a variant pattern of a widthwise component of the above magnetic flux density and the force acting in the radial direction of the tire is determined from a difference between the maximum value and the minimum value likewise the above, so that the maximum value and minimum value can be specified irrespectively of the rotating speed of the tire, and hence it is useless to measure the rotating speed of the tire and the measuring system of a high precision can be constructed simply, and further it can be eliminated to change the influence of earth magnetism accompanied with the rotation of the tire and also the influence of earth magnetism changing in accordance with the direction of the vehicle or the running area can be eliminated, and hence there can be provided the force measuring method of light weight and high precision.

According to the apparatus for measuring forces acted upon the tire in (7), the magnet is arranged in the inner peripheral face of the tread portion and the magnetic sensor is attached to the outer peripheral face of the rim, so that the aforementioned force measuring methods can be realized and the measurement of the force and friction coefficient determined from the results can be rendered into a high precision.

According to the apparatus for measuring forces acted upon the tire in (8), the magnet is arranged in the outer peripheral face of the rim and the magnetic sensor is attached to the inner peripheral face of the tread portion, so that the aforementioned force measuring methods can be realized and the measurement of the force and friction coefficient determined from the results can be rendered into a high precision. Further, since the magnet is attached to the surface of the rim, the restriction to the weight can be mitigated as compared with the case of attaching the magnet to the tire, and it is easy to form a strong magnetic field and it is possible to conduct the measurement of the magnetic field more stably.

According to the apparatus for measuring forces acted upon the tire in (9), the force measuring method of (3) or (4) can be attained by the structure and arrangement of the magnets.

According to the apparatus for measuring forces acted upon the tire in (10), the force measuring method of (5) can be attained by the structure and arrangement of the magnets.

According to the apparatus for measuring forces acted upon the tire in (11), the magnetizations of polarities are distributed so as to be a reverse relation between front and back of the magnet, so that a stronger magnetic field can be formed by a synergistic effect with the steel cords.

According to the apparatus for measuring forces acted upon the tire in (12), the magnetization of the same polarity is uniformly distributed in each plane of the front and back of a sheet-shaped magnet constituting the magnet, so that the magnet capable of forming complicated magnetic fields can be simply constituted by arranging the sheet-shaped magnets cut out from a magnetic sheet magnetized to different polarities at front and back while properly combining them in the front and back.

According to the apparatus for measuring forces acted upon the tire in (13), the force measuring method of (3) or (4) can be attained by the arrangement of the magnet using sheet-shaped magnets of different polarities at front and back.

According to the apparatus for measuring forces acted upon the tire in (14), the force measuring method of (5) can be attained by the arrangement of the magnet using sheet-shaped magnets of different polarities at front and back.

According to the apparatus for measuring forces acted upon the tire in (15), the force measuring method of (5) can be attained by the arrangement of the magnet using sheet-shaped magnets of different polarities at front and back likewise the above, which can be also attained by the less number of the sheet-shaped magnets.

According to the apparatus for measuring forces acted upon the tire in (16), the force measuring method of (6) can be attained by the arrangement of the magnets and the arrangement of the magnetic sensors, and hence the forces acting to the tire capable of eliminating not only the influence of earth magnetism accompanied with the rotation of the tire but also the influence of earth magnetism changing in accordance with the direction of the vehicle or the running area can be determined simply in a higher precision.

According to the apparatus for measuring forces acted upon the tire in (17), the magnet or magnetic sensor fixed to the rim is arranged at the outside of the rim in the radial direction, so that the distance between the magnet and the magnetic sensor can be made small, and even if the size of the magnet is same, the magnetism detected by the magnetic sensor can be made strong to improve the measuring precision.

According to the apparatus for measuring forces acted upon the tire in (18), there is provided the stay or annular bracket for fixing the magnetic sensor or magnet to the rim, so that the magnetic sensor or magnet can be surely fixed to the rim. Also, in case of arranging plural magnetic sensors, the annular bracket can be used to more easily attach these magnetic sensors.

According to the apparatus for measuring forces acted upon the tire in (19), the adjusting means for adjusting the separating distance of the magnetic sensor from the rim is provided and the operating portion actuating the adjusting means is arranged at the inside of the rim in the radial direction of the tire, so that even after the tire is mounted on the rim, the separating distance of the magnetic sensor from the magnet can be adjusted, and hence the fine adjustment of the sensitivity of the magnetic sensor and the mounting of the tire on the rim can be facilitated.

EXAMPLE

In order to confirm the effectiveness of the invention, an experiment is carried out using the apparatus 20 for measuring the forces acted upon the tire according to the second embodiment. The magnetic sensor 28 is attached to a rim of one front wheel in a vehicle, while the magnets 24A, 24B are attached to an inside of a tread portion of a tire mounted on this wheel in the radial direction, and the vehicle is run at a constant speed and braked to add a transitional change to a load balance between front and rear wheels of the vehicle and forward and backward forces thereof, at where $(\Delta Hz_{\phi max} - \Delta Hz_{\phi min})$ and $(\Delta Hz_{\phi max} + \Delta Hz_{\phi min})$ shown in the equations (17) and (18) are measured based on the method of the second embodiment. In this case, the wheel to be mounted with the tire is a wheel-type sextant force meter, i.e. the wheel itself has a function of a sextant force meter. The force R acting in the radial direction of the tire and the force T acting in the peripheral direction of the tire are determined by the wheel-type sextant force meter to examine a correlation therebetween.

Figure 37A:
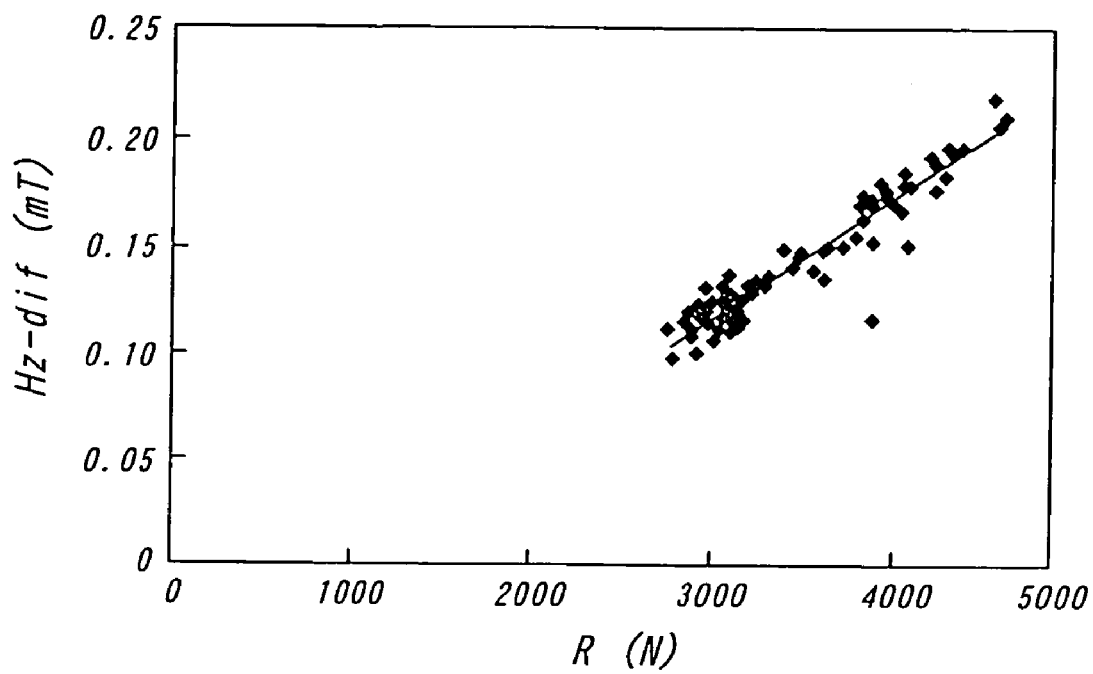
FIG. 37 is a graph showing a correlation between measured values of forces in radial direction and peripheral direction of the tire measured at given intervals over a time ranging from just before braking of a vehicle to stop thereof, and calculated value determined from magnetic measurement.
Figure 37B:
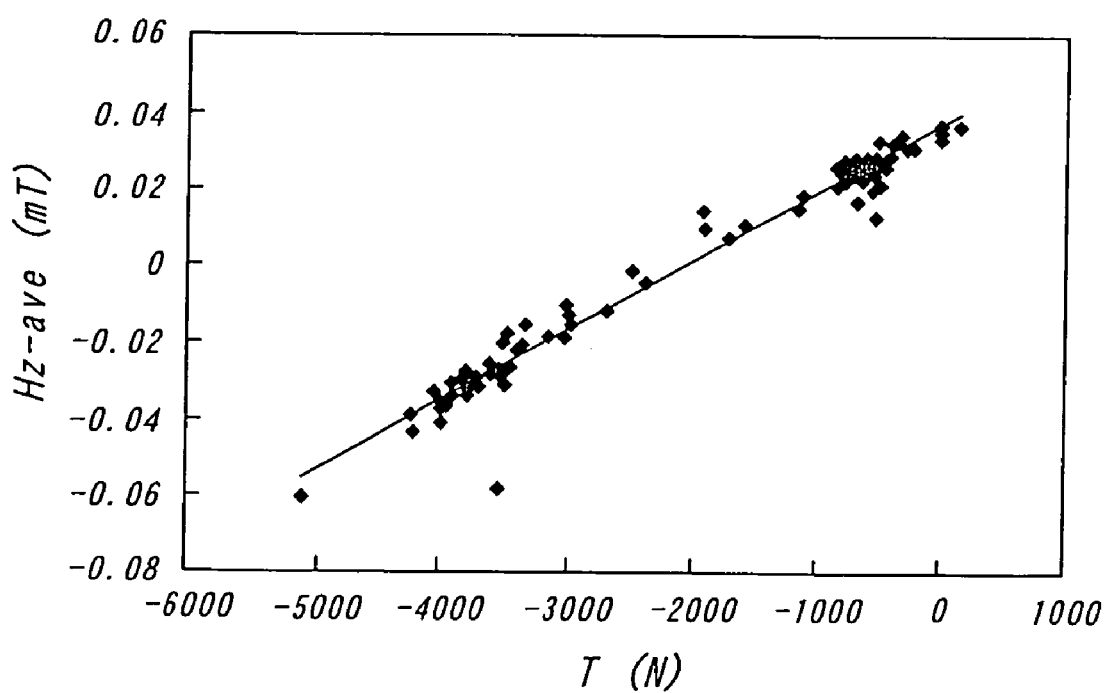

In FIG. 37 are plotted found values and calculated values of these forces measured from a last minute before the braking of the vehicle to the stop thereof every a given interval, in which FIG. 37a is a correlation chart taking the force R acting in the radial direction measured by the sextant force meter on an abscissa and Hz-dif shown by an equation (27) on an ordinate, and FIG. 37b a correlation chart taking the force T acting in the peripheral direction measured by the sextant force meter on an abscissa and Hz-ave shown by an equation (28) on an ordinate.

$$Hz\text{-}dif = (\Delta Hz_{\phi max} - \Delta Hz_{\phi min}) \quad (27)$$

$$Hz\text{-}ave = (\Delta Hz_{\phi max} + \Delta Hz_{\phi min}) \quad (28)$$

A correlation coefficient between Hz-dif and the force R acting in the radial direction of the tire is 0.986, and a correlation coefficient between Hz-ave and the force R acting in the peripheral direction of the tire is 0.951. Thus, they show a high correlation, from which it can be confirmed that the force measuring method according to the invention is very effective.

INDUSTRIAL APPLICABILITY

As seen from the above, the method for measuring forces acted upon the tire and the apparatus for measuring forces acted upon the tire according to the invention can measure force in the radial direction and force in the peripheral direction acting to the tire required for the high precision measurement of a friction force on road surface in a higher precision simply.

The invention claimed is:

1. A method for measuring at least one of forces in a peripheral direction and a radial direction of a running tire mounted onto a rim acted upon a ground contact face, in which when a point on an outer peripheral face of the rim is Q and an intersect between a straight line passing through the point Q under no action of external force and extending in the radial direction and an inner peripheral face of a tread portion of the tire is P, said forces are determined from a variant pattern that a relative displacement of the point P to the point Q in the peripheral direction or the radial direction is changed in accordance with a rotating position of the point Q when the point P passes through the ground contact portion of the tire, wherein a magnetic field formed by a magnet arranged on one of the point P and the point Q is continuously measured by a magnetic sensor arranged on the other of the point P and the point Q, and the variant pattern of the relative displacement between the point P and the point Q is determined by reverse calculation from a variant pattern of a magnetic flux density changed in accordance with the relative displacement; and wherein the measurement of the magnetic flux density is conducted by using the magnet arranged so that a magnetic force line distribution of the magnetic field forms a plane symmetry with respect to a meridional plane of the tire including the point P or the point Q under no action of external force to the tire, and the force acting in the peripheral direction of the tire is determined from an average between maximum value and minimum value of a variant pattern of a tire peripheral component in the measured magnetic flux density and the force acting in the radial direction of the tire is determined from a difference between the maximum value and the minimum value of the variant pattern.

2. A method for measuring at least one of forces in a peripheral direction and a radial direction of a running tire mounted onto a rim acted upon a ground contact face, in which when a point on an outer peripheral face of the rim is Q and an intersect between a straight line passing through the point Q under no action of external force and extending in the radial direction and an inner peripheral face of a tread portion of the tire is P, said forces are determined from a variant pattern that a relative displacement of the point P to the point Q in the peripheral direction or the radial direction is changed in accordance with a rotating position of the point Q when the point P passes through the ground contact portion of the tire, wherein a magnetic field formed by a magnet arranged on one of the point P and the point Q is continuously measured by a magnetic sensor arranged on the other of the point P and the point Q, and the variant pattern of the relative displacement between the point P and the point Q is determined by reverse calculation from a variant pattern of a magnetic flux density changed in accordance with the relative displacement;

wherein the measurement of the magnetic flux density is conducted by using the magnet arranged so that a magnetic force line distribution of the magnetic field forms a plane symmetry with respect to a meridional plane of the tire including the point P or the point Q under no action of external force to the tire, and the force acting in the radial direction of the tire is determined from a maximum value or a minimum value of a variant pattern of a tire radial component of the measured magnetic flux density.

3. A method for measuring at least one of forces in a peripheral direction and a radial direction of a running tire mounted onto a rim acted upon a ground contact face, in which when a point on an outer peripheral face of the rim is Q and an intersect between a straight line passing through the point Q under no action of external force and extending in the radial direction and an inner peripheral face of a tread portion of the tire is P, said forces are determined from a variant pattern that a relative displacement of the point P to the point Q in the peripheral direction or the radial direction is changed in accordance with a rotating position of the point Q when the point P passes through the ground contact portion of the tire, wherein a magnetic field formed by a magnet arranged on one of the point P and the point Q is continuously measured by a magnetic sensor arranged on the other of the point P and the point Q, and the variant pattern of the relative displacement between the point P and the point Q is determined by reverse calculation from a variant pattern of a magnetic flux density changed in accordance with the relative displacement;

wherein the measurement of the magnetic flux density is conducted by using the magnet arranged so that a widthwise component of a magnetic flux density of the magnetic field changes along the peripheral direction of the tire under no action of external force to the tire, and the force acting in the peripheral direction of the tire is determined from an average between maximum value and minimum value of a variant pattern of a tire widthwise component in the measured magnetic flux density and the force acting in the radial direction of the tire is determined from a difference between the maximum value and the minimum value of the variant pattern.

4. A method for measuring at least one of forces in a peripheral direction and a radial direction of a running tire mounted onto a rim acted upon a around contact face, in which when a point on an outer peripheral face of the rim is Q and an intersect between a straight line passing through the point Q under no action of external force and extending in the radial direction and an inner peripheral face of a tread portion of the tire is P, said forces are determined from a variant pattern that a relative displacement of the point P to the point Q in the peripheral direction or the radial direction is changed in accordance with a rotating position of the point Q when the point P passes through the ground contact portion of the tire, wherein a magnetic field formed by a magnet arranged on one of the point P and the point Q is continuously measured by a magnetic sensor arranged on the other of the point P and the point Q, and the variant pattern of the relative displacement between the point P and the point Q is determined by reverse calculation from a variant pattern of a magnetic flux density changed in accordance with the relative displacement;

wherein the measurement of the magnetic flux density is carried out in parallel with respect to a pair of magnets arranged near to each other so that changes of widthwise components of magnetic flux densities formed along the peripheral direction of the tire form a reversal relation under no action of external force to the tire, and when an average value of maximum values in a reversal pattern reversed from a variant pattern of the magnetic flux density of the tire widthwise component measured on one of the magnets and in a variant pattern of the magnetic flux density of the tire widthwise component measured on the other magnet is an average maximum value and an average value of minimum values in these patterns is an average minimum value, the force acting in the peripheral direction of the tire is determined from an average between the average maximum value and the average minimum value, and the force acting in the radial direction of the tire is determined from a difference between the average maximum value and the average minimum value.

5. An apparatus for measuring forces acted upon a tire according to any one of claim 1-4, wherein the magnet is constituted with a sheet-shaped magnet having magnetic poles of the same polarity at both ends in a longitudinal direction and a magnetic pole of a polarity opposite to the magnetic poles of both the ends at a center in the longitudinal direction, and the magnet is arranged so as to extend the longitudinal direction in a peripheral direction of the tire.

6. An apparatus for measuring forces acted upon a tire according to any one of claim 1-4, wherein the magnet is constituted with two magnets each having magnetic poles of opposite polarities at both ends, and these two magnets are extended in opposite directions to each other in a widthwise direction of the tire and arranged side by side in a peripheral direction of the tire.

7. An apparatus for measuring forces acted upon a tire, the apparatus comprising: a magnet arranged on an inner peripheral face of a tread portion; and a magnetic sensor attached directly or indirectly through a fitting jig to an outer peripheral face of a rim, wherein the magnet is arranged so that a magnetic force line distribution of a magnetic field forms a plane symmetry with respect to a meridional plane of the tire including a point P or a point Q under no action of external force to the tire, the magnet having magnetic poles of the same polarity at both ends in a longitudinal direction.

8. An apparatus for measuring forces acted upon a tire, the apparatus comprising: a magnet arranged on an inner peripheral face of a tread portion; and a magnetic sensor attached directly or indirectly through a fitting jig to an outer peripheral face of a rim, wherein a pair of magnets are arranged near to each other so that changes of widthwise components of magnetic flux densities formed along a peripheral direction of the tire form a reversal relation under no action of external force to the tire.

9. An apparatus for measuring forces acted upon a tire according to any one of claims 7 or 8, wherein the magnet is constituted with at least one sheet-shaped magnet in which distributions of magnetization at front and back faces thereof form a reversal relation to each other.

10. An apparatus for measuring forces acted upon a tire according to claim 9, wherein the sheet-shaped magnet is constituted with a rectangular rubber sheet of an even thickness in which the magnetization of the same polarity at each of the front and back faces is distributed substantially uniformly over a full face thereof.

11. An apparatus for measuring forces acted upon a tire according to claim 10, wherein the sheet-shaped magnet is arranged so as to position a magnet center to the point P and direct a side of the magnet to a peripheral direction.

12. An apparatus for measuring forces acted upon a tire according to claim 10, wherein four rectangular sheet-shaped magnets having the same size are arranged so as to position their magnet centers to apexes of a tetragon having a center at the point P and one side parallel to a peripheral direction of the tire, and a side of each of these magnets is directed to the peripheral direction of the tire, and distances separated between these magnets in the peripheral direction of the tire and the widthwise direction of the tire are not more than 100 mm, respectively, and directions of magnetic poles of the sheet-shaped magnets located at mutually adjacent apexes of the tetragon having a center at the point P are opposed to each other.

13. An apparatus for measuring forces acted upon a tire according to claim 10, wherein two rectangular sheet-shaped magnets having the same size are arranged so as to position their magnet centers to a pair of apexes forming a diagonal relationship of a tetragon having a center at the point P and a side parallel to a peripheral direction of the tire, and a side of each of these magnets is directed to the peripheral direction of the tire, and distances separated between these magnets in the peripheral direction of the tire and the widthwise direction of the tire are not more than 100 mm, respectively, and directions of magnetic poles of these sheet-shaped magnets are made the same.

14. An apparatus for measuring forces acted upon a tire according to claim 10, wherein six rectangular sheet-shaped magnets having the same size are arranged at three rows from side to side along a peripheral direction of the tire in the same direction and at equal intervals every two magnets, and a side of each of these magnets is directed in the peripheral direction of the tire, and distances separated between these magnets in the peripheral direction of the tire and in the widthwise direction of the tire are not more than 100 mm, respectively, and directions of magnetic poles of these six magnets are opposed to each other even between the adjacent magnets in the peripheral direction of the tire and in the widthwise direction of the tire, and magnetic sensors are arranged on lines passing through centers of two rectangles formed by mutually adjacent four sheet-shaped magnets under no action of external force to the tire and extending inward and outward in a radial direction in correspondence to each of these rectangles.

15. An apparatus for measuring forces acted upon a tire according to any one of claims 7 or 8, wherein the magnet or the magnetic sensor is indirectly attached to an outer peripheral face of a rim through a fitting jig and at a position separated outward from the outer peripheral face of the rim in a radial direction of the tire.

16. An apparatus for measuring forces acted upon a tire according to claim 15, which further comprises an adjusting means for adjusting a distance of the magnet or the magnetic sensor separated from the outer peripheral face of the rim, and an operating means for actuating the adjusting means arranged inward in the radial direction of the tire.

17. An apparatus for measuring forces acted upon a tire, the apparatus comprising: a magnet arranged on an inner peripheral face of a tread portion; and a magnetic sensor attached directly or indirectly through a fitting jig to an outer peripheral face of a rim, wherein the magnet is arranged so that a magnetic force line distribution of a magnetic field forms a plane symmetry with respect to a meridional plane of the tire including a point P or a point Q under no external force to the tire, the magnet having magnetic poles of the same polarity at both ends in a longitudinal direction.

18. An apparatus for measuring forces acted upon a tire, the apparatus comprising: a magnet attached directly or indirectly through a fitting jig to an outer peripheral face of a rim; and a magnetic sensor arranged on an inner peripheral face of a tread portion, wherein a pair of magnets are arranged near to each other so that changes of widthwise components of magnetic flux densities formed along a peripheral direction of the tire form a reversal relation under no action of external force to the tire.

19. An apparatus for measuring forces acted upon a tire according to any one of claims 17 or 18, wherein the magnet or the magnetic sensor is indirectly attached to an outer peripheral face of a rim through a fitting jig and at a position separated outward from the outer peripheral face of the rim in a radial direction of the tire.

20. An apparatus for measuring forces acted upon a tire according to claim 19, which further comprises an adjusting means for adjusting a distance of the magnet or the magnetic sensor separated from the outer peripheral face of the rim, and an operating means for actuating the adjusting means arranged inward in the radial direction of the tire.

* * * * *